US012719913B2

(12) United States Patent
Fellows et al.

(10) Patent No.: US 12,719,913 B2
(45) Date of Patent: Aug. 25, 2026

(54) CYBER SECURITY SCENARIOS WITH IMPROVED PLAYBOOKS

(71) Applicant: Darktrace Holdings Limited, Cambridge (GB)

(72) Inventors: Simon Fellows, Chester (GB); Dickon Humphrey, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 68 days.

(21) Appl. No.: 18/778,118

(22) Filed: Jul. 19, 2024

(65) Prior Publication Data

US 2025/0030724 A1 Jan. 23, 2025

Related U.S. Application Data

(60) Provisional application No. 63/528,009, filed on Jul. 20, 2023.

(51) Int. Cl.

| | |
|---|---|
| ***H04L 9/40*** | (2022.01) |
| ***G06F 21/50*** | (2013.01) |
| ***G06N 20/00*** | (2019.01) |
| ***H04L 41/16*** | (2022.01) |

(52) U.S. Cl.

CPC .......... *H04L 63/1433* (2013.01); *G06F 21/50* (2013.01); *G06N 20/00* (2019.01); *H04L 41/16* (2013.01); *H04L 63/08* (2013.01); *H04L 63/1441* (2013.01); *H04L 63/20* (2013.01)

(58) Field of Classification Search

CPC ..... H04L 63/1433; H04L 41/16; H04L 63/08; H04L 63/1441; H04L 63/20; G06F 20/00; G06F 21/20

USPC ........................................ 726/22, 23, 24, 25

See application file for complete search history.

(56) References Cited

U.S. PATENT DOCUMENTS

| | | | | |
|---|---|---|---|---|
| 12,339,961 | B2 * | 6/2025 | Soliman | H04L 63/1425 |
| 2013/0305362 | A1 * | 11/2013 | Hermanns | H04L 63/08 726/22 |
| 2017/0126712 | A1 * | 5/2017 | Crabtree | H04L 63/1425 |
| 2021/0306352 | A1 * | 9/2021 | Narula | G06N 5/04 |
| 2022/0210200 | A1 * | 6/2022 | Crabtree | G06F 16/951 |
| 2023/0403294 | A1 * | 12/2023 | Bazalgette | H04L 63/1441 |

* cited by examiner

*Primary Examiner* — Teshome Hailu

(74) *Attorney, Agent, or Firm* — Rutan and Tucker, LLP

(57) ABSTRACT

An apparatus comprises a cyber security restoration engine configured to restore an asset in a computing network that is involved in a cyberattack to a trusted operational state and prioritize remediation actions for the asset in the computing network. The cyber security restoration engine is configured to receive an indication that the asset in the computing network is involved in a cyber security scenario. The cyber security restoration engine is further configured to identify, based on a property of the asset, an ordered set of instructions forming a playbook that applies to the asset to at least partially address the cyber security scenario.

21 Claims, 23 Drawing Sheets

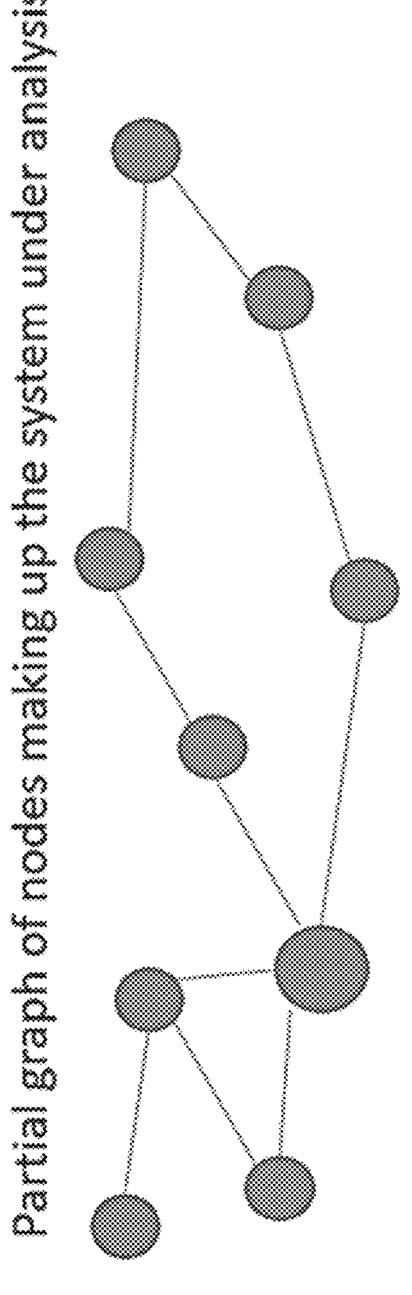

AI tracking mechanism

DB/AI model (Trusted) Operational States of each node (User account and/or Device) in the graph of the system being protected Actual 3rd party Data recovery system

190

Cyber attack response scenarios from database and/or direct communication in real time with the Prevent component of Potential Response actions for each node (User Account and/or Device) and the corresponding nodes adjacent to a compromised node in the graph of the system being protected

FIG. 3A

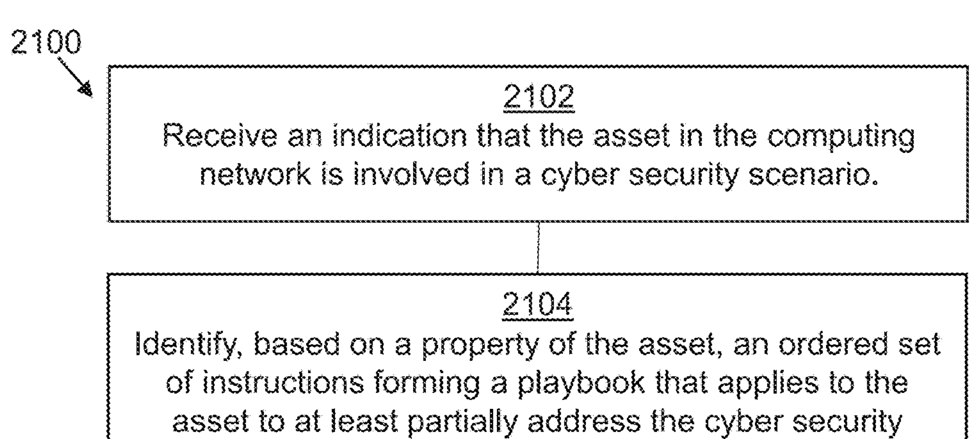
FIG. 21
2200
2202
Cause a user interface to display a recommended set of instructions in a recommended order forming a playbook that applies to the asset in the computing network involved in a cyber security scenario. The recommended set of instructions in the recommended order are identified based on knowledge about the asset and the cyber security scenario.
FIG. 22
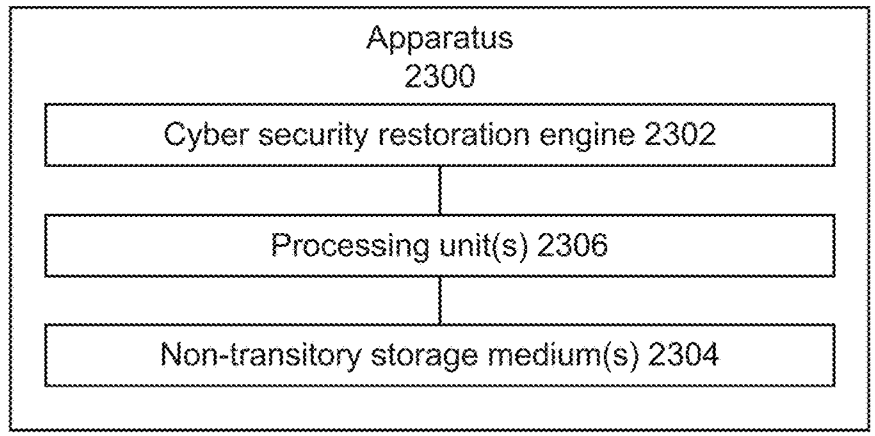
FIG. 23

CYBER SECURITY SCENARIOS WITH IMPROVED PLAYBOOKS

RELATED APPLICATION

This application claims priority under 35 USC 119 to U.S. provisional patent application No. 63/528,009, titled "A CYBER SECURITY LOOP" filed Jul. 20, 2023, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Cyber security and in an embodiment use of Artificial Intelligence in cyber security.

BACKGROUND

Cybersecurity attacks have become a pervasive problem for enterprises as many computing devices and other resources have been subjected to attack and compromised. A "cyberattack" constitutes a threat to security of an enterprise (e.g., enterprise network, one or more computing devices connected to the enterprise network, or the like). As an example, the cyberattack may be a cyber security threat against the enterprise network, one or more computing devices connected to the enterprise network, stored or in-flight data accessible over the enterprise network, and/or other enterprise-based resources. This cyber security threat may involve malware (malicious software) introduced into a computing device or into the network. The cyber security threat may originate from an external endpoint or an internal entity (e.g., a negligent or rogue authorized user). The cyber security threats may represent malicious or criminal activity, ranging from theft of credential to even a nation-state attack, where the source initiating or causing the security threat is commonly referred to as a "malicious" source. Conventional cybersecurity products are commonly used to detect and prioritize cybersecurity threats (hereinafter, "cyber threats") against the enterprise, and to determine preventive and/or remedial actions for the enterprise in response to those cyber threats.

SUMMARY

Methods, systems, and apparatus are disclosed for an Artificial Intelligence-based cyber security system. Certain techniques described herein involve the identification and use of a playbook to at least partially address a cyber security scenario. In an embodiment, a cyber security system implementing such techniques can provide AI-generated playbooks for a cyber-attack restoration engine.

In a first aspect, an apparatus is described. The apparatus comprises a cyber security restoration engine configured to restore an asset in a computing network that is involved in a cyberattack to a trusted operational state and prioritize remediation actions for the asset in the computing network. The cyber security restoration engine is configured to receive an indication that the asset in the computing network is involved in a cyber security scenario. The apparatus is further configured to identify, based on a property of the asset, an ordered set of instructions forming a playbook that applies to the asset to at least partially address the cyber security scenario. Instructions implemented in software for the cyber security restoration engine are configured to be stored in one or more non-transitory storage mediums to be executed by one or more processing units.

In a second aspect, a computer-implemented method for a cyber security restoration engine configured to restore an asset in a computing network that is involved in a cyberattack to a trusted operational state and prioritize remediation actions for the asset in the computing network is described. The method comprises receiving an indication that the asset in the computing network is involved in a cyber security scenario. The method further comprises identifying, based on a property of the asset, an ordered set of instructions forming a playbook that applies to the asset to at least partially address the cyber security scenario.

In a third aspect, a non-transitory computer-readable medium is described. The non-transitory computer-readable medium stores instructions which when executed by a cyber security restoration engine configured to restore an asset in a computing network that is involved in a cyberattack to a trusted operational state and prioritize remediation actions for the asset in the computing network causes the cyber security restoration engine to receive an indication that the asset in the computing network is involved in a cyber security scenario. The instructions are further configured to cause the processor to identify, based on a property of the asset, an ordered set of instructions forming a playbook that applies to the asset to at least partially address the cyber security scenario.

In a fourth aspect, an apparatus is described. The apparatus comprises a cyber security restoration engine configured to restore an asset in a computing network that is involved in a cyberattack to a trusted operational state and prioritize remediation actions for the asset in the computing network, which is further. The cyber security restoration engine is configured to cause a user interface to display a recommended set of instructions in a recommended order forming a playbook that applies to the asset in the computing network involved in a cyber security scenario. The recommended set of instructions in the recommended order are identified based on knowledge about the asset and the cyber security scenario. Instructions implemented in software for the cyber security restoration engine are configured to be stored in one or more non-transitory storage mediums to be executed by one or more processing units.

Further aspects relating to the fourth aspect include a computer-implemented method and a non-transitory computer-readable medium that implement one or more operations corresponding to the functionality in relation to the fourth aspect.

These and other features of the design provided herein can be better understood with reference to the drawings, description, and claims, all of which form the disclosure of this patent application.

DRAWINGS

The drawings refer to some embodiments of the design provided herein in which.

FIG. 3A illustrates a diagram of an embodiment of the cyber security restoration engine configured to take one or more autonomous remediation actions based on Artificial Intelligence assistance to remediate one or more nodes in the graph of the system being protected back to the trusted operational state before a detected compromise by a cyber threat occurred in the protected system in order to assist in a recovery from the cyber threat.

Figure 3B:
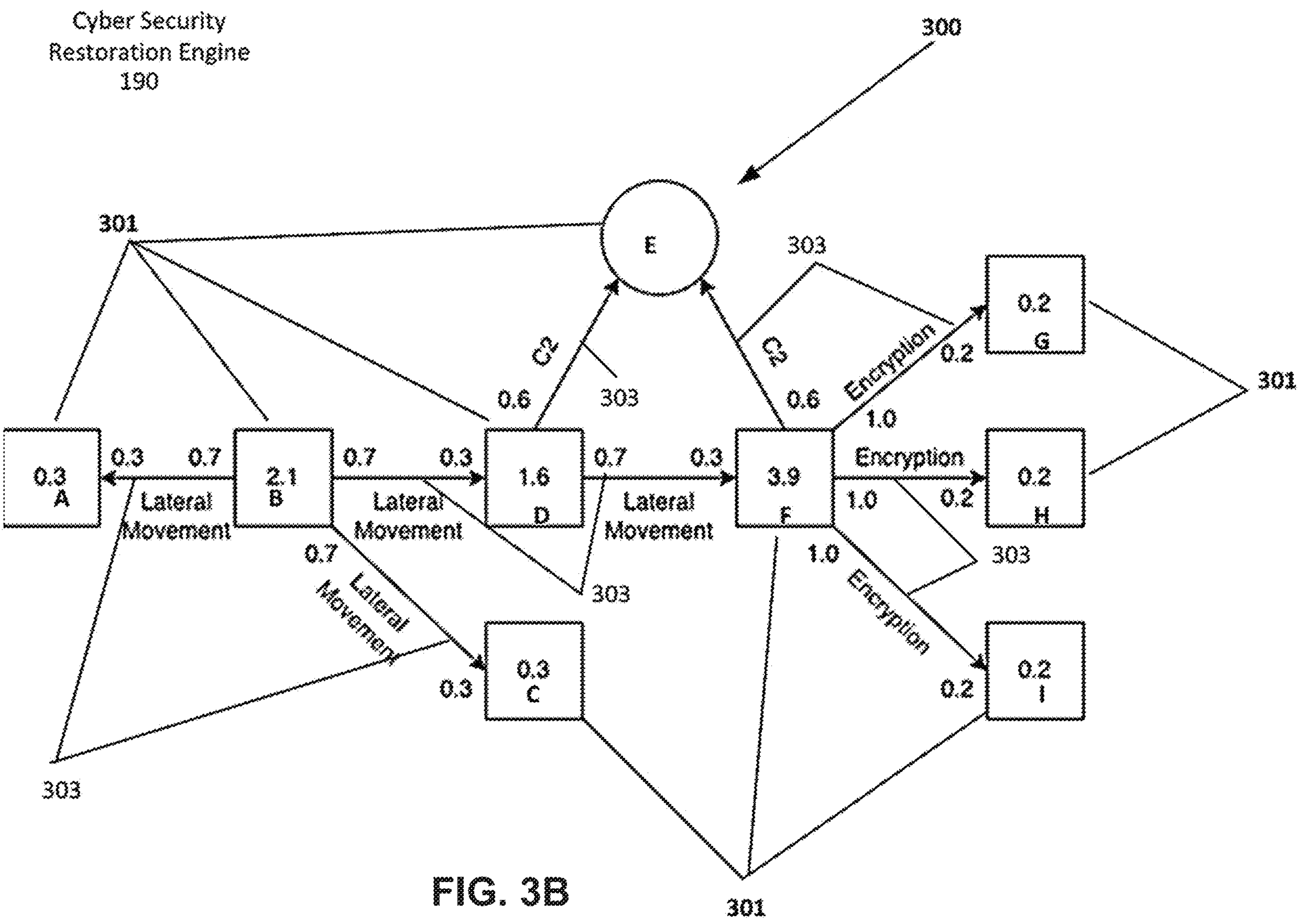

FIG. 3B illustrates a graph of nodes in a computer network or system that are involved in a cyber attack and the metadata stored in the edges connecting the nodes, used by an embodiment of a cyber security restoration engine to prioritize nodes for remediation.

Figure 4:
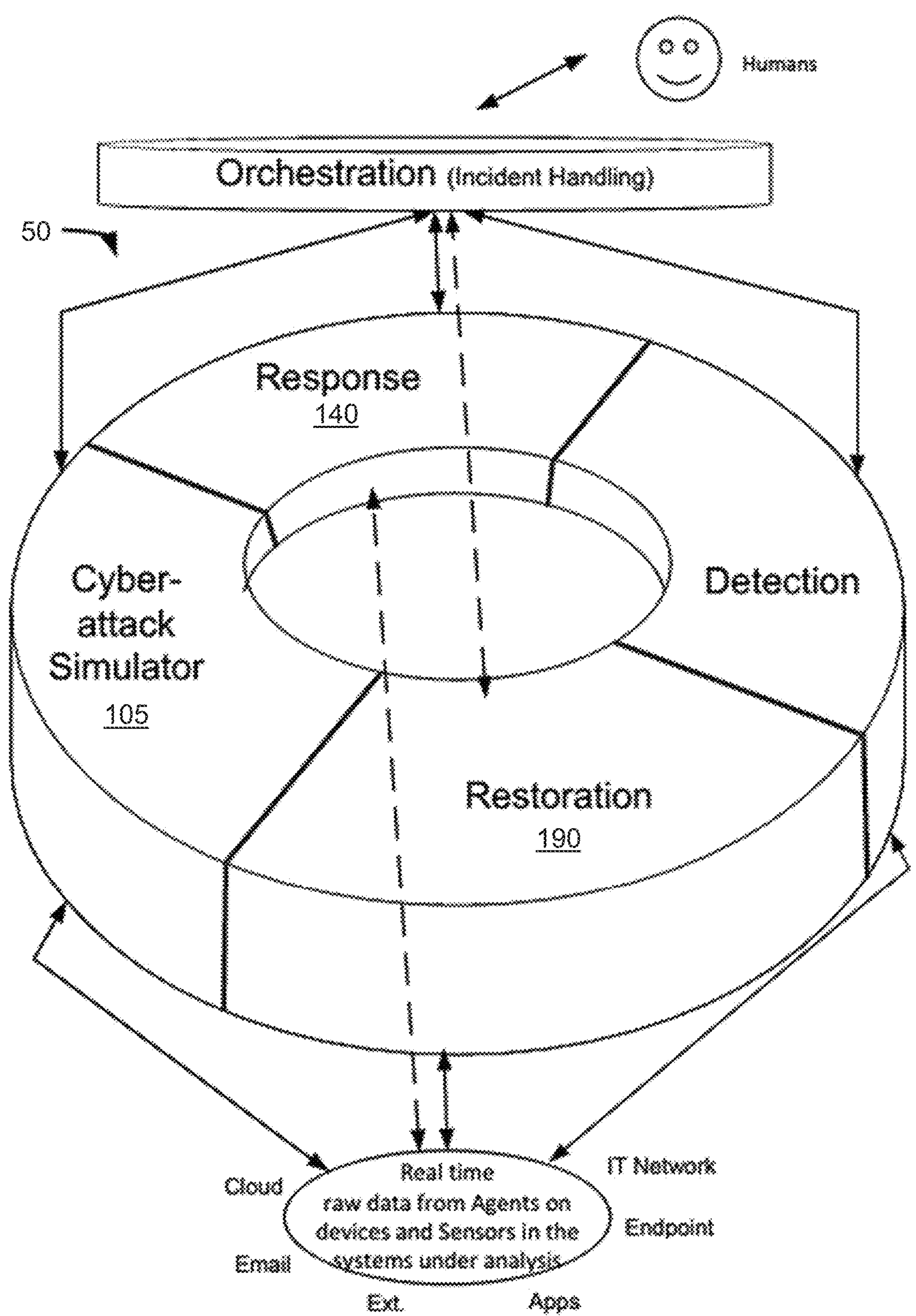

FIG. 4 illustrates a block diagram of an embodiment of an intelligent orchestration component configured to facilitate an Artificial Intelligence augmented and adaptive interactive response loop between multiple Artificial Intelligence-based engines.

Figure 5:
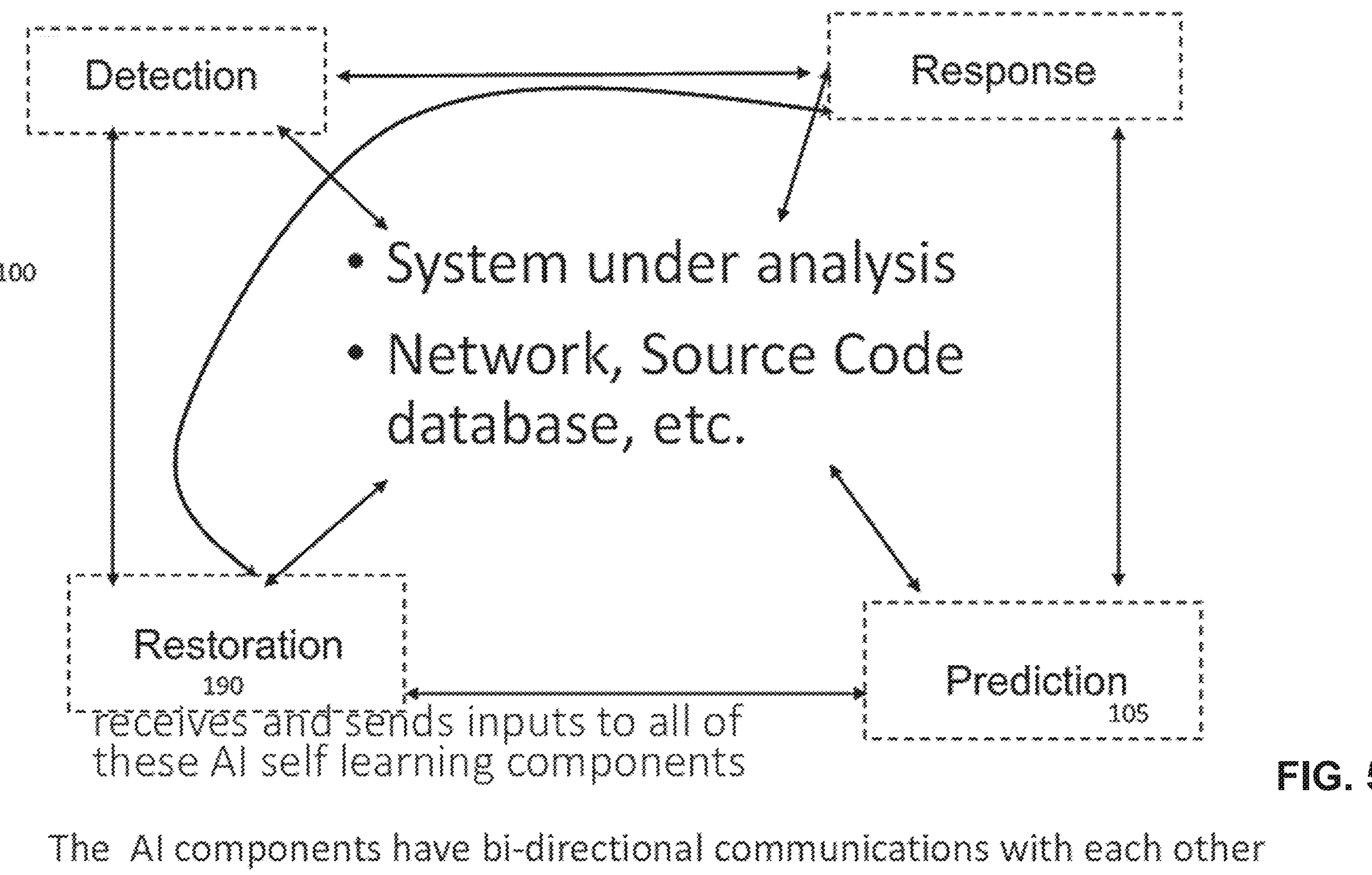

FIG. 5 illustrates a diagram of an embodiment of i) the cyber threat detection engine using Artificial Intelligence algorithms configured and trained to perform a first machine-learned task of detecting the cyber threat, ii) an autonomous response engine using Artificial Intelligence algorithms configured and trained to perform a second machine-learned task of taking one or more mitigation actions to mitigate the cyber threat, iii) a cyber-security restoration engine using Artificial Intelligence algorithms configured and trained to perform a third machine-learned task of remediating the system being protected back to a trusted operational state, and iv) a prediction engine using Artificial Intelligence algorithms configured and trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, working in tandem.

Figure 6:
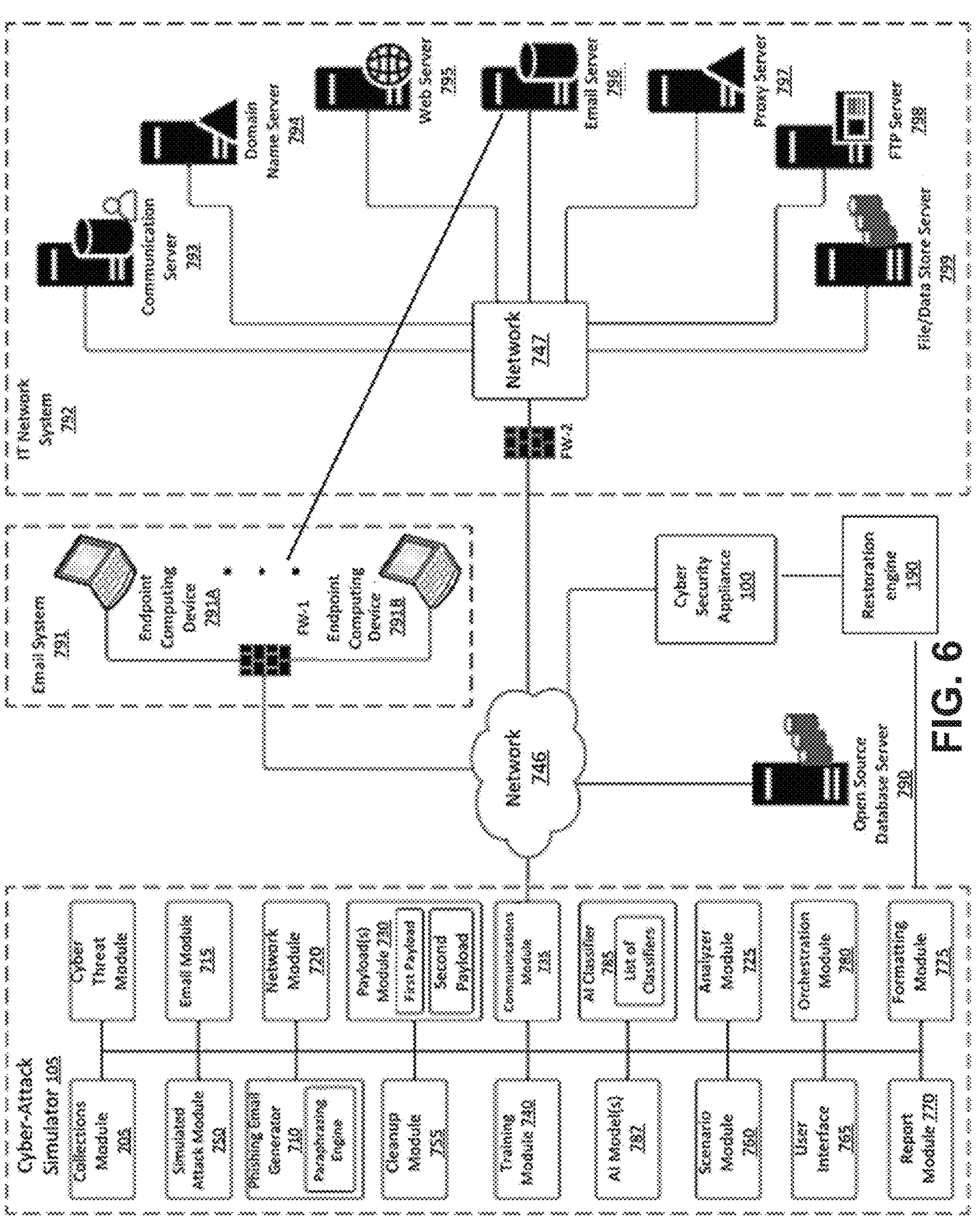

FIG. 6 illustrates a block diagram of an embodiment of the prediction engine with Artificial Intelligence-based simulations conducted in the prediction engine by constructing a graph of nodes of the system being protected (e.g. a network including i) the physical devices connecting to the network, any virtualize machines of the network, user accounts in the network, email accounts in the network, etc. as well as ii) connections and pathways through the network) to create a simulated version of the system to be tested.

Figure 7:
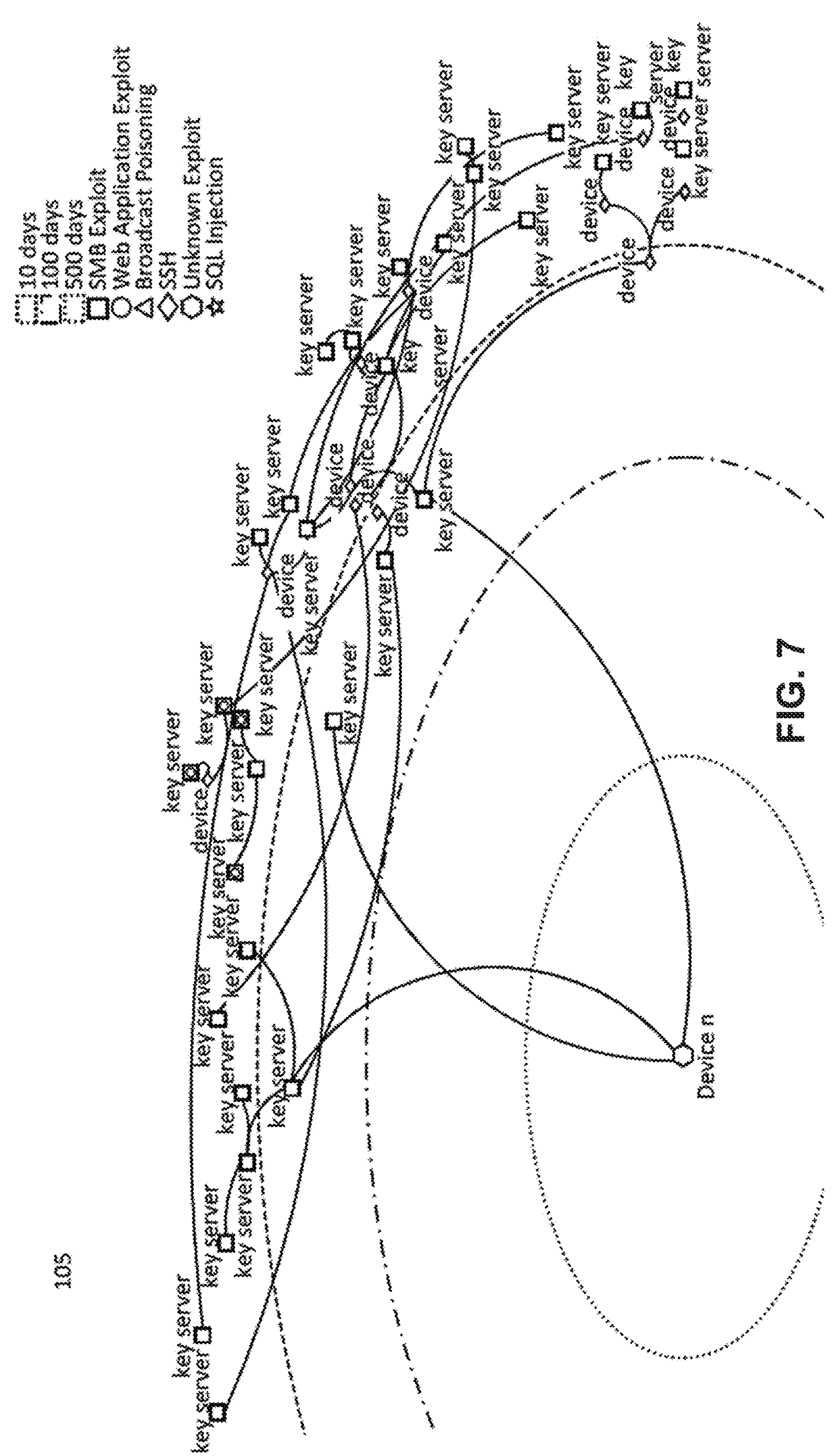

FIG. 7 illustrates a diagram of an embodiment of a cyber threat prediction engine and its Artificial Intelligence-based simulations constructing a graph of nodes in an example network and simulating how the cyberattack might likely progress in the future tailored with an innate understanding of a normal behavior of the nodes in the system being protected and a current operational state of each node in the graph of the protected system during simulations of cyberattacks.

Figure 8:
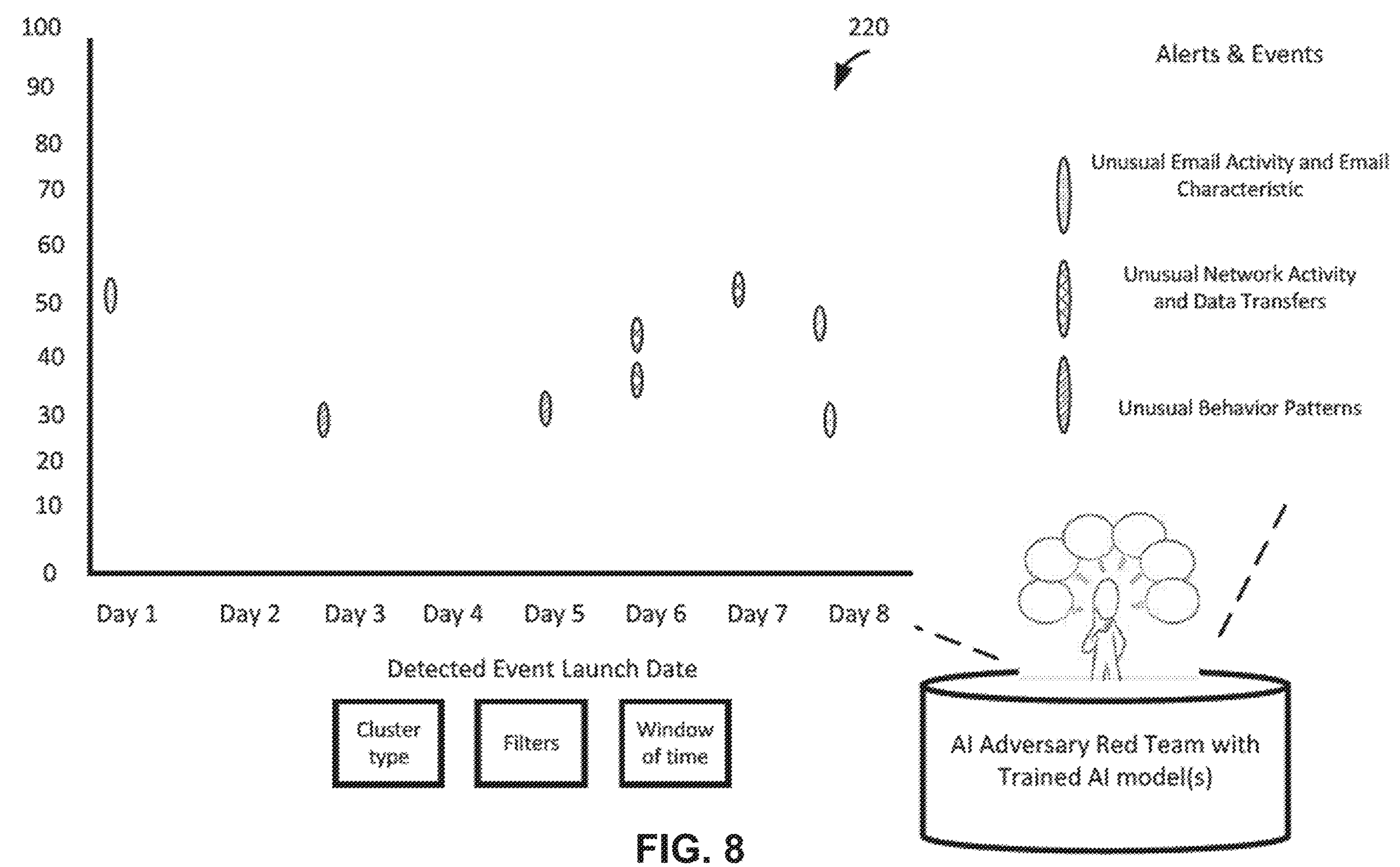

FIG. 8 illustrates a graph of an embodiment of an example chain of unusual behavior for, in this example, the email activities and IT network activities deviating from a normal pattern of life in connection with the rest of the system/network under analysis.

Figure 9:
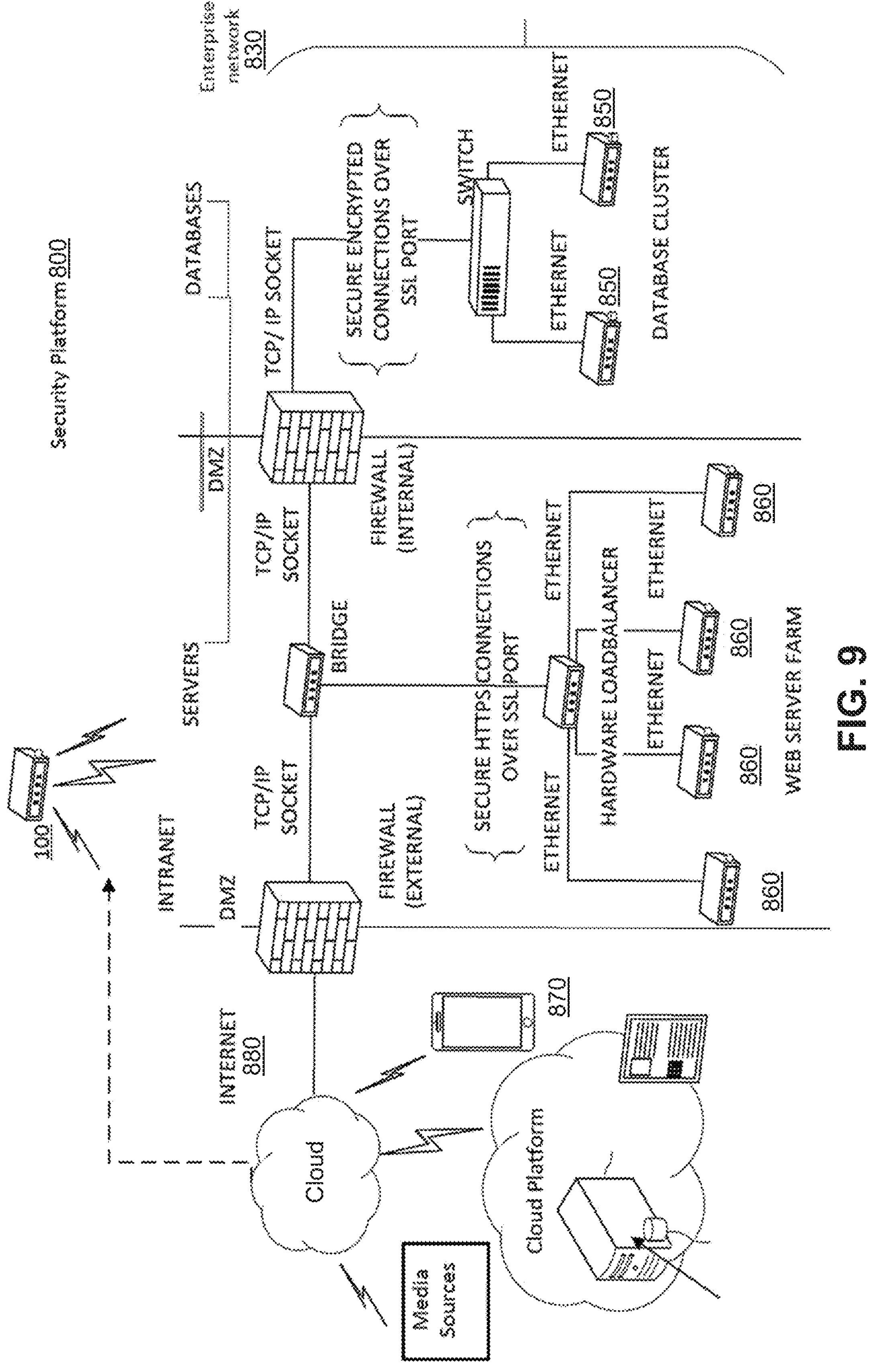

FIG. 9 illustrates a block diagram of an embodiment of the AI-based cyber security appliance with the cyber security restoration engine and other Artificial Intelligence-based engines plugging in as an appliance platform to protect a system.

FIG. 10 to FIG. 15 illustrate diagrams of an embodiment of an intelligent orchestration component facilitating an example an Artificial Intelligence augmented and adaptive interactive response loop between the example four Artificial Intelligence-based engines.

Figure 16:
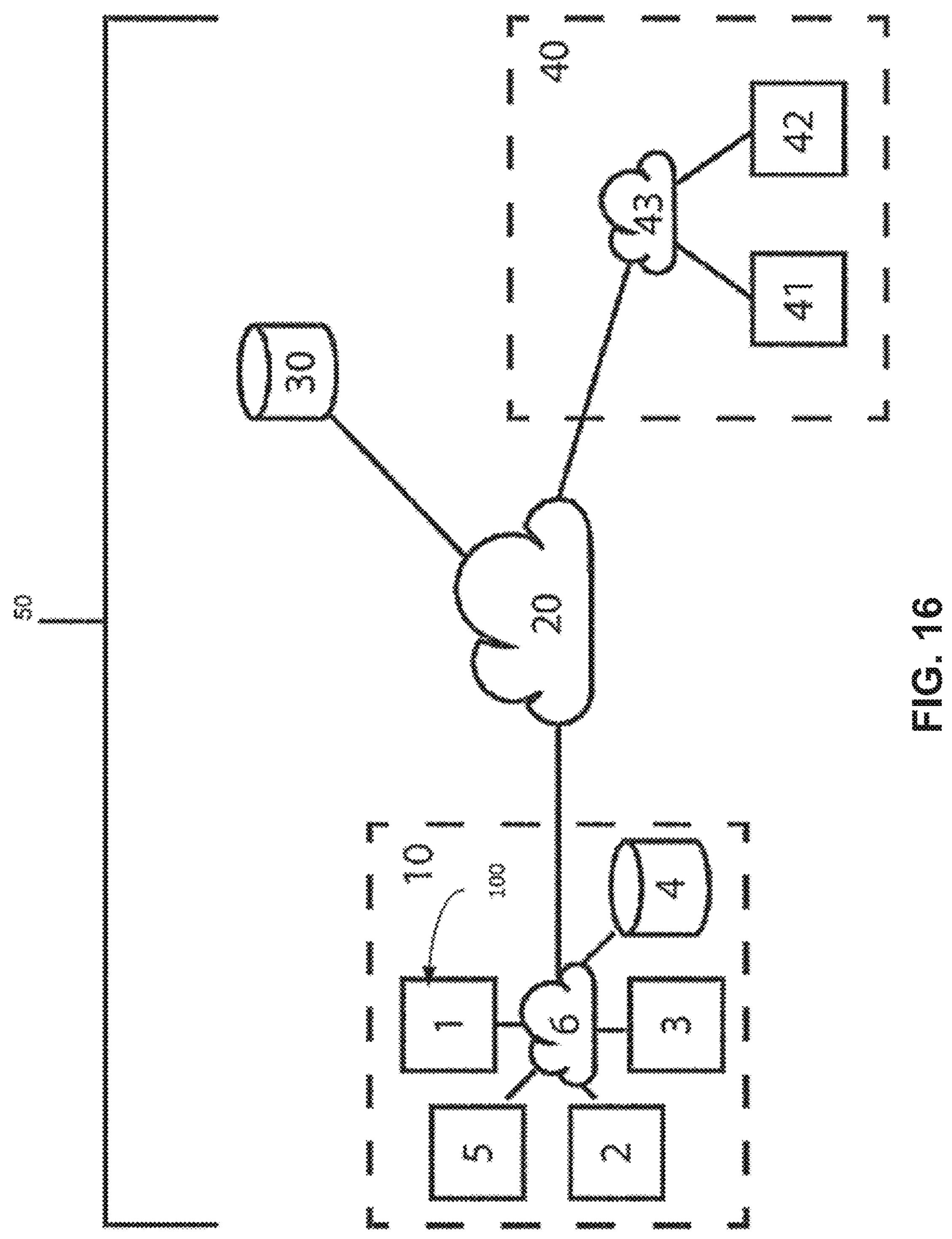

FIG. 16 illustrates a diagram of an embodiment of the cyber security restoration engine cooperating with the other Artificial Intelligence-based engines of in a cyber security appliance to track and understand the cyber threat identified by the other Artificial Intelligence-based engines as well as track the one or more mitigation actions taken to mitigate the cyber threat during the cyberattack by the other Artificial Intelligence-based engines in order to assist in intelligently restoring the protected system, while still mitigating the cyber threat attack, back to a trusted operational state.

Figure 17:
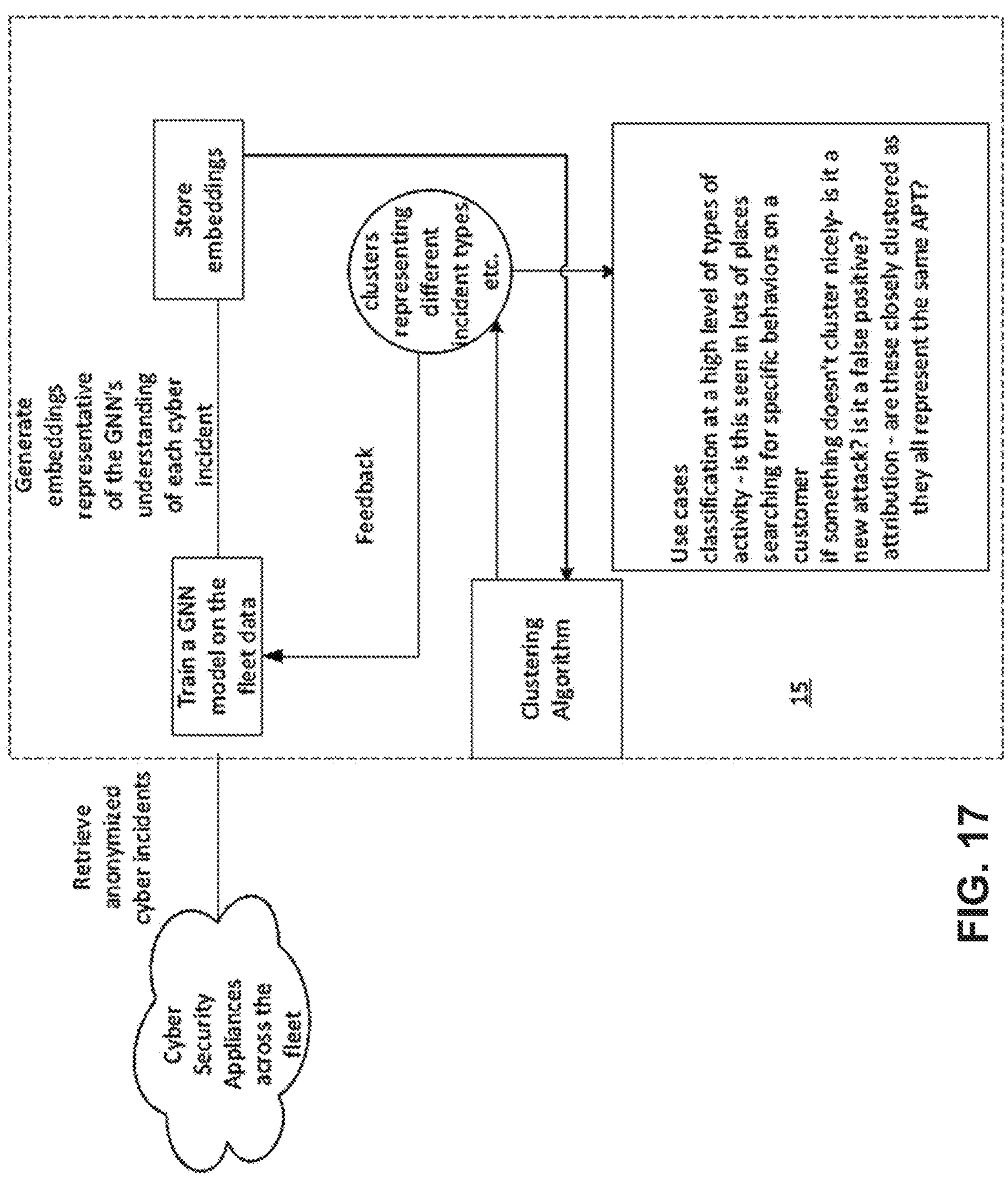

FIG. 17 illustrates a block diagram of an embodiment of the accumulator module in a web platform configured to communicate with the cyber security appliances across the fleet to gather data of understandings of cyber incidents analyzed by the cyber threat analyst module deployed in each cyber security appliance and feed the understandings of the historic cyber incidents in graph form to train a GNN model to identify suspicious activity in any ongoing cyber incidents.

Figure 18:
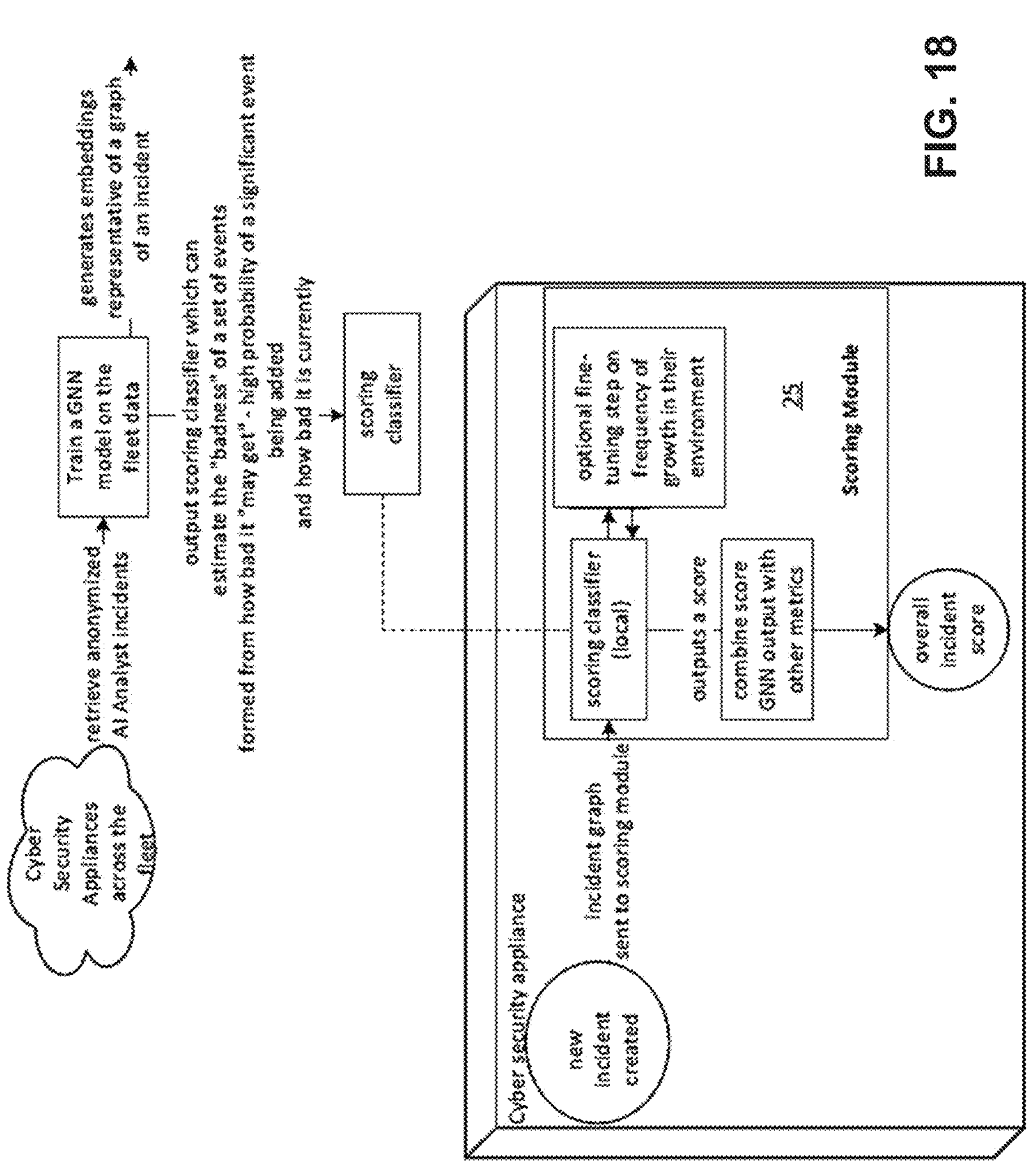

FIG. 18 illustrates a block diagram of an embodiment of the scoring module that contains a scoring classifier configured to monitor events including traffic and behavioral activity between entities in the ongoing cyber incident as well as the output from the GNN model.

Figure 19:
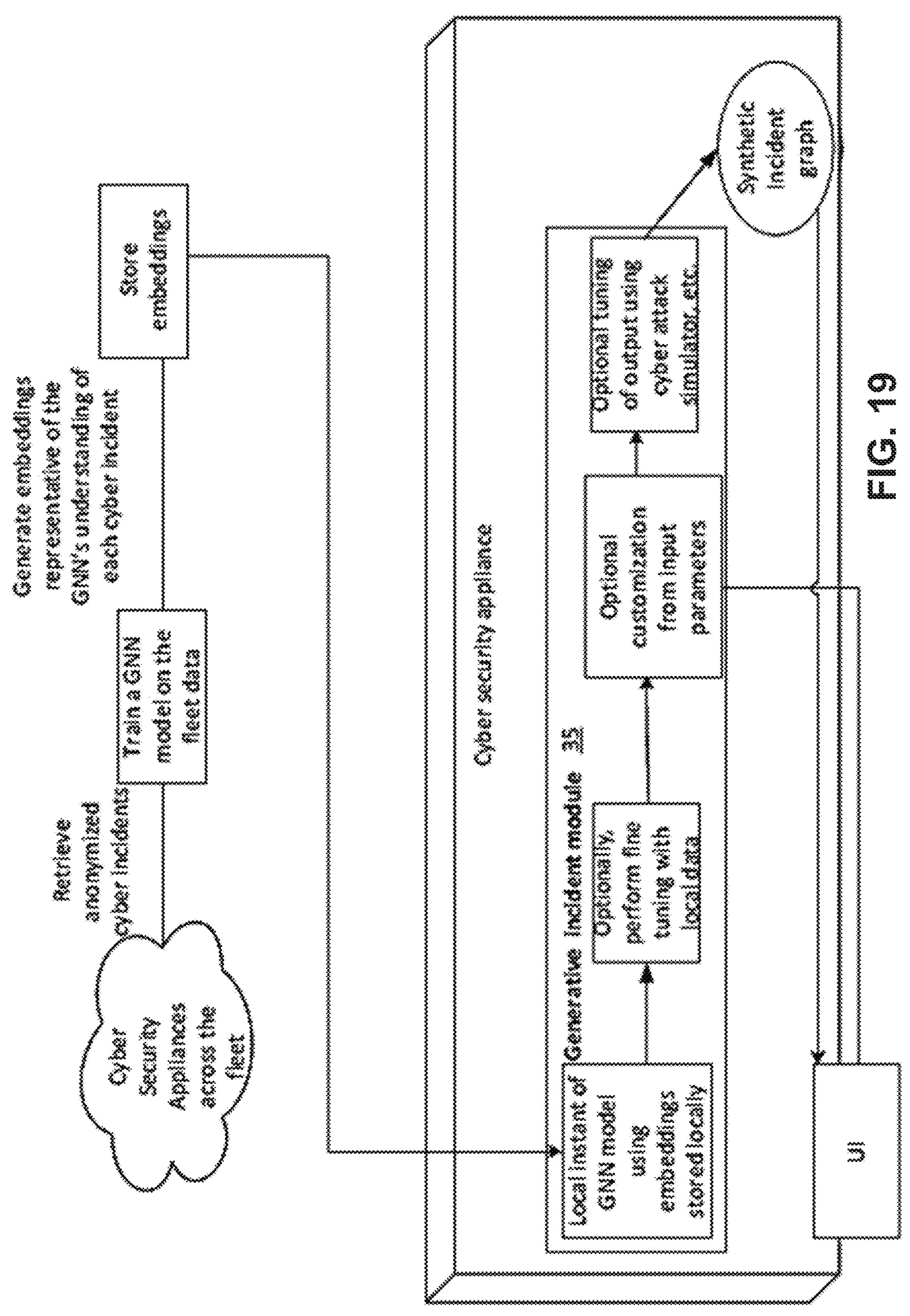

FIG. 19 illustrates a block diagram of an embodiment of the generative incident module configured to contain an instance of the GNN model and/or other Artificial Intelligence construct to use the embeddings.

Figure 20:
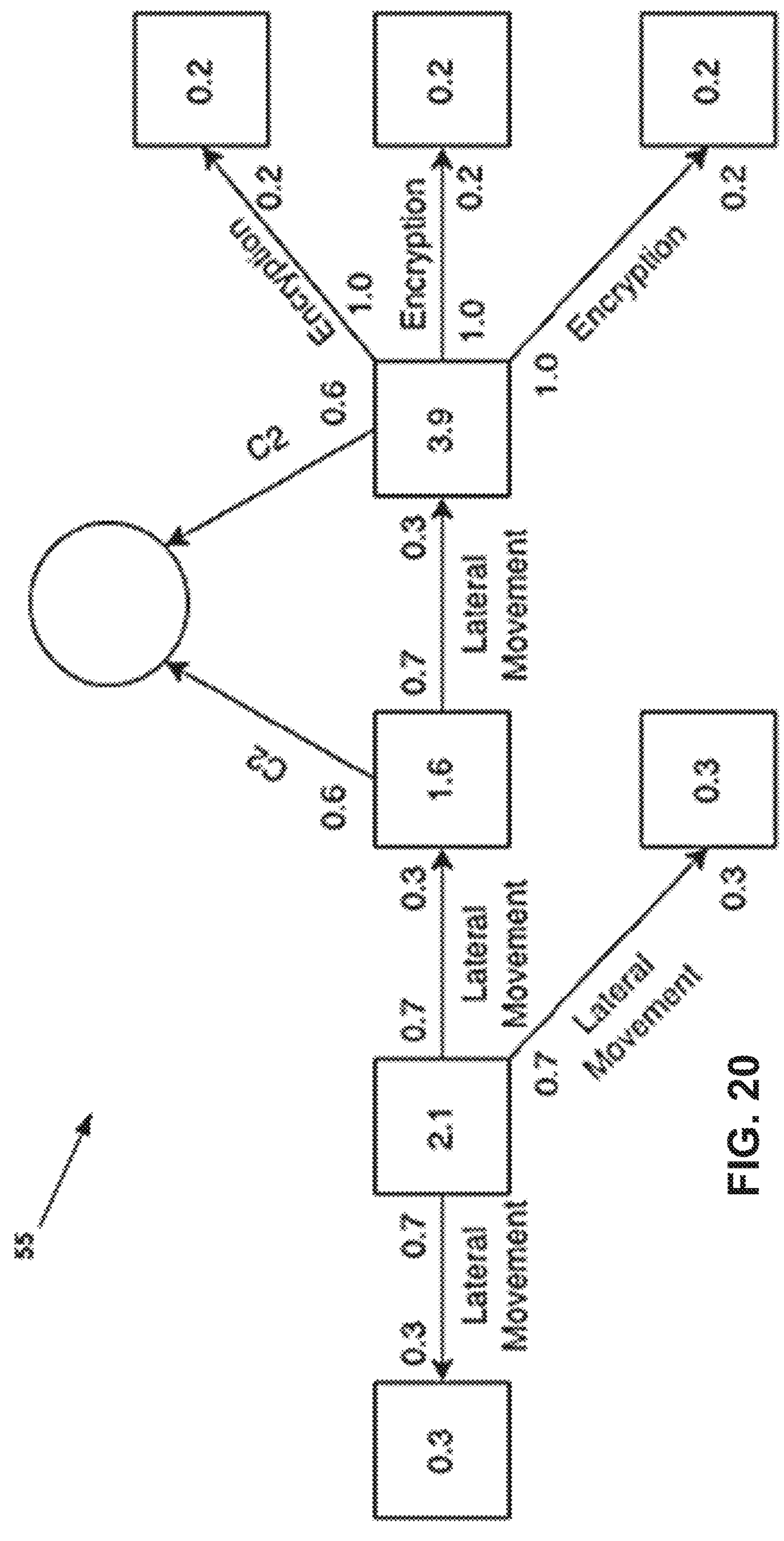

FIG. 20 illustrates an example graph of an embodiment of activity between entities, as nodes in a graph, such as lateral movements within a network and encryption of data in portions of the network interpreted and/or generated by the GNN model.

FIG. 21 is a flowchart of a method for a cyber security restoration engine configured to restore an asset in a computing network that is involved in a cyberattack to a trusted operational state and prioritize remediation actions for the asset in the computing network according to an embodiment.

FIG. 22 is a flowchart of a method for a cyber security restoration engine configured to restore an asset in a computing network that is involved in a cyberattack to a trusted operational state and prioritize remediation actions for the asset in the computing network according to an embodiment.

FIG. 23 is a schematic diagram of an apparatus for a cyber security restoration engine configured to restore an asset in a computing network that is involved in a cyberattack to a trusted operational state and prioritize remediation actions for the asset in the computing network according to an embodiment.

Figure 24:
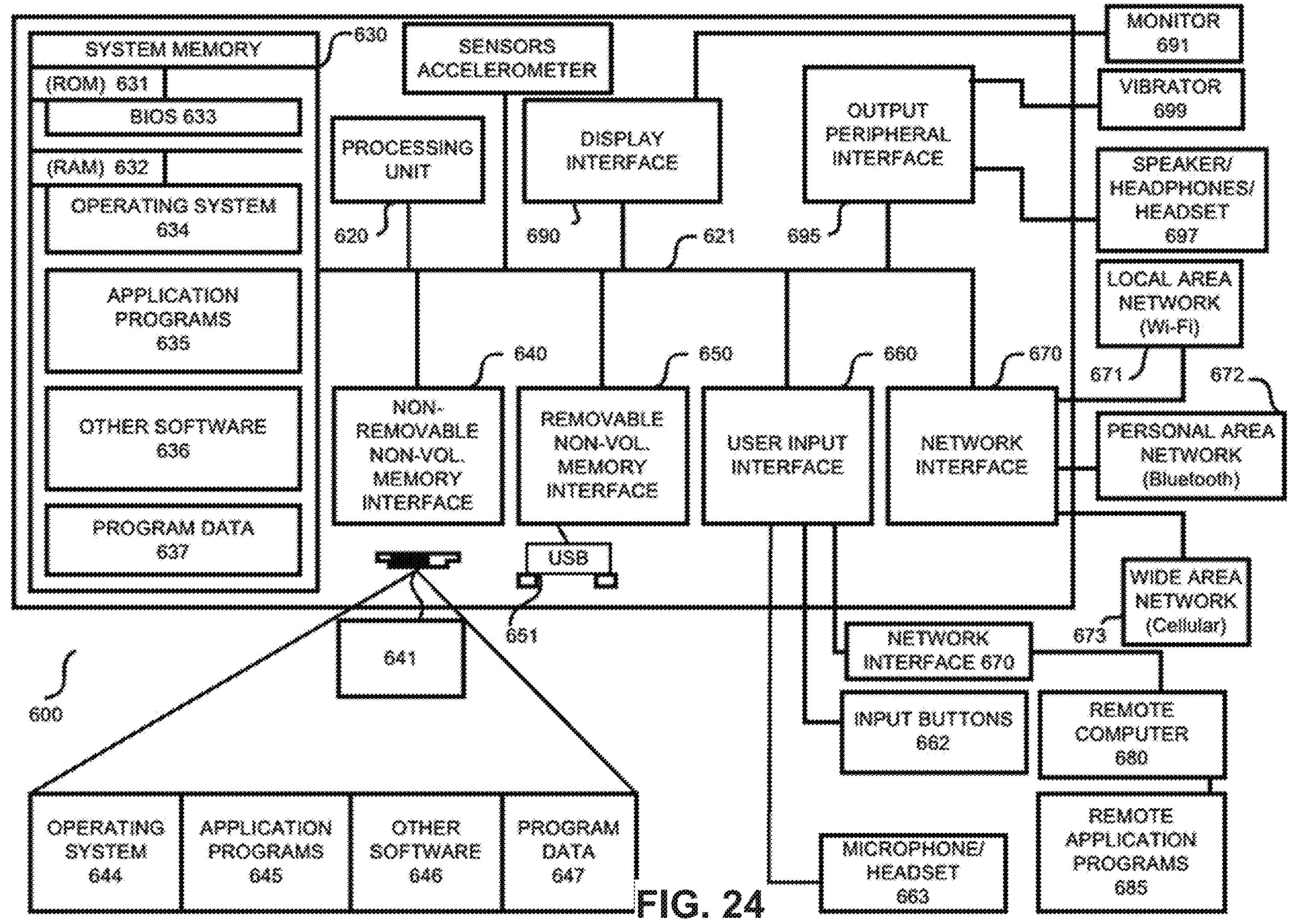

FIG. 24 illustrates a block diagram of an embodiment of one or more computing devices that can be a part of the Artificial Intelligence-based cyber security system including the multiple Artificial Intelligence-based engines discussed herein.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

As organizations become more accustomed to the significant and rapidly evolving cyber security threats in the world, they must put in place strategies to deal with those cyber security threats. Such strategies involve training members of the organization (such as IT team members, and indeed any other individual in the organization) on what to do in the event of a cyber security incident occurring in the future, as well as what to do once a cyber security incident occurs. Thus, there are two parts to consider. One part is the practicing of a response to a hypothetical cyber security incident. The second part is using a 'playbook' to assist with a reaction to a cyber incident in real life.

On the topic of practicing a response to a hypothetical cyber security incident, organizations can put in place different scenarios for their IT team to practice what they would do to respond to a cyber security incident. As discussed in more detail below, such training exercises can take the form of table top exercises and cyber ranges. There are significant limitations to such training exercises. A lot of effort needs to be put in place to set up such training exercises in the first place. As cyber threats rapidly evolve, so do the strategies needed to counter those cyber threats. This means that training exercises can quickly become out of date. It can take of order weeks to set up a training exercise and then significant burden is placed on individuals tasked with keeping the training exercise up to date. It is also difficult for the organization to understand what would realistically happen to their organization in the event of a cyber security incident because most training exercises are by their very nature hypothetical. Further, training exercises may not necessarily accurately predict what would likely happen to the organization in the event of a cyber security incident unfolding given the multiple factors at play such as the complex nature of the interactions between devices in the organization's computing network, the use of different cyber security tools with multiple possible configurations, and user behavior.

On the topic of using a 'playbook' to assist with a reaction to a cyber incident in real life, organizations face limitations because there is a limit on how many playbooks they can reasonably maintain and use because such playbooks can quickly become out of date as a result of the evolving cyber threat landscape. Further, an out of date playbook may not necessarily solve a particular cyber problem it is intended to address. There is also too much variety in larger cyber incidents to even imagine having playbooks that address these incidents directly. In the event of a large cyber incident, a human team may need to mix and match parts of other playbooks, or pick the least inappropriate parts, then work out themselves how to combine, adapt or extend the parts of the playbooks in order to address the cyber incident.

As such, there is a need for an improved approach to practicing of a response to a hypothetical cyber security incident, and an improved approach to using playbooks to assist with a reaction to a cyber incident in real life.

Certain techniques described herein involve the use of simulations to help train certain users for a wide variety of cyber incidents that could happen in the future. Improved training can improve the organization's cyber security and reduce or avoid the negative impacts associated with a cyber incident. Further, metrics derived from the training can be used to learn how different cyber security tool configurations affect the outcome of a simulated cyber security incident and thereby allow an optimum configuration to be used in real life.

Further, certain techniques described herein involve the creation and use of improved instructions that form, in effect, playbooks that are bespoke to the circumstances of a cyber security incident, as well as take into account the infrastructure of the organization's computing network. Thus, the organization is better placed to react to the cyber security incident in an optimum way.

One of more of these techniques may build on AI-based approaches to learn from real life cyber security incidents and apply those lessons in different circumstances and in different environments.

Cyber Security Appliance

Figure 1:
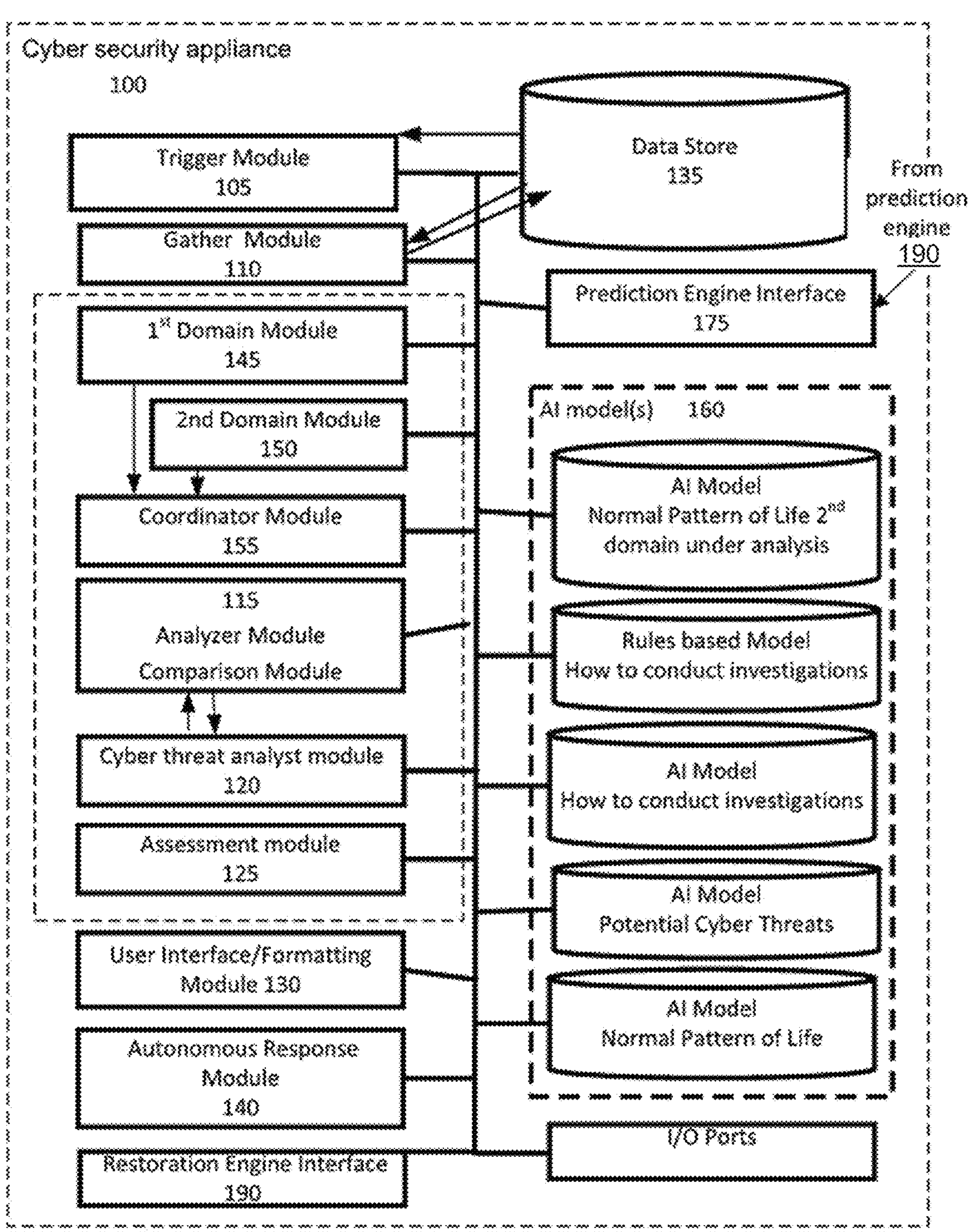
FIG. 1 illustrates a block diagram of an embodiment of the AI-based cyber security appliance with example components making up a detection engine that protects a system, including but not limited to a network/domain, from cyber threats.

FIG. 1 illustrates a block diagram of an embodiment of the AI-based cyber security appliance with example components making up a detection engine that protects a system, including but not limited to a network/domain, from cyber threats. Various Artificial Intelligence models and modules of the cyber security appliance 100 cooperate to protect a system, such as one or more networks/domains under analysis, from cyber threats. Any "module" described herein can equally be referred to as an "engine," and vice versa. As shown, according to one embodiment of the disclosure, the AI-based cyber security appliance 100 may include a trigger module 105, a gather module 110, an analyzer module 115, a cyber threat analyst module 120, an assessment module 125, a user interface formatting module 130, a data store 135, an autonomous response module 140, a first ($1^{st}$) domain module 145, a second ($2^{nd}$) domain module 150, and a coordinator module 155, one or more AI models 160 (hereinafter, AI model(s)"), and/or other modules. The AI model(s) 160 may be trained with machine learning on a normal pattern of life for entities in the network(s)/domain(s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms, a data store, an interface to an autonomous response engine, an interface to a restoration engine, an interface to a prediction engine, a 1st domain module, a 2nd domain module, and a coordinator module, and other similar components.

The cyber threat detection engine includes a set of modules cooperating with one or more Artificial Intelligence models configured to perform a machine-learned task of detecting a cyber threat incident. The detection engine uses the set of modules cooperating with the one or more Artificial Intelligence models to detect anomalous behavior of one or more nodes, including at least user accounts, devices, and versions of source code files, in a graph of a system being protected. The detection engine uses the set of modules cooperating with the one or more Artificial Intelligence models to prevent a cyber threat from compromising the nodes and/or spreading through the nodes of the system.

The cyber security appliance 100 with the Artificial Intelligence (AI)-based cyber security system may protect a network/domain from a cyber threat (insider attack, malicious files, malicious emails, etc.). In an embodiment, the cyber security appliance 100 can protect all of the devices on the network(s)/domain(s) being monitored by monitoring domain activity including communications). For example, a network domain module (e.g., first domain module 145) may communicate with network sensors to monitor network traffic going to and from the computing devices on the network as well as receive secure communications from software agents embedded in host computing devices/containers. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections. The data store 135 cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store 135. In addition, a feature classifier can examine and determine features in the data being analyzed into different categories.

The analyzer module 115 can cooperate with the AI model(s) 160 or other modules in the cyber security appliance 100 to confirm a presence of a cyberattack against one or more domains in an enterprise's system (e.g., see system/enterprise network 50 of FIG. 4). A process identifier in the analyzer module 115 can cooperate with the gather module 110 to collect any additional data and metrics to support a possible cyber threat hypothesis. Similarly, the cyber threat analyst module 120 can cooperate with the internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system. Herein, the cyber threat analyst module 120 and/or the analyzer module 115 can also monitor for other anomalies, such as model breaches, including, for example, deviations for a normal behavior of an entity, and other techniques discussed herein. As an illustrative example, the analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

According to one embodiment of the disclosure, the cyber threat analyst module 120 allows two levels of investigations of a cyber threat that may suggest a potential impending cyberattack. In a first level of investigation, the analyzer module 115 and AI model(s) 160 can rapidly detect and then the autonomous response module 140 will autonomously respond to overt and obvious cyberattacks. However, thousands to millions of low level anomalies occur in a domain under analysis all of the time; and thus, most other systems need to set the threshold of trying to detect a cyberattack by a cyber threat at level higher than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grace/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Note, a data analysis process can be algorithms/scripts written by humans to perform their function discussed herein; and can in various cases use AI classifiers as part of their operation. The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 160 trained with machine learning on the normal pattern of life of entities in the system. For example, as shown in FIG. 8, the cyber threat analyst module 120 may perform several additional rounds 220 of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Returning back to FIG. 1, an input from the cyber threat analyst module 120 of a supported hypothesis of a potential cyber threat will trigger the analyzer module 115 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 8 and a chain of linked low-level indicators, including abnormal behavior compared to the normal pattern of life for that entity, all under a score of 50 on a threat indicator score). The investigations by the cyber threat analyst module 120 can happen over a relatively long period of time and be far more in depth than the analyzer module 115 which will work with the other modules and AI model(s) 160 to confirm that a cyber threat has in fact been detected.

The gather module 110 may further extract data from the data store 135 at the request of the cyber threat analyst module 120 and/or analyzer module 115 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat. Again, the analyzer module 115 can cooperate with the AI model(s) 160 and/or other modules to rapidly detect and then cooperate with the autonomous response module 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 trained on a normal pattern of life for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc. a trigger to start an investigation from an external source.

Many other model breaches of the AI model(s) 160 trained with machine learning on the normal behavior of the system can send an input into the cyber threat analyst module 120 and/or the trigger module 105 to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 120 cooperating with the AI model(s) 160 trained with machine learning on how to form cyber threat hypotheses and how to conduct investigations for a cyber threat hypothesis in the AI-based cyber security appliance 100 provides an advantage as it reduces the time taken for human led or cyber security investigations, provides an alternative to manpower for small organizations and improves detection (and remediation) capabilities within the cyber security appliance 100.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 125 to generate a threat risk score that indicate a level of severity of the cyber threat.

The multiple Artificial Intelligence-based engines each have an interface to communicate with the other separate Artificial Intelligence-based engines. Each Intelligence-based engine has an interface to communicate with another separate Artificial Intelligence-based engine, which is configured to understand a type of information and communication that this other separate Artificial Intelligence-based engine needs to make determinations on an ongoing cyber-attack from that other Artificial Intelligence-based engine's perspective. The autonomous response engine works with the assessment module in the detection engine when the cyber threat is detected and autonomously takes one or more actions to mitigate the cyber threat. FIG. 1 shows the example components making up the detection engine to include interfaces to the prediction engine, the autonomous response engine, and the restoration engine.

The cyber threat detection engine can also have an anomaly alert system in a formatting module configured to report out anomalous incidents and events as well as the cyber threat detected to a display screen viewable by a human cyber-security professional. Each Artificial Intelligence-based engine has a rapid messaging system to communicate with a human cyber-security team to keep the human cyber-security team informed on actions autonomously taken and actions needing human approval to be taken.

Figure 2:
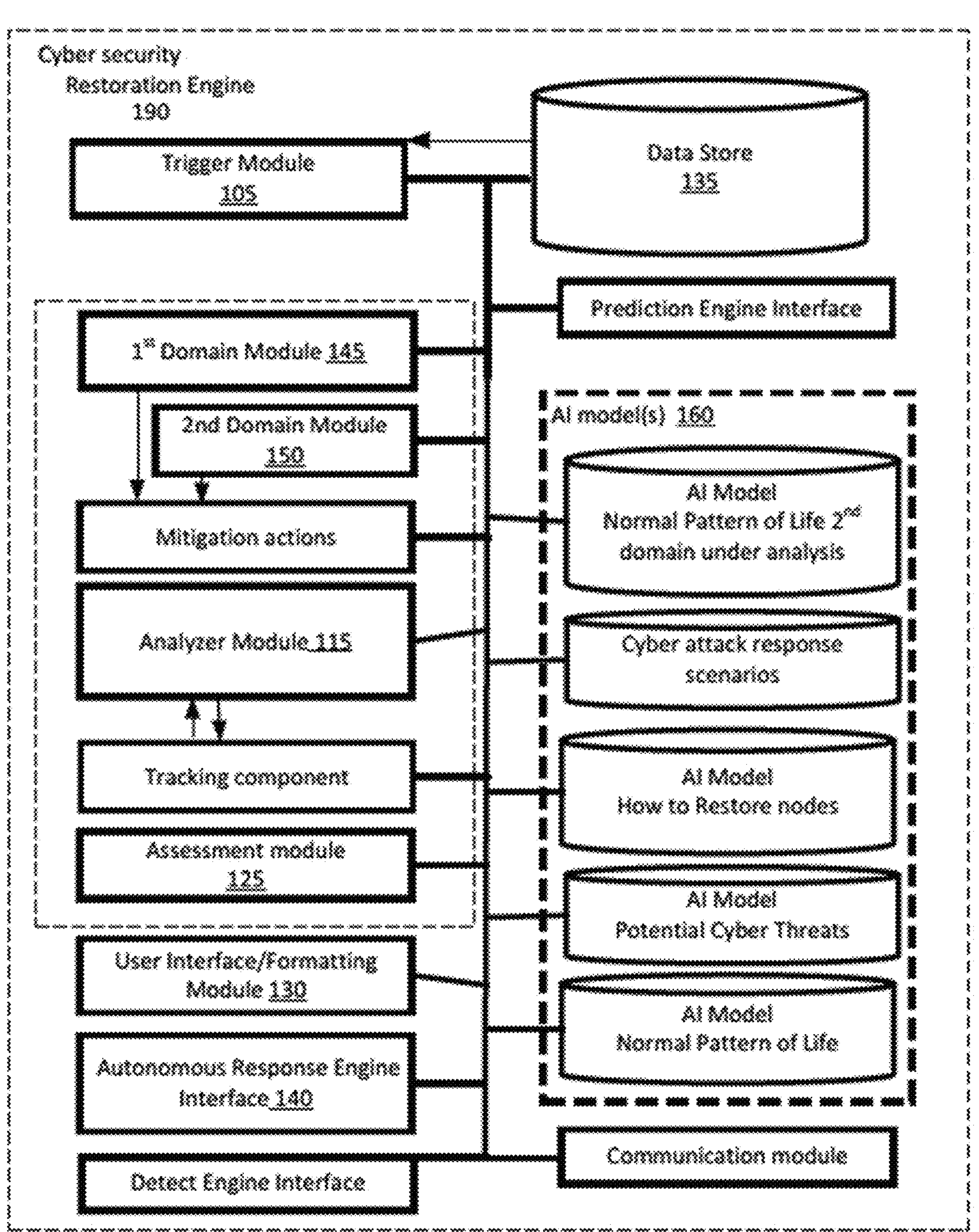
FIG. 2 illustrates a block diagram of an embodiment of the AI-based cyber security appliance with example components making up a cyber security restoration (e.g. self-healing) engine that takes one or more autonomous remediation actions to recover from a cyberattack from a cyber threat.

FIG. 2 illustrates a block diagram of an embodiment of the AI-based cyber security appliance with example components making up a cyber security restoration (e.g. self-healing) engine 190 (the interface to which is depicted in FIG. 1) that takes one or more autonomous remediation actions to recover from a cyberattack from a cyber threat. Note, similarly named components in the cyber security restoration engine can operate and function similar to as described for the detection engine.

The cyber security restoration engine 190 is configured to take one or more remediation actions based on configured and/or Artificial Intelligence assistance to remediate the one or more nodes in the graph of the system being protected back to a trusted operational state in a recovery from the cyber threat. These actions might be fully automatic, or require a specific human confirmation decision before they begin.

The cyber security restoration engine 190 is configured to cooperate with the other AI-based engines of the cyber security system, via the interfaces and/or direct integrations, to track and understand the cyber threat identified by the other components as well as track the one or more mitigation actions taken to mitigate the cyber threat during the cyber-attack by the other components in order to assist in intelligently restoring the protected system while still mitigating the cyber threat attack back to a trusted operational state; and thus, as a situation develops with an ongoing cyberattack, the cyber security restoration engine is configured to take one or more remediation actions to remediate (e.g. restore) at least one of the nodes in the graph of the protected system back to a trusted operational state while the cyberattack is still ongoing.

The cyber security restoration engine has a tracking component that includes at least one of i) a database to keep a record and track an operational state of each node in the graph of the protected system, ii) an Artificial Intelligence model trained to track the operational state of each node in the graph of the protected system, iii) a query to another artificial intelligence based engine that tracks the operational state of each node in the graph of the protected system from a different perspective, and iv) a combination of any of these, so that the cyber security restoration engine can then take the one or more autonomous remediation actions to remediate each particular node (e.g. user account and/or device) back to a trusted operational state for that node.

The cyber security restoration engine can cooperate with the other Artificial Intelligence-based engines of the cyber security system to track and understand the cyber threat identified by the other Artificial Intelligence-based engines (detection engine and/or the prediction engine) as well as track the one or more mitigation actions taken to mitigate the cyber threat during the cyberattack by an autonomous response engine and/or human cyber security team members in order to assist in intelligently restoring the protected system while still mitigating the cyber threat attack back to a trusted operational state. Thus, as a situation develops with an ongoing cyberattack, the cyber security restoration engine is configured to take the one or more remediation actions to remediate at least one of the nodes in the graph of the protected system back to a trusted operational state to restore portions of the protected system while the cyberattack is still ongoing. The cyber security restoration engine restores the affected nodes in the protected system by using incident modelling in the cyber threat analyst module (e.g. AI Analyst) to map and identify an entire lifecycle of attack, work with the AI models trained on cyber security threats in the detection engine to identify a source of the cyberattack, and recommend restore points (e.g. where in the protected system remediation action is needed).

The communication module can cooperate with the cyber security restoration engine to communicate with the other Artificial Intelligence-based engines of the cyber security system. Again, the machine-learned tasks of the other Artificial Intelligence-based engines can include i) identifying the cyber threat itself and ii) taking one or more mitigation actions to mitigate the cyber threat during a cyberattack by the cyber threat. The communication module also communicates with one or more third party external backup and/or recovery services and systems to invoke backup remediation actions and recovery remediation actions to remediate the nodes from the cyber threat back to a trusted operational state, for example but not limited to the state before the detected compromise by the cyber threat occurred in the protected system. For example, the cyber security restoration engine can send a command to third party back up providers to invoke a full backup of a complete copy of all the files, folders, and operational settings for a device in the system. The cyber security restoration engine can use one or more Application Programming Interfaces (APIs) to translate desired remediation actions for the particular nodes in the system (e.g. its devices from potentially multiple different vendors, user accounts, etc.) being protected devices into a specific language and syntax utilized by the third party external backup and/or recovery services and systems to invoke the backup remediation actions and recovery remediation actions to remediate the nodes. In addition, the cyber security restoration engine can send a request to the human cyber security team to take similar actions where it has no direct capability to do so itself but can recommend the remediation and recovery steps. The cyber security restoration engine can also prioritize the recommended remediation and recovery steps to enable the most efficient recovery of the system. In another example, the external 3rd party backup and/or recovery services and systems can include, for example, cloud data recovery, desktop and server backups to take disk images of hardware to restore all of the settings and data prior to an attack, and other forms of salvaging deleted, inaccessible, lost, corrupted, damaged, or formatted data and operational settings from these recovery services, switching to back up systems when the main system has been disrupted, etc.

All of the Artificial Intelligence-based engines are configured to have bi-directional communications with the other Artificial Intelligence-based engines as well as with agents and sensors within the protected system under analysis. The communication module can use an instant messaging application between the cyber security restoration engine and members of a human cyber security team to report autonomous remediation actions taken by the cyber security restoration engine to restore the one or more nodes as well as proposed remediation actions needing the human cyber security team's authorization to remediate the one or more nodes in the protected system back to a trusted operational state. It may also use similar messaging applications to inform IT teams or other relevant but non cyber security teams that they need to take actions.

The cyber security restoration engine can reference both i) a database of restoration response scenarios stored in the database and ii) a prediction engine configured to run Artificial Intelligence-based simulations and use the operational state of each node in the graph of the protected system during simulations of cyberattacks on the protected system to restore 1) each node compromised by the cyber threat and 2) promote protection of the corresponding nodes adjacent to a compromised node in the graph of the protected system.

The cyber security restoration engine can prioritize among the one or more nodes to restore, which nodes to remediate and an order of the nodes to remediate. This can be done using a graph based representation of a cyber attack and using information stored in the graph as metadata that is derived by the restoration engine or other artificial intelligence based modules of the cyber security system.

A cyber security restoration engine may be configured with software code and electronic hardware to take one or more autonomous remediation actions to remediate one or more nodes in a graph of a system being protected back to a trusted operational state in order to assist in a recovery from the cyber threat. The cyber security restoration engine may have a tracking component for the operational state of each node in the graph of the protected system. The communication module may also cooperate with the cyber security restoration engine to communicate with at least one of an external backup system and a recovery service to invoke backup remediation actions and/or recovery remediation actions to remediate one or more nodes potentially compromised by the cyber threat back to a trusted operational state, for example the state before the detected compromise by the cyber threat occurred in the protected system.

Autonomous Remediation

FIG. 3A illustrates a block diagram of an embodiment of the cyber security restoration engine configured to take one or more autonomous remediation actions based on Artificial Intelligence assistance to remediate one or more nodes in the graph of the system being protected back to the trusted operational state before a detected compromise by a cyber threat occurred in the protected system in order to assist in a recovery from the cyber threat.

As discussed, the communication module can be configured to communicate also with one or more external 3rd party backup and/or recovery services and systems to invoke backup remediation actions and recovery remediation actions to remediate the nodes from the cyber threat and restore likely affected users and devices in the protected system back to a trusted operational state. The external 3rd party backup and/or recovery services and systems receive instructions from the cyber security restoration engine to invoke specific and tailored backup remediation actions and recovery remediation actions to remediate the nodes from the cyber threat while still containing the cyber threat itself. As shown, the cyber security restoration engine can generate and maintain a graph of nodes making up the system under analysis.

FIG. 3B illustrates a graph 300 of nodes 301 in a computer network or system that are involved in a cyber attack. The nodes 301 that are involved in a cyber attack may be determined by Artificial Intelligence models by looking at deviations from a normal pattern of life, as described elsewhere herein. The cyber security restoration engine may communicate with these Artificial Intelligence modules to generate and maintain graph 300 when it is determined that a cyber attack is occurring as well as throughout the evolution of a cyber attack, for example as more devices on a network become infected by malware or are targeted during a cyber attack.

Nodes 301 may represent devices within a computer network or system, user accounts, virtual computers, or any other discrete entities of a network. Nodes 301 are connected by edges 303, which represent and interaction between two nodes 301. The interaction may involve a lateral movement of data or software (especially malware) between the two nodes, an encryption of one node by the other, or a command and control interaction of one node by the other, for example. Data need not necessarily be transferred in an interaction. It will also be appreciated that an edge may link a node within the computer network being protected with an external endpoint, such as when data is being sent from a device within the computer network being protected and an external endpoint.

The interactions represented by an edge are the output of an analysis of the node behavior by an artificial intelligence module of the cyber security system and, in effect, is a summary or overview of what that interaction is. The edge does not necessarily just represent a single communication between two nodes. That is, not every communication between two nodes is represented by an individual edge. Indeed, some communications, not deemed reportable or abnormal by a cyber threat detection engine (i.e., they are within the normal pattern of life) will not have any corresponding edge at all. Generally, each edge will represent a plurality of individual communications between two nodes considered reportable or abnormal that are related to give an overall interaction, such as an "encryption" or "lateral movement (of data or in particular malware)" interaction. In some cases, an edge may represent an activity (or series of activities) that have already occurred. However, an edge may also represent an ongoing interaction, such as a node that is in the process of encrypting another node.

Metadata about the interaction represented by an edge is stored within the graph, and this metadata is used by the restoration engine to prioritize nodes for restoration (also called healing). In one simple example, three bits of metadata are stored with each edge: the type of interaction, the source node, and the target node. This metadata is represented in FIG. 3B by the arrows (representing which of the two nodes connected by the edge is the source node and which is the target node, with the arrow pointing from the source node to the target node) and the labels (specifying the interaction type).

From this metadata, the restoration engine can construct, for each node, a severity score for each of the edges connected to that node. For example, in graph 300, node B has three edges connected to it, edge BA (connecting node B with node A), edge BC (connecting node B with node C), and edge BD (connecting node B with node D). The restoration engine can determine a severity score for each edge BA, BC, and BD based on the metadata associated with each of these edges.

Considering edge BA, the metadata indicates that this interaction is a "lateral movement" type of interaction, with node B as the source and node A as the target (i.e., destination of the data or malware). The restoration engine can use this information to assign a severity score of 0.7 to edge BA. Edges BD and BC are both the same type of interaction ("lateral movement" types with node B as the source), and so these edges are also assigned scores of 0.7. Once all of the edges connected to a node have had a severity score assigned to them by the restoration engine, the restoration engine can determine an overall severity score for the node. For node B, this can be determined by summing up the severity scores for edges BA, BC, and BD, giving 0.7+0.7+0.7=2.1. Therefore, the severity score of node B is 2.1. It should be noted that in this example the severity scores of the edges are summed, in general, they may be combined in some other way, such as an exponential decay of severity scores moving away from a given node.

This process is repeated for each node of the network being protected within graph 300 (i.e., excluding external endpoints etc.) to give each node a severity score. It is noted that an edge may be assigned different severity scores when determining the severity score of each of the two nodes it connects. For example, as noted above, when determining the severity score for node B then edge BA was assigned a severity score of 0.7. However, when determining a severity score for node A, the edge connecting node A with node B (which can be labelled edge AB, for convenience, to distinguish from the discussion in relation to the same edge but when determining the severity score of node B above), has a severity score of 0.3 assigned to it because the metadata indicates that node A is the target of the "lateral movement" interaction. Therefore, it can be seen how the edge connecting nodes A and B may be assigned different severity scores depending upon which node is currently having it's severity score being determined. Usually, the source of an interaction will be assigned a higher score (from that interaction) than the target of an interaction. In FIG. 3B, the severity scores of the edges are placed proximal to the node to which they correspond for clarity.

It should be noted that two nodes may be connected by two distinct edges if two types of interaction are ongoing or have occurred between them. For example, a first edge corresponding to a "lateral movement" interaction may represent movement of data from a first node to a second node, while a distinct, second edge corresponding to an "encryption" interaction may represent encryption of the first node by the second node.

Returning to FIG. 3B, while a "lateral movement" interaction is given a severity score of 0.7 or 0.3 depending upon whether a node is the source of the target of the interaction, different types of interaction may be assigned different severity scores. For example, in graph 300, the source of an "encryption" interaction (e.g., node F) may have 1.0 contributed to its overall severity score by that edge, while the target of an "encryption" interaction (e.g., nodes G, H and I) may have 0.2 contributed to its overall severity score by that edge.

The different weightings given to different types of interaction will depend upon whether a node is the source or target of that interaction and can be preset, but may also be adaptable. In particular, artificial intelligence modules of the restoration engine may learn from past cyber attacks how effective different actions and sequences of actions were to remediate and restore compromised nodes and adjust the weights assigned to different types of interaction accordingly.

Once every node has a severity score assigned to it, the nodes can then be ranked in order of their severity scores to give a prioritization order for remediation. For example, the nodes of graph 300 would be ranked in the following order: F (score 3.9), B (score 2.1), D (score 1.6), A (score 0.3), C (score 0.3), G (score 0.2), H (score 0.2), I (score 0.2). In this way, remediation actions can be performed in the most effective and efficient manner, beginning with remediation actions targeting node F.

For instance, in the example graph of FIG. 3B, the following course of action may be performed based on the priority order determined by the restoration engine.

1. Heal the node F. This node has the highest score because it is encrypting multiple other nodes (G, H and I). It is clearly infected and actively doing damage.
2. Heal the node B. This node has the second highest score because it is moving data laterally to multiple other nodes (A, C and D). It is actively spreading the infection through the network.
3. Heal the node D. This node has the third highest score because it is making command and control connections and performing some lateral movement to node F. It is likely infected and may continue to spread the infection further.
4. Heal nodes A and C. These nodes have the fourth highest scores because they have been targets of lateral movement but are not exhibiting signs of compromise themselves (no edges represent interactions with these nodes as the source). However, these nodes may be infected and could spread the infection further.
5. Heal the nodes G, H and I. These nodes have the lowest severity score because they have been targets of encryption. However, they are likely not compromised themselves, and so do not need to be addressed quickly, but still ultimately need to be restored.

As illustrated by the above example, the prioritization order output by the restoration engine intrinsically accounts for dependencies. For example, in order to heal an encrypted node, the node encrypting it should be healed first, otherwise it may simply re-encrypt the recently healed node. By assigning the severity scores based on the metadata of the edges, taking into account the type of interaction and whether a node is the source or the target of the interaction, these dependencies are accounted for. As can be seen in the example above, the nodes being encrypted (G, H and I) are a lower priority than the node doing the encryption (node F). This is because the restoration engine assigns a higher severity score to the node doing the encryption (determined from the metadata of the edge) than to the node being encrypted (again, determined from the metadata of the edge).

Other information may also be stored in the metadata associated with an edge or taken into account by the restoration engine. In particular, the metadata may comprise information about a node connected to an edge or about the edge itself from one of the other AI engines in the cyber security system.

The cyber security restoration engine may be in communication with the autonomous response engine and receive information regarding any actions that have been automatically taken by the autonomous response engine. This information may be received by the restoration engine and incorporated into the metadata of the graph 300. For example, an autonomous response engine may have quarantined a compromised node. This information can be included in the metadata of the edges connected to this node and may lead to a lower severity score being assigned to those edges (because the node is quarantined and so cannot cause further damage, compared to other, unquarantined nodes).

Similarly, the cyber security restoration engine may be in communication with a user interface module capable of receiving input from a human cyber security operative. This allows the human cyber security operative to input details about any response actions they have taken that the cyber security system may not be aware of otherwise (for example, physically removing a computer from a suspected inside attacker). This information can then be incorporated into the metadata in a similar way to information about any autonomous response actions as described above.

The cyber security restoration engine may also be in communication with the cyber security prediction engine, which is configured to predict and simulate cyber attacks as described herein. From the prediction engine, the restoration engine can receive information regarding the vulnerability of nodes to cyber attacks and the importance of a node in terms of the potential damage or harm an attacker could cause if that node were compromised. This information can, again, be incorporated into the metadata associated with the edges of graph 300. For example, metadata indicating a node is vulnerable to an attack may lead to an increase in the severity score for edges connecting to that node, particularly for interactions having the vulnerable node as the target of the interaction. Similarly, metadata indicating that a node is important because a large amount of harm could be caused if that node were compromised may also lead to an increase in the severity score for edges connecting to that node, again, particularly for interactions having the important node as a target of the interaction.

As discussed elsewhere, the restoration engine is configured to be able to autonomously perform restoration actions as well as determine restoration and remediation actions that require a human operator to perform or approve the actions. Based on the analysis of the cyber attack performed by the detect and response engines, as well as its own analysis of the cyber attack, the restoration engine can determine remediation actions and estimate a time required to complete each of the remediation actions. The time required to complete a remediation action may be factored into the prioritization order.

Returning to FIG. 3B as an example, nodes A and C both have the same severity score (0.3) and so would be prioritized equally. However, based on the restoration engine's knowledge of these nodes (e.g., a type of node, a size, architecture, network connectivity, bandwidth etc.) the restoration engine may know that it would take less time to heal node A than node C. Therefore, the restoration engine will prioritize healing node A over node C, as this will lead to fewer nodes being compromised for so long.

As previously discussed, the restoration engine may have a user interface module (see FIG. 2). This enables the restoration engine to output the prioritization information to a human cyber security operative. For example, the user interface may enable an ordered list of nodes to be presented to a user based on their prioritization. This will enable the cyber security operative to take the appropriate action to restore the computer system under attack in an efficient and effective manner.

The user interface module may further be configured to present to the user the severity scores for each node, as well as an indication of the factors contributing to the severity score. This can be particularly beneficial in instances where a human has taken actions that the cyber security system is not aware of. This is because, by transparently indicating how the restoration engine arrived at the severity scores and the prioritizations it determined, it allows the human cyber security operative to obtain an unbiased and informed view of the restoration engines understanding of the situation with enough information that the human cyber security operative can determine whether that understanding is accurate in view of any action they themselves have taken. If it is not accurate, because the human cyber security operative is aware of additional actions that have been performed, the user interface may be configured to enable the human cyber security operative to input information about the actions that have been taken, which the restoration engine can then use to update the prioritization accordingly, as discussed above.

In particular examples, the user interface module presents, for each node, the severity scores that have been combined to give rise to the overall severity score of that node. Alternatively or in addition, the user interface module presents, for each node, a description of the interaction represented by each of the nodes connected to that node or an overall natural language description of why that node has a high or low prioritization. For example, the user may be presented with text such as "Node F is encrypting multiple other nodes (G, H and I). There is a high confidence that it is infected and actively doing damage." This can enable human operatives to transparently understand the recommendations being provided to them by the restoration engine.

Alongside the prioritization of the nodes, the user interface can present remediation actions for a human to perform or authorize. The remediation actions may be based on the prioritization order determined by the restoration engine, the metadata within the graph of the cyber incident, and/or a high level, artificial intelligence classification of the cyber incident by the restoration engine, as discussed subsequently. These may be in the form of one or more "playbooks." Each playbook is a series of steps and actions to be performed by a human cyber security operative and/or the restoration engine in order to fully restore a node and/or an entire system.

Some incidents may look identical from the point of view of the cyber security system on the network, but may require different remediation actions depending upon details not available to the cyber security system. In this case, the user interface may request further input from a human cyber security operative or may present different options for the human cyber security operative to select from, depending upon the additional knowledge they have. For instance, a cyber attack may look the same but require different remediation actions to be performed depending upon whether it is an insider threat by a malicious party within the organization, an accidental threat by an ignorant or careless party within the organization, or an external threat. The user interface module may, therefore, present three playbooks and ask a human cyber security operative to select the appropriate playbook.

Thus, the cyber-security restoration engine in the cyber security system determines the order of what files/devices/things should be healed first, leveraging knowledge from AI Analyst incidents, and performing a scoring algorithm that takes the type of action that happened to the object and its degree in determining its score. The cyber-security restoration engine has Artificial Intelligence/machine learning trained on how to—prioritize and confirm restoration of network devices/users/things in the network in response to a cyber attack while still mitigating the cyber threat. The cyber-security restoration engine determines the order of what files/devices/things should be healed first, leveraging knowledge from AI Analyst incidents, and performing a scoring algorithm that takes the type of action that happened to the object and its degree in determining its score. The cyber-security restoration engine in the cyber security system can use intelligence on prioritization and confirmation the order of what files/devices/things should be healed first in this network after a cyber attack is detected and mitigated in order to restore the network to a desired condition before the cyber attack occurred.

The cyber-security restoration engine can then use time series prediction machine learning models applied to network activity to detect whether it has been healed successfully. After a device has been restored from backup this is done to check that it is behaving as expected. This could be done by computing the difference between the network activity previously seen on the device and the expected network activity. In the cyber-security restoration engine, the artificial intelligence can use various methodologies to understand what should be healed first when a cyber attack/a compromise has been detected on one or more devices in the network. An example way that the system prioritizes is utilizing scores of importance and damage, etc. derived from the prevent component running simulations of the cyber attack and subsequent recovery and, where the compromised devices fall in the overall compromise. For example, was this network device, the one that connected to all of the others network devices and spread ransomware to them during the simulations of the cyber attack; and thus, isolating that device and limiting types of communication from network devices connected downstream of the original compromised network device will determine the prioritization. The cyber-security restoration engine can pull that information, from the AI analyst incident information about how the cyber attack did or is predicted to unfold and then factoring in knowing an importance and damage and exposure metrics from a prevent component pull to create a method of scoring. The cyber-security restoration engine determines things like what should be prioritized for healing (e.g. remediation) whether that is restoring a backup save, rolling back (e.g. removing) or restoring network users' permissions back to a point zero in order to recover from the cyber attack while still mitigating the detected cyber attack to minimize times that a portion of the network is down due to the cyber attack. The cyber-security restoration engine can use time series prediction machine learning models. The cyber-security restoration engine can look at the predicted network behavior of the device(s) on a normal timeframe, for example, a time window of seven days of what we would expect each device to do. The cyber-security restoration engine can then compare that predicted network behavior of the device(s) on a normal timeframe to the state of devices as a result of the cyber attack and obtain prioritization data. The cyber-security restoration engine determines essentially what devices/users/things should be healed (either fully or mostly restored) first and any required order of the healing and restoration, and the extent the restoration of permissions and connections need to be restored during the restoration process while still mitigating the threat from the cyber attack. The cyber-security restoration engine assists in determining a restoration process and automatically performing the restoration and/or at least presenting the restoration process to a user on a display screen, saving an actual human hours of precious time trying to figure out how to prioritize the devices/users/things from this particular cyber attack.

The cyber-security restoration engine performs higher level incident classification and analysis by using a graph neural networks. An AI Cyber Analyst can identify complex cross-entity by using graph-based analysis. While these resulting incidents successfully capture complex compromises, since they contain multiple different components, it is often difficult to give a given incident an overall description, or to determine the kind of overall compromise or malware involved. The recent development of graph neural networks allows the creation of models that specifically operate on graphs—for instance, models that classify graphs based on their properties. As a result, by training such a model on the subgraphs associated with incidents, the model can classify subgraphs associated with types of incidents, identifying an overall description, highlighting the kinds of overall activity involved, and aiding in the suggestion of remediation steps. The model can perform graph-based meta analysis of events and then graph a neural network on that. The system trains machine learning algorithms on graphs to try and classify those graphs into associated categories of graphs, so when an incident in a network with the AI analyst deployed occurs, it can analyze the series of nodes in the graph, such as boundary network devices and/or endpoint computing devices connected together by linking factors. The neural network is trained on those structures to try and derive an overall shape what it thinks that incident is. For example, linking factors on each of the nodes and the labels on the edges are analyzed, the model thinks this is ransomware, which was confirmed through supervised learning and then derive an overall type of incident and then suggest appropriate remediation actions. The system creates the shape of the incident through a graph neural network in order to correlate that to a type and/or category of that incident. The system then takes the next step to suggest the appropriate actions to take and present a title to explain it to an end user.

Thus, the cyber-security restoration engine creates a graph based analysis/representation of a cyber security incident in order to determine/create a priority of restoration/recovery of assets (e.g. devices and user privileges) during and after the cyber security incident. The cyber-security restoration engine uses a pre existing graphical representation of the cyber incident to recommend recovery from the cyber incident utilizing machine learning approaches to both, summarize that incident structure in an understandable format, and to recommend 1) based upon machine learning approaches and/or 2) based upon a kind of weighted system, i) the most appropriate way to recover from that in that cyber incident, ii) the highest priority nodes within that cyber incident to which to address and iii) also to recommend a course of action. If the cyber-security restoration engine is not able to, with which both the cyber-security restoration engine may take and the user may take and taking also into account input from other systems that may be part of the cyber security platform (e.g. the prediction engine, the autonomous response engine, etc.), including whether then any of the assets involved in this, the ongoing side of instant under any kind of respond control, or may choose to the instant may spread further, based upon sort of known aspects from these other parts of the cyber security platform (e.g. the prediction engine, the autonomous response engine, etc.). The cyber-security restoration engine from a cyber threat attack can have a prioritization module/component to help to derive from a high level AI graph representation of an incident the tailored recommended steps to recover the network assets (e.g. devices and privileges associated with a user) involved, and an unbiased view of the most effective priority order to restore those assets in light of the occurring cyber attack. The cyber-security restoration engine can, via its user interface present a graph based analysis/representation of a cyber security incident in order to determine/create a priority of restoration/recovery of devices and user privileges during and after the cyber security incident. that provides guidance to a human (and/or actually take autonomous restoration steps itself) for the types of steps the system might want to take knowing the exact details of this particular network being protected by a cyber security appliance, helping to inform what types of steps the system might want to take to restore and recover from that particular cyber attack and then be able to classify on top of that what is actually happened so that it can be understood. The cyber-security restoration engine produces a high level representation of an incident that allows a user to then do further analysis both using more AI and in other ways that will help you assess that ongoing cyber attack incident, and ultimately respond to the cyber attack to restore assets during the cyber attack to restore components and abilities while still mitigating the cyber threat causing the cyber attack itself, and heal the assets in the network being protected by the cyber security appliance. The cyber-security restoration engine uses the information that different components in the cyber security system derived from the cyber attack and information already known about that particular network under attack and using AI in the restoration engine to generate an abstraction graph of that cyber incident on the nodes making up the assets of the particular network under attack, and then taking in that information and using that information to determine what kind of prioritizing (priority order and extent of privileges and/or capabilities) restored is applied that particular asset in light of the current state of the ongoing cyber attack (both what type of cyber attack incident is occurring and what assets-users & devices that are affected) to continue to mitigate the effects and spread of the cyber attack while restoring as much normal operations or at least limited operations back to the assets of that network being protected.

In an embodiment, a cyber security restoration engine is configured with software code and electronic hardware to take one or more autonomous remediation actions to remediate one or more nodes in a graph of a system being protected back to a trusted operational state before a detected compromise by a cyber threat occurred in the protected system in order to assist in a recovery from the cyber threat, while a cyber attack is ongoing as well as after the cyber attack has been mitigated/eliminated. The cyber security restoration engine has a tracking component that includes at least one of i) a database to keep a record and track an operational state of each node in the graph of the protected system, ii) an Artificial Intelligence model trained to track the operational state of each node in the graph of the protected system, iii) a query to another Artificial Intelligence based engine that tracks the operational state of each node in the graph of nodes of the system being protected, and iv) a combination of any of these, so that the cyber security restoration engine can then take the one or more autonomous remediation actions to remediate one or more nodes back to a trusted operational state for that node. In addition, the cyber security restoration engine cooperates with AI model(s) 160 trained with machine learning on the normal behavior of the devices and users in the system. This way, the cyber security restoration engine knows what is best to do based on knowing the normal behavior of that particular user and/or device.

FIG. 4 illustrates a block diagram of an embodiment of an intelligent orchestration component configured to facilitate an Artificial Intelligence augmented and adaptive interactive response loop between the multiple Artificial Intelligence-based engines. The example multiple Artificial Intelligence-based engines cooperating with each other can include i) the cyber threat detection engine, ii) an autonomous response engine 140, iii) a cyber-security restoration engine 190, and iv) a prediction engine. i) The cyber threat detection engine can be configured to use Artificial Intelligence algorithms trained to perform a machine-learned task of detecting the cyber threat. (See for example FIG. 1) ii) The autonomous response engine 140 can be configured to use Artificial Intelligence algorithms trained to perform a machine-learned task of taking one or more mitigation actions to mitigate the cyber threat. iii) The cyber-security restoration engine 190 can be configured to use Artificial Intelligence algorithms trained to perform a machine-learned task of remediating the system being protected back to a trusted operational state, as well as recommending and prioritizing remediation actions to be performed or authorized by human cyber security operators. (See for example FIG. 2.) iv) The prediction engine can be configured to use Artificial Intelligence algorithms trained to perform a machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack. (See, for example, FIG. 6.)

The multiple Artificial Intelligence-based engines have communication hooks in between them to exchange a significant amount of behavioral metrics including data between the multiple Artificial Intelligence-based engines to work in together to provide an overall cyber threat response.

The intelligent orchestration component can be configured as a discreet intelligent orchestration component that exists on top of the multiple Artificial Intelligence-based engines to orchestrate the overall cyber threat response and an interaction between the multiple Artificial Intelligence-based engines, each configured to perform its own machine-learned task. Alternatively, the intelligent orchestration component can be configured as a distributed collaboration with a portion of the intelligent orchestration component implemented in each of the multiple Artificial Intelligence-based engines to orchestrate the overall cyber threat response and an interaction between the multiple Artificial Intelligence-based engines. In an embodiment, whether implemented as a distributed portion on each AI engine or a discrete AI engine itself, the intelligent orchestration component can use self-learning algorithms to learn how to best assist the orchestration of the interaction between itself and the other AI engines, which also implement self-learning algorithms themselves to perform their individual machine-learned tasks better.

The multiple Artificial Intelligence-based engines can be configured to cooperate to combine an understanding of normal operations of the nodes, an understanding emerging cyber threats, an ability to contain those emerging cyber threats, and a restoration of the nodes of the system to heal the system with an adaptive feedback between the multiple Artificial Intelligence-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information.

One or more Artificial Intelligence models in the detection engine can be configured to maintain what is considered to be normal behavior for that node, which is constructed on a per node basis, on the system being protected from historical data of that specific node over an operation of the system being protected.

The multiple Artificial Intelligence-based engines each have an interface to communicate with the other separate Artificial Intelligence-based engines configured to understand a type of information and communication that the other separate Artificial Intelligence-based engine needs to make determinations on an ongoing cyberattack from that other Artificial Intelligence-based engine's perspective. Each Artificial Intelligence-based engine has an instant messaging system to communicate with a human cyber-security team to keep the human cyber-security team informed on actions autonomously taken and actions needing human approval as well as generate reports for the human cyber-security team.

FIG. 5 illustrates a diagram of an embodiment of i) the cyber threat detection engine using Artificial Intelligence algorithms trained to perform a first machine-learned task of detecting the cyber threat, ii) an autonomous response engine 140 using Artificial Intelligence algorithms trained to perform a second machine-learned task of taking one or more mitigation actions to mitigate the cyber threat, iii) a cyber-security restoration engine 190 using Artificial Intelligence algorithms trained to perform a third machine-learned task of remediating the system being protected back to a trusted operational state, and iv) a prediction engine using Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, in order for these four Artificial Intelligence-based engines to work together. In addition, the intelligent orchestration component can use Artificial Intelligence algorithms trained to perform a fifth machine-learned task of adaptive interactive response between the multiple Artificial Intelligence-based engines to provide information each Artificial Intelligence engine needs to work cohesively to provide an overall incidence response that mitigates different types of cyber threats while still minimizing an impact tailored to this particular system being protected. For example, when a conversation occurs between the AI-based engines such as a system that can be positively affected by both proposed mitigation actions and proposed restoration actions, any of which might be attempted but fail or only partially succeed, then the intelligent orchestration component can arbitrate and evolve the best result for this particular system being protected. The intelligent orchestration component can help anticipate i) the needs of and ii) cohesive response of each Artificial Intelligence-based engine based on a current detected cyber threat.

The cyber-security restoration engine 190 receives and sends inputs through communication hooks (e.g.) interfaces to all of these Artificial Intelligence-based engines each configured with self-learning AI machine learning algorithms to, respectively, i) to detect the cyber threat, ii) to respond to mitigate that cyber threat, and iii) to predict how that cyber threat might occur and likely progress through simulations. Each of these Artificial Intelligence-based engines has bi-directional communications, including the exchange of raw data, with each other as well as with software agents resident in physical and/or virtual devices making up the system being protected as well as bi-directional communications with sensors within the system being protected. Note, the system under protection can be, for example, an IT network, an OT network, a Cloud network, an email network, a source code database, an endpoint device, etc.

In an example, the autonomous response engine 140 uses its intelligence to cooperate with a cyber threat prediction engine and its Artificial Intelligence-based simulations to choose and initiate an initial set of one or more mitigation actions indicated as a preferred targeted initial response to the detected cyber threat by autonomously initiating those mitigation actions to defend against the detected cyber threat, rather than a human taking an action. The autonomous response engine 140, rather than the human taking the action, is configured to autonomously cause the one or more mitigation actions to be taken to contain the cyber threat when a threat risk parameter from an assessment module in the detection engine is equal to or above an actionable threshold. Example mitigation actions can include 1) the autonomous response engine 140 monitoring and sending signals to a potentially compromised node to restrict communications of the potentially compromised node to merely normal recipients and types of communications according to the Artificial Intelligence model trained to model the normal pattern of life for each node in the protected system, 2) the autonomous response engine trained on how to isolate a compromised node as well as to take mitigation acts with other nodes that have a direct *nexus* to the compromised node.

In another example, the cyber threat prediction engine and its Artificial Intelligence-based simulations use intelligence to cooperate with the cyber-security restoration engine 190 to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state.

In another example, the cyber security restoration engine 190 restores the one or more nodes in the protected system by cooperating with at least two or more of 1) an Artificial Intelligence model trained to model a normal pattern of life for each node in the protected system, 2) an Artificial Intelligence model trained on what are a possible set of cyber threats and their characteristics and symptoms to identify the cyber threat (e.g. malicious actor/device/file) that is causing a particular node to behave abnormally (e.g.

malicious behavior) and fall outside of that node's normal pattern of life, and 3) the autonomous response engine 140.

FIG. 6 illustrates a block diagram of an embodiment of the prediction engine with Artificial Intelligence-based simulations conducted in the prediction engine by constructing a graph of nodes of the system being protected (e.g. a network including i) the physical devices connecting to the network, any virtualized instances of the network, user accounts in the network, email accounts in the network, etc. as well as ii) connections and pathways through the network) to create a virtualized instance of the network to be tested. As shown in FIG. 6, the various cooperating modules residing in the prediction engine 105 may include, but are not limited to, a collections module 705, a cyberattack generator 710 (e.g. phishing email generator with a paraphrasing engine), an email module 715, a network module 720, an analyzer module 725, a payloads module 730 with first and second payloads, a communication module 735, a training module 740, a simulated attack module 750, a cleanup module 755, a scenario module 760, a user interface 765, a reporting module 770, a formatting module 775, an orchestration module 780, an AI classifier 785 with a list of specified classifiers.

The prediction engine 105 may be implemented via i) a simulator to model the system being protected and/or ii) a clone creator to spin up a virtual network and create a virtual clone of the system being protected configured to pentest one or more defenses provided by scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores may be used to rank alerts that may be directed to enterprise or computing device administrators. This risk assessment and ranking is conducted to avoid frequent "false positive" alerts that diminish the degree of reliance/confidence on the cyber security appliance 100. The prediction engine 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. The prediction engine 105 may use the trained AI models to cooperate with one or more AI classifier(s) by producing a list of specific organization-based classifiers for the AI classifier. The prevent engine 105 is further configured to calculate, —based at least in part on the results of the one or more hypothetical simulations of a possible cyberattack and/or of an actual ongoing cyberattack from a cyber threat determine a risk score for each node (e.g. each device, user account, etc.), the threat risk score being indicative of a possible severity of the compromise prior to an autonomous response action is taken in response to the actual cyberattack of the cyber incident.

FIG. 7 illustrates a diagram of an embodiment of the cyber threat prediction engine and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks. The prediction engine plots the attack path through the nodes and estimated times to reach critical nodes in the network. The cyberattack simulation modeling is run to identify the routes, difficulty, and time periods from certain entry notes to certain key servers.

Again, similarly named components in each Artificial Intelligence-based engine can 1) perform similar functions and/or 2) have a communication link from that component located in one of the Artificial Intelligence-based engines and then information is needed from that component is communicated to another Artificial Intelligence-based engine that through the interface to that Artificial Intelligence-based engine.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 for example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, one of the AI model(s) 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

Thus, a deployed Artificial Intelligence model 160 trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g. user account, device, etc.). Initial training of one or more Artificial Intelligence models 160 trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal pattern of life of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models 160 can be implemented with various mechanisms such neural networks, decision trees, etc. and combinations of these. Likewise, one or more supervised machine learning AI models 160 may be trained to create possible hypotheses and perform cyber threat investigations on agnostic examples of past historical incidents of detecting a multitude of possible types of cyber threat hypotheses previously analyzed by human cyber security analyst. More on the training of AI models 160 are trained to create one or more possible hypotheses and perform cyber threat investigations will be discussed later.

At its core, the self-learning AI models 160 that model the normal behavior (e.g. a normal pattern of life) of entities in the network mathematically characterizes what constitutes 'normal' behavior, based on the analysis of a large number of different measures of a device's network behavior-packet traffic and network activity/processes including server access, data volumes, timings of events, credential use, connection type, volume, and directionality of, for example, uploads/downloads into the network, file type, packet intention, admin activity, resource and information requests, command sent, etc.

Clustering Methods

In order to model what should be considered as normal for a device or cloud container, its behavior can be analyzed in the context of other similar entities on the network. The AI models (e.g., AI model(s) 160) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example: Insider threat-malicious or accidental, Zero-day attacks-previously unseen, novel exploits, latent vulnerabilities, machine-speed attacks-ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module 125 and/or cyber threat analyst module 120 of FIG. 1 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign,' the AI's mathematical algorithms produce outputs marked with differing degrees of potential threat. This enables users of the system to rank alerts and notifications to the enterprise security administrator in a rigorous manner, and prioritize those which most urgently require action. Meanwhile, it also assists to avoid the problem of numerous false positives associated with simply a rule-based approach.

More on the Operation of the Cyber Security Appliance 100

As discussed in more detail below, the analyzer module 115 and/or cyber threat analyst module 120 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data 170 representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection finger prints.

All of the above AI models 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier.' Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it is anomalous. Note, this anomaly detection can determine that a data point is anomalous/non-anomalous on the basis of a particular feature. In reality, the cyber security appliance 100 should not flag a data point as an anomaly based on a single feature. Merely, when a combination of all the probability values for all features for a given data point is calculated can the modules cooperating with the AI model of normal behavior can say with high confidence whether a data point is an anomaly or not. Anomaly detection can discover unusual data points in a dataset. Anomaly can sometimes be a synonym for the word 'outlier.'

Again, the AI models trained on a normal pattern of life of entities in a network (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 115 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 160 trained on a normal pattern of life of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric Additional Module Interactions Referring back to FIG. 1, the gather module 110 cooperates with the data store 135. The data store 135 stores comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store 135. The gather module 110 may consist of multiple automatic data gatherers that each look at different aspects of the data depending on the particular hypothesis formed for the analyzed event. The data relevant to each type of possible hypothesis can be automatically pulled from additional external and internal sources. Some data is pulled or retrieved by the gather module 110 for each possible hypothesis.

The data store 135 can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The gather module 110 may have a process identifier classifier. The process identifier classifier can identify and track each process and device in the network, under analysis, making communication connections. The data store 135 cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared.

Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain.

For instance, the first domain module 145 may operate as an IT network module configured to receive information from and send information to, in this example, IT network-based sensors (i.e., probes, taps, etc.). The first domain module 145 also has algorithms and components configured to understand, in this example, IT network parameters, IT network protocols, IT network activity, and other IT network characteristics of the network under analysis. The second domain module 150 is, in this example, an email module. The second domain module 150 can be an email network module configured to receive information from and send information to, in this example, email-based sensors (i.e., probes, taps, etc.). The second domain module 150 also has algorithms and components configured to understand, in this example, email parameters, email protocols and formats, email activity, and other email characteristics of the network under analysis. Additional domain modules can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier (not shown) in the gather module 110 can cooperate with additional classifiers in each of the domain modules 145/150 to assist in tracking individual processes and associating them with entities in a domain under analysis as well as individual processes and how they relate to each other. The process identifier classifier can cooperate with other trained AI classifiers in the modules to supply useful metadata along with helping to make logical nexuses.

A feedback loop of cooperation exists between the gather module 110, the analyzer module 115, AI model(s) 160 trained on different aspects of this process, and the cyber threat analyst module 120 to gather information to determine whether a cyber threat is potentially attacking the networks/domains under analysis.

Determination of Whether Something is Likely Malicious

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one of more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI model(s) 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module 115 and/or the cyber threat analyst module 120 can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models 160 trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more of the AI model(s) 160 trained with machine learning on the pattern of life of each device and its associated processes in the system. Next, the analyzer module 115 and/or the cyber threat analyst module 120 can have an external input to ingest threat intelligence from other devices in the network cooperating with the cyber security appliance 100. Next, the analyzer module 115 and/or the cyber threat analyst module 120 can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analyzer module 115 and/or the cyber threat analyst module 120 can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features may include a deeper analysis of endpoint data. This endpoint data may include domain metadata, which can reveal peculiarities such as one or more indicators of potentially a malicious domain (i.e., its URL). The deeper analysis may assist in confirming an analysis to determine that indeed a cyber threat has been detected. The analyzer module 115 can also look at factors of how rare the endpoint connection is, how old the endpoint is, where geographically the endpoint is located, how a security certificate associated with a communication is verified only by an endpoint device or by an external 3rd party, just to name a few additional factors. The analyzer module 115 (and similarly the cyber threat analyst module 120) can then assign weighting given to these factors in the machine learning that can be supervised based on how strongly that characteristic has been found to match up to actual malicious sites in the training.

In another AI classifier to find potentially malicious indicators, the agent analyzer data analysis process in the analyzer module 115 and/or cyber threat analyst module 120 may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down. The cyber threat analyst module 120 can be configured to use the one or more supervised machine learning models trained on i) agnostic examples of a past history of detection of a multitude of possible types of cyber threat hypotheses previously analyzed by human, who was a cyber security professional, ii) a behavior and input of how a plurality of human cyber security analysts make a decision and analyze a risk level regarding and a probability of a potential cyber threat, iii) steps to take to conduct an investigation start with anomaly via learning how expert humans tackle investigations into specific real and synthesized cyber threats and then the steps taken by the human cyber security professional to narrow down and identify a potential cyber threat, and iv) what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

The cyber threat analyst module using AI models, scripts and/or rules-based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioral pattern analysis of what are the unusual behaviors of the network/system/device/user under analysis by the machine learning models may be as follows. The coordinator module can tie the alerts, activities, and events from, in this example, the email domain to the alerts, activities, and events from the IT network domain. FIG. 8 illustrates a graph 220 of an embodiment of an example chain of unusual behavior for, in this example, the email activities and IT network activities deviating from a normal pattern of life in connection with the rest of the system/network under analysis. The cyber threat analyst module and/or analyzer module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analyzed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor-human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. Again, the cyber security appliance 100 can go back and pull in some of the normal activities to help support or refute a possible hypothesis of whether that pattern is indicative of a behavior of a malicious actor. The analyzer module can cooperate with one or more models trained on cyber threats and their behavior to try to determine if a potential cyber threat is causing these unusual behaviors. The cyber threat analyst module can put data and entities into 1) a directed graph and nodes in that graph that are overlapping or close in distance have a good possibility of being related in some manner, 2) a vector diagram, 3) a relational database, and 4) other relational techniques that will at least be examined to assist in creating the chain of related activity connected by causal links, such as similar time, similar entity and/or type of entity involved, similar activity, etc., under analysis. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

The autonomous response engine 140 of the cyber security system is configured to take one or more autonomous mitigation actions to mitigate the cyber threat during the cyberattack by the cyber threat. The autonomous response engine 140 is configured to reference an Artificial Intelligence model trained to track a normal pattern of life for each node of the protected system to perform an autonomous act of restricting a potentially compromised node having i) an actual indication of compromise and/or ii) merely adjacent to a known compromised node, to merely take actions that are within that node's normal pattern of life to mitigate the cyber threat. Similarly named components in the cyber security restoration engine 190 can operate and function similar to as described for the detection engine.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat in Order to Determine Appropriate Autonomous Actions, for Example, Those by the Autonomous Response Engine In the next step, the analyzer module and/or cyber threat analyst module generates one or more supported possible cyber threat hypotheses from the possible set of cyber threat hypotheses. The analyzer module generates the supporting data and details of why each individual hypothesis is supported or not. The analyzer module can also generate one or more possible cyber threat hypotheses and the supporting data and details of why they were refuted.

In general, the analyzer module cooperates with the following three sources. The analyzer module cooperates with the AI models trained on cyber threats to determine whether an anomaly such as the abnormal behavior and/or suspicious activity is either 1) malicious or 2) benign when the potential cyber threat under analysis is previously unknown to the cyber security appliance 100. The analyzer module cooperates with the AI models trained on a normal behavior of entities in the network under analysis. The analyzer module cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, an assessment module with the AI classifiers is configured to cooperate with the analyzer module. The analyzer module supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order to assign a numerical assessment of a given cyber threat hypothesis that was found likely to be supported by the analyzer module with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyzer module, which includes the abnormal behavior or suspicious activity as well as one or more of the collection of system data points, with the one or more AI models trained on possible cyber threats.

The cyber threat analyst module in the AI-based cyber security appliance 100 component provides an advantage over competitors' products as it reduces the time taken for cybersecurity investigations, provides an alternative to manpower for small organizations and improves detection (and remediation) capabilities within the cyber security platform.

The AI-based cyber threat analyst module performs its own computation of threat and identifies interesting network events with one or more processers. These methods of detection and identification of threat all add to the above capabilities that make the AI-based cyber threat analyst module a desirable part of the cyber security appliance 100. The AI-based cyber threat analyst module offers a method of prioritizing which is not just a summary or highest score alert of an event evaluated by itself equals the most bad, and prevents more complex attacks being missed because their composite parts/individual threats only produced low-level alerts.

The AI classifiers can be part of the assessment component, which scores the outputs of the analyzer module. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module can generate an output such as a printed or electronic report with the relevant data. The formatting module can cooperate with both the analyzer module and the assessment module depending on what the user wants to be reported.

The formatting module is configured to format, present a rank for, and output one or more supported possible cyber threat hypotheses from the assessment module into a formalized report, from one or more report templates populated with the data for that incident.

The formatting module is configured to format, present a rank for, and output one or more detected cyber threats from the analyzer module or from the assessment module into a formalized report, from one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three. The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with the knowledge that malicious activity is likely occurring/is associated with a given process from the analyzer module, then cooperates with the autonomous response engine 140 to take an autonomous action such as i) deny access in or out of the device or the network and/or ii) shutdown activities involving a detected malicious agent.

The autonomous response engine 140, rather than a human taking an action, can be configured to cause one or more rapid autonomous mitigation actions to be taken to counter the cyber threat. A user interface for the response module can program the autonomous response engine 140 i)

to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response engine 140 will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response engine 140 uses one or more Artificial Intelligence models that are configured to intelligently work with other third-party defense systems in that customer's network against threats. The autonomous response engine 140 can send its own protocol commands to devices and/or take actions on its own. In addition, the autonomous response engine 140 uses the one or more Artificial Intelligence models to orchestrate with other third-party defense systems to create a unified defense response against a detected threat within or external to that customer's network. The autonomous response engine 140 can be an autonomous self-learning response coordinator that is trained specifically to control and reconfigure the actions of traditional legacy computer defenses (e.g. firewalls, switches, proxy servers, etc.) to contain threats propagated by, or enabled by, networks and the internet. The cyber threat module can cooperate with the autonomous response engine 140 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

FIG. 9 illustrates a block diagram of an embodiment of the AI-based cyber security appliance 100 with the cyber security restoration engine and other Artificial Intelligence-based engines plugging in as an appliance platform to protect a system, and the overall system represents a security platform 800. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

The security platform 800 could also be referred to as a cyber threat defense system. The cyber security appliance 100 is part of an enterprise network 830, which may further include one or more computing devices such as database servers 850, web servers 860, networking devices (e.g., bridge, switch, router, load-balancers, gateways, and/or firewalls), endpoint devices with connectivity to resources within the enterprise network 830 as well as a publicly accessible network 880 (e.g., the Internet). The endpoint devices 870 may include, but are not limited or restricted to desktop computers, laptops, smart phones, tablets, wearables, smart appliances, or the like. The security controls operate as probes and detectors that are configured to monitor, for example, network-based activity (e.g., email activity, TCP/IP communications, text or Short Message Service (SMS) activity, etc.) and computing device activity (e.g., download activity based on volume, day, time of day, etc.); credential update/modification activity (e.g., credential changes, failed access attempts to a resource, etc.); and/or resource activity (e.g., attempted/successful accesses to enterprise resources, etc.). The security controls provide the monitored data (or a version of the monitored data) as input into the modules of the cyber security appliance 100 to determine what is occurring in each domain individually. In an example, the probes and detectors may monitor email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

FIG. 10 to FIG. 15 illustrate diagrams of an embodiment of an intelligent orchestration component facilitating an example of an Artificial Intelligence augmented and adaptive interactive response loop between the four Artificial Intelligence-based engines. Again, the multiple (e.g. four) Artificial Intelligence-based engines have communication hooks in between them to exchange a significant amount of behavioral metrics including data between the multiple Artificial Intelligence-based engines to work in together to provide an overall cyber threat response. The AI adaptive incident response loop has interaction and orchestration between the multiple (four) self-learning AI components, each trained and focused on their individual machine-learned tasks of i) detecting a cyber threat, ii) how to conduct a simulation and make the prediction about a cyberattack, iii) how to make and what types of autonomous mitigation responses can be made in response to a cyberattack and iv) what level of restrictions are needed and how to invoke restoration actions to restore nodes in the system being protected while still mitigating effects of the cyberattack. The Artificial Intelligence in each of the engines trained and focused on performing their corresponding machine-learned tasks as well as the orchestration between the Artificial Intelligence-based engines drive the exchange to make them work in together against a cyberattack by the cyber threat (e.g. malicious actor). The intelligent orchestration component facilitates the multiple example stages of the Artificial Intelligence augmented and adaptive interactive response loop between these four Artificial Intelligence-based engines.

Figure 10:
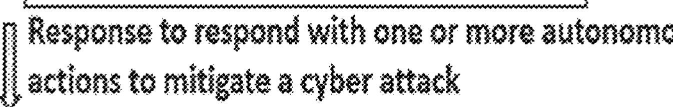
Figure 10:
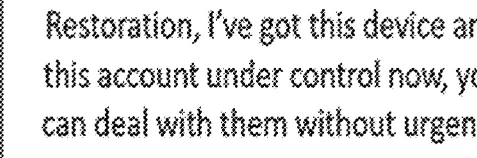
Figure 10:
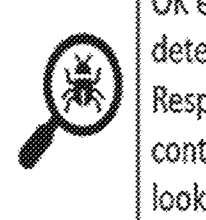

FIG. 10 illustrates a diagram of an example first stage of the interactive Artificial Intelligence-based response loop between the multiple Artificial Intelligence-based engines working in tandem to provide an overall cyber threat response.

The human security team is just working through these top cyber threat risks identified by the prediction engine simulations, while the AI detection engine looks for cyber threats.

The detection engine monitoring the example network being protected detects a potential cyber threat. The detection engine informs all the other engines of the new detection and details (e.g. the symptoms detected and any devices possibly compromised). The detection engine also sends a report to the human security team to review.

The detection engine detects a cyberattack through AI analysis and communicates the cyber threat and one or more nodes (user accounts, devices, etc.) showing anomalous behavior indicative of being compromised by the cyber threat to the autonomous response engine. The detection engine communicates to the autonomous response engine about all the cyber events and indicated nodes that need containing, even the ones that potentially individually seem normal.

The autonomous response engine reviews the information from the detection engine to take one or more autonomous actions to mitigate the cyberattack. The artificial intelligence in the autonomous response engine determines what additional information the autonomous response engine needs to take the one or more autonomous actions to mitigate the cyberattack while still minimizing an effect on the rest of the non-compromised nodes in the system and other mitigation actions needed to contain the cyber threat. The autonomous response engine reasons and acts, e.g. blocking specific network connections, enforcing a pattern of life on users/devices, and locking accounts. The autonomous response engine is trained to mitigate the cyber threat and compromised nodes with the minimum number of changes to achieve that goal, and with a minimum disruption to legitimate on-going operations The detection engine detects a cyberattack through AI analysis and also communicates the cyber threat and one or more nodes (user accounts, devices, etc.) showing anomalous behavior indicative of being compromised by the cyber threat to the prediction engine. The prediction engine reviews the information and runs one or more Artificial Intelligence-based simulations of cyberattacks to assist in determining 1) how this cyberattack might have occurred in the system being protected, and 2) using the cyberattack information from the detection engine to run simulations to preempt possible escalations of this ongoing actual cyberattack. The prediction engine reviews the information from the detection engine and the artificial intelligence in the prediction engine determines what additional information the prediction engine needs to run one or more simulations of this cyberattack. The prediction engine reasons, based on the one or more possible cyberattacks detected from the events and indicators detected, the likely next set of actions that might take place in the attack-especially the actions that would constitute the most dangerous escalations.

The prediction engine communicates with the autonomous response engine to supplement the actions and events it can take to mitigate the cyberattack based on the simulations. Again, the autonomous response engine reasons and acts.

The autonomous response engine communicates with the restoration engine what autonomous actions have been taken to mitigate the cyber threat. The autonomous response engine communicates e.g. that a specific device and account are being contained now, and restoration is therefore less urgent. The restoration engine pulls information from the detection engine to determine an operational state for each node in the system being protected. The artificial intelligence in the restoration engine analyzes the operational state of the nodes in the network/system being protected. The artificial intelligence in the restoration engine analyzes the operational state of the nodes and what level of mitigation might be needed to contain the cyber threat during this ongoing cyberattack. The artificial intelligence in the restoration engine also analyzes the information from the Artificial Intelligence-based simulations of cyberattacks to assist in determining what level of restrictions are needed on the potentially compromised nodes and their neighboring nodes to still mitigate against an ongoing cyberattack but minimize an effect on the rest of the system.

Figure 11:
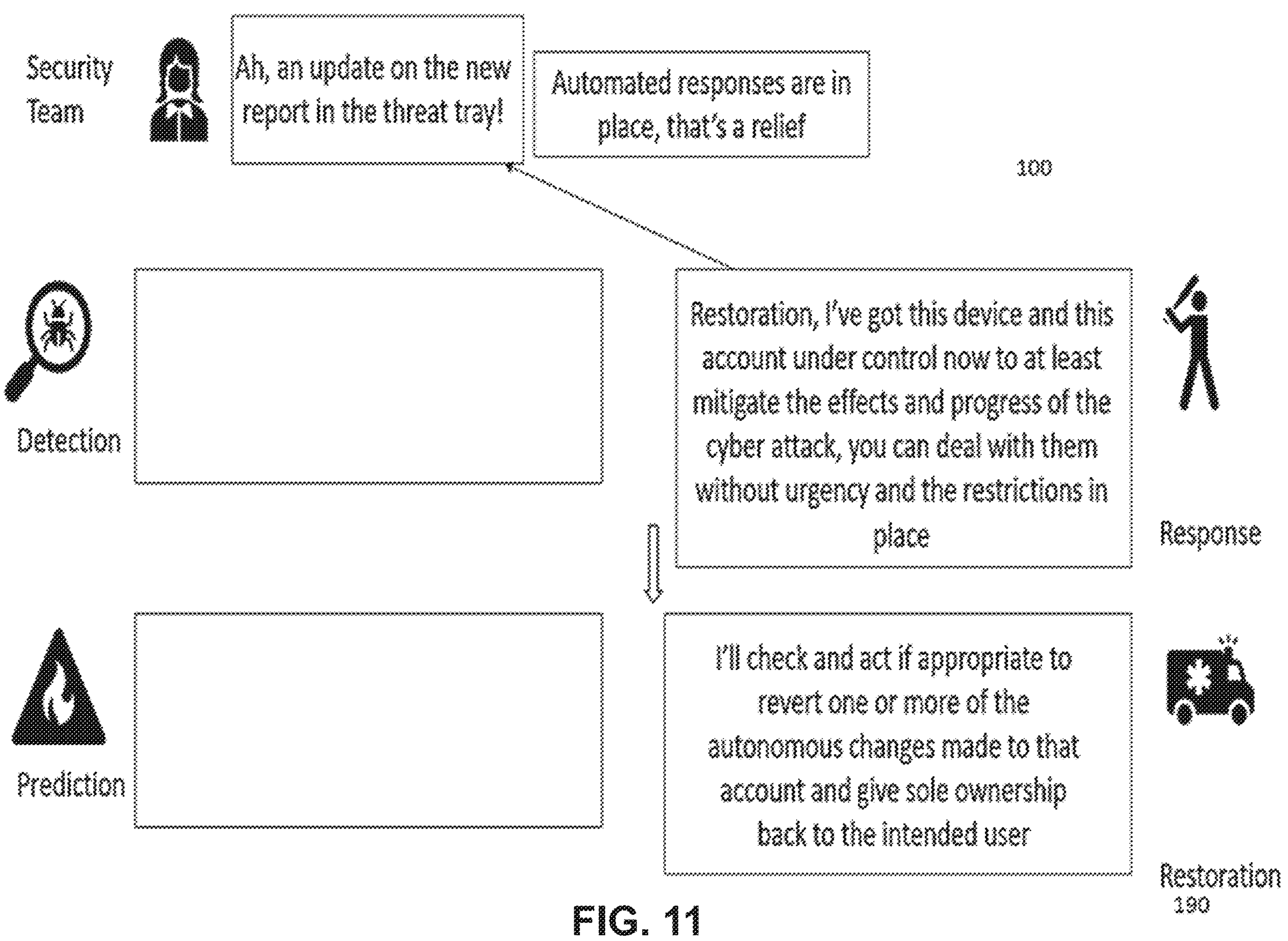

FIG. 11 illustrates a diagram of an example second stage of the interactive Artificial Intelligence-based response loop between the multiple Artificial Intelligence-based engines working in tandem to provide an overall cyber threat response. Again, the autonomous response engine communicates with the human cyber security team and restoration engine about the things it has successfully contained. The human cyber security team does not need to have been involved at all to this point. The restoration engine also communicates to the human cyber security team a report. The restoration engine is configured to be able to take autonomous recovery actions in some cases such as this one, and can autonomously e.g. revert one or more of the changes made to an account and give sole ownership back to the intended user.

The cyber security restoration engine is trained to heal the protected system back to a healthy state with the minimum number of changes to achieve that goal, and with a minimum disruption to legitimate on-going operations. The cyber security restoration engine can take various example remediation actions in real time. The cyber security restoration engine to restore the protected system can use historic SaaS/IaaS resource access, privilege information and clustered similar users to reset user access and permissions after a privilege escalation incident.

Figure 12:
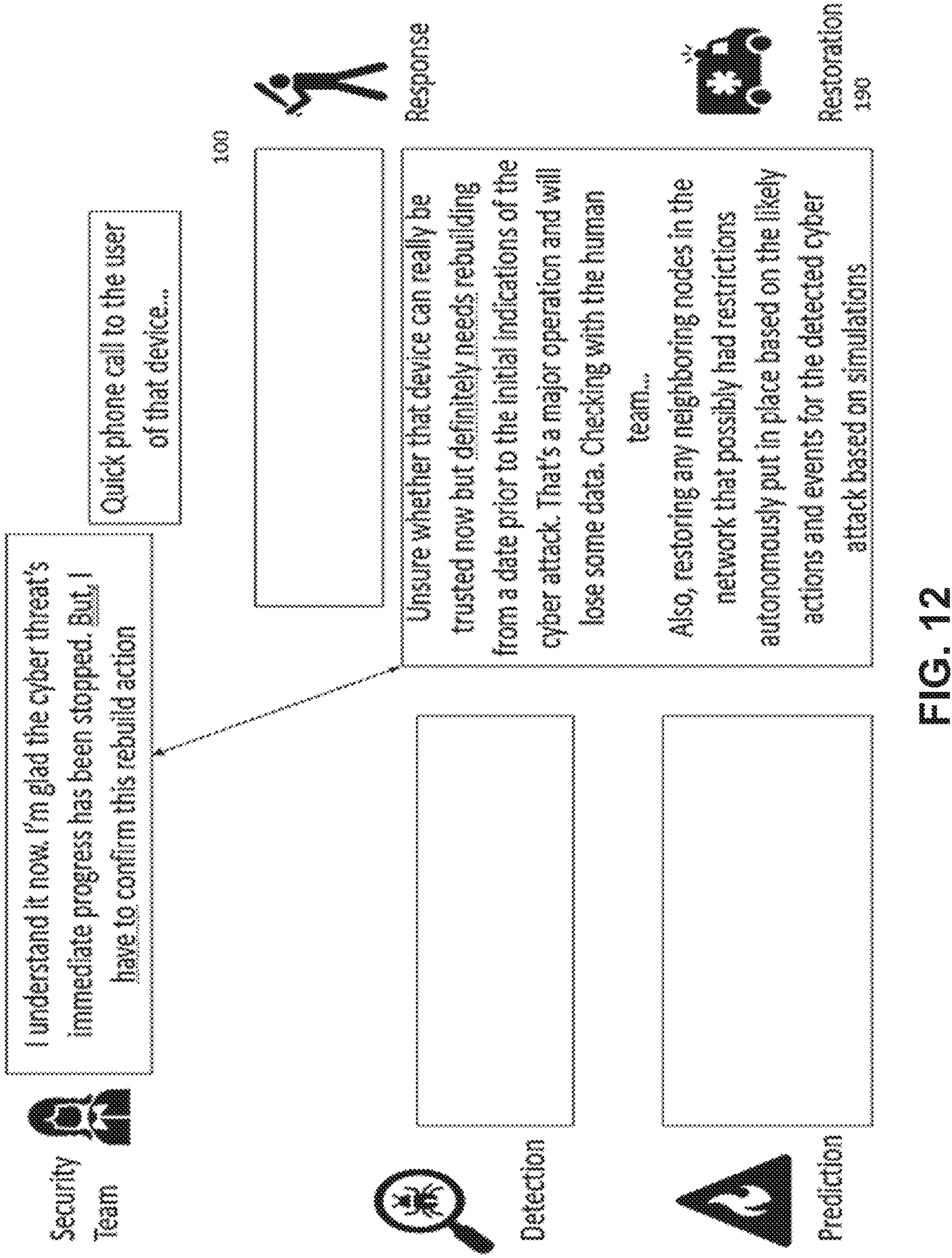

FIG. 12 illustrates a diagram of an example third stage of the interactive Artificial Intelligence-based response loop between the multiple Artificial Intelligence-based engines working in tandem to provide an overall cyber threat response. The restoration engine sends another report after its analysis to the human cyber security team. The report communicates that it cannot be sure whether an initially compromised device can be trusted now and it recommends rebuilding from an effective date prior to the initial indications of the cyberattack. This a major operation and the device and its user will lose some data. The cyber-security restoration engine checks with the human team to obtain approval to perform this restoration action. The human cyber security team decide whether to confirm this rebuild action, potentially including in that decision information that cannot be known by the cyber security system (e.g. calling a device's user to discuss the impact of the rebuild). The restoration engine enables human security teams to make quick and confident decisions with the goal of keeping the business up and running. The report can identify assets affected by a cyberattack, their condition, and how best to restore them during and after an attack.

Next, a period of time has occurred between the initial detection of the cyber threat.

Figure 13:
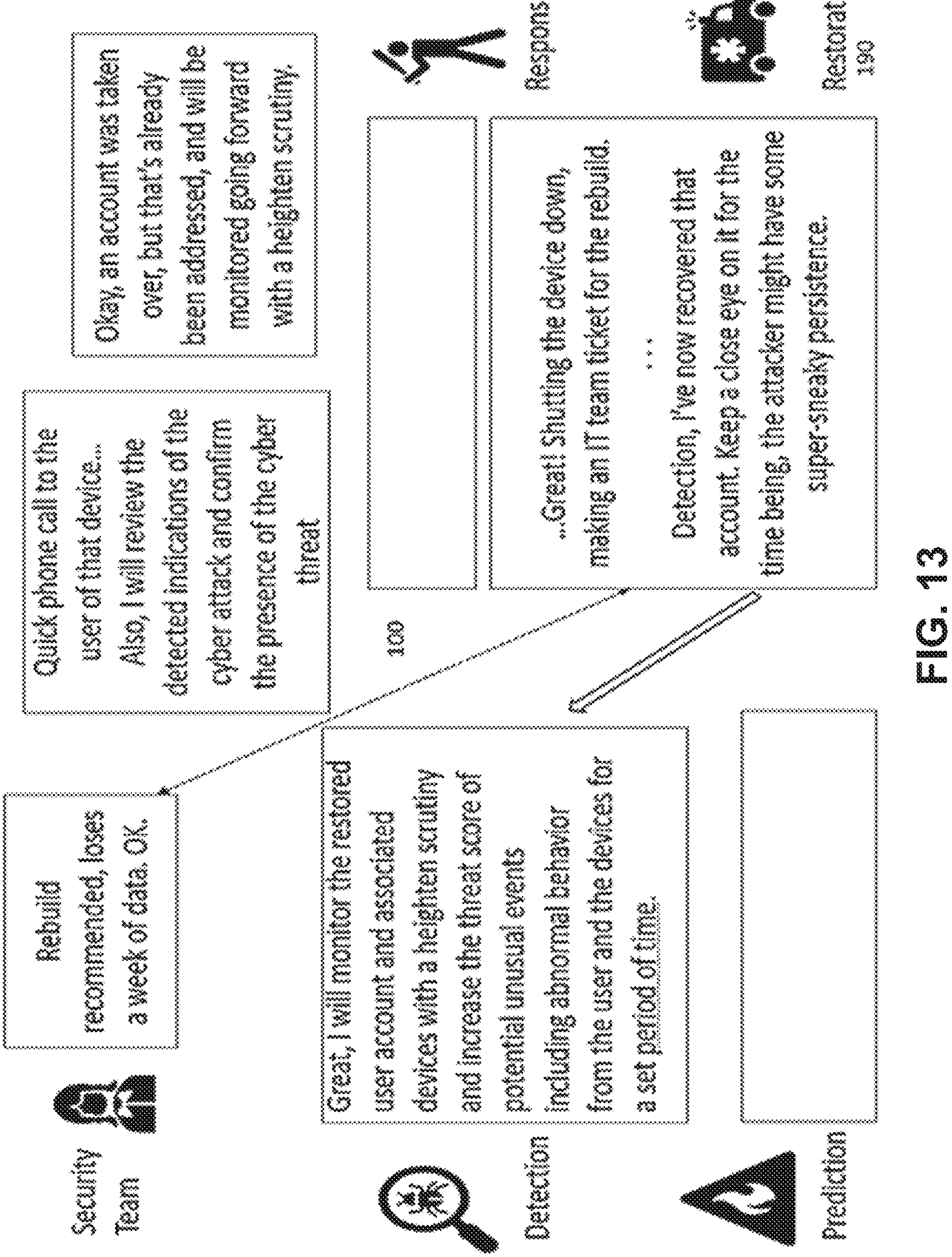

FIG. 13 illustrates a diagram of an example fourth stage of the interactive Artificial Intelligence-based response loop between the multiple Artificial Intelligence-based engines working in tandem to provide an overall cyber threat response. The human security team confirms the recommended device rebuild. The restoration engine communicates back to the detection engine and the human cyber security team after it has automatically recovered an affected account. The detection engine reviews the information from the restoration engine and can choose to enhance the monitoring of this account temporarily, since its recent attack makes it more likely to be attacked again or for new activity to reveal the restoration did not fully resolve the problem. The artificial intelligence in the detection engine determines what additional information the detection engine needs to set the appropriate revised thresholds and types of behavior to look for. The detection engine communicates to both the restoration engine and the human cyber security team that it will monitor the restored user account and associated devices with a heightened scrutiny and increase the threat score of potential unusual events including abnormal behavior from the user and the devices for a set period of time. The detection engine then sets detection of cyber threats and abnormal behavior with the lower thresholds on the specific user account and the associated devices for that set period of time. The prediction engine through its simulations can inform the detection engine and restoration engine whether a recovered device is still extremely weak to other types of cyberattack.

Figure 14:
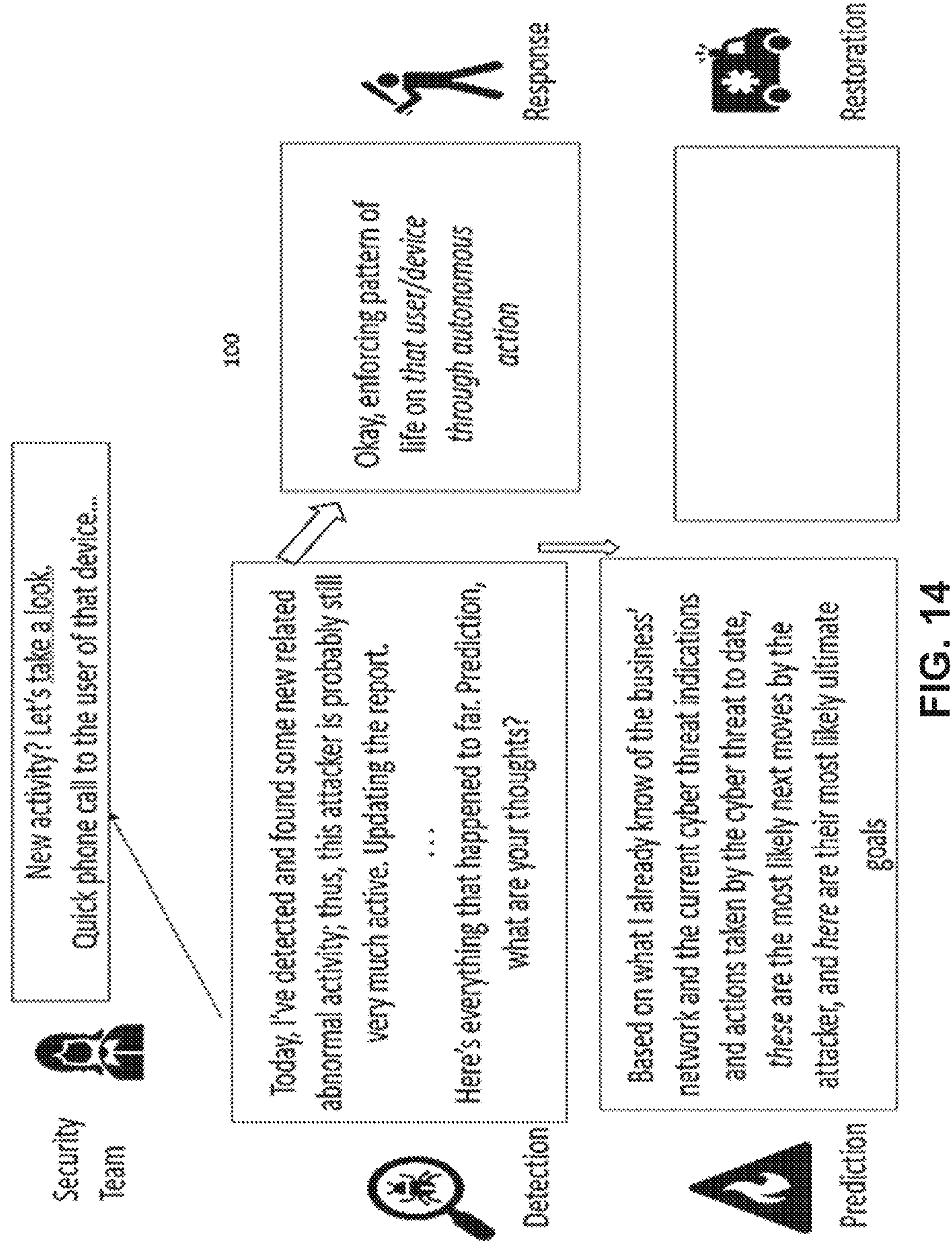

FIG. 14 illustrates a diagram of an example fifth stage of the interactive Artificial Intelligence-based response loop between the multiple Artificial Intelligence-based engines working in tandem to provide an overall cyber threat response. The detection engine sends a new communication to the autonomous response engine and the human security team that it has detected and found some new related abnormal activity; thus, this attacker is probably still active. The autonomous response engine immediately takes actions as before.

The detection engine communicates the new and overall cyber threat activity to the prediction engine. The Artificial Intelligence in the prediction engine reviews the communicated cyber threat activity and gathers additional information to run simulations. The Artificial Intelligence in the prediction engine reasons the most likely and/or most dangerous next moves by the attacker, and their most likely ultimate goals based on the results of the cyberattack simulations.

The human cyber security team reviews the updated report from the detection engine. The human team is active and occasionally needs to confirm recommendations or make decisions, but a large part of the overall incident response is assisted by the AI engines working together without human input.

Figure 15:
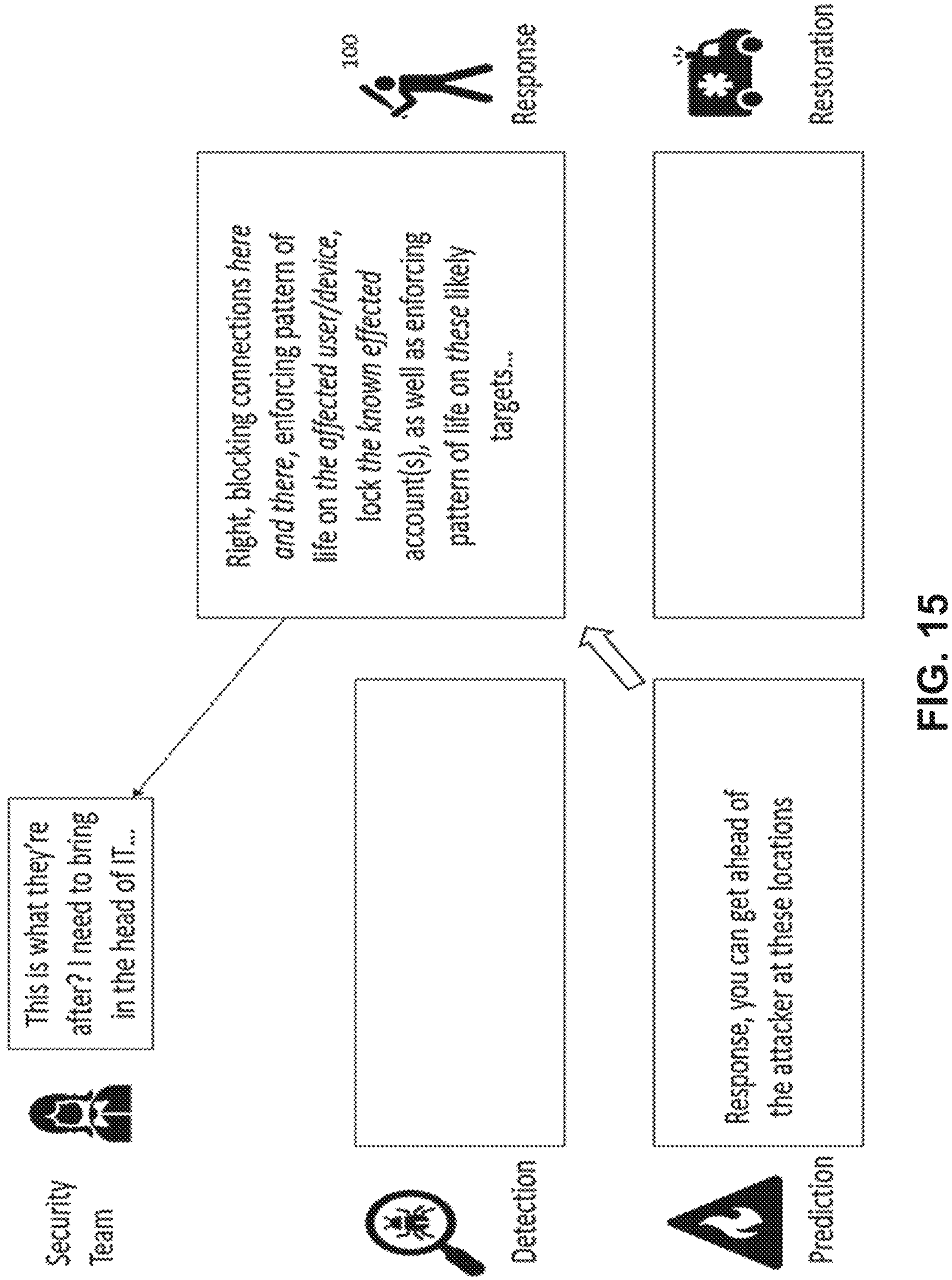

FIG. 15 illustrates a diagram of an example sixth stage of the interactive Artificial Intelligence-based response loop between the multiple Artificial Intelligence-based engines working in tandem to provide an overall cyber threat response. The prediction engine after running the Artificial Intelligence-based simulations communicates to the autonomous response engine the locations where it could block the likely and/dangerous next moves by the attacker. The Artificial Intelligence in the autonomous response engine analyzes the simulation results and grabs any additional information needed to decide what nodes need autonomous actions and what mitigation actions to take to each node that is compromised and potentially its neighboring nodes. The Artificial Intelligence in the autonomous response engine reasons and takes action. The AI engines also update the report visible to the human cyber security team.

This interactive Artificial Intelligence-based response loop between the multiple Artificial Intelligence-based engines working together continues on. The intelligent orchestration component uses unsupervised machine learning algorithms to self-learn from previous cyber threat incidents (and their aftermath) on tasks such as how the response went, what worked, what did not, how long things took and how this compared to previous occasions and to expectations, and then uses this information to adjust future incident response expectations and priorities. The intelligent orchestration component can use action success/completion and time taken as measures of improvement. Likewise, the restoration engine can use unsupervised machine learning algorithms to self-learn from previous cyber threat incidents to get better at healing the system being protected to mitigate the cyber threat while minimizing an impact on the system being protected, in particular by classifying a graph of the nodes involved in a cyber attack. Referring back to FIG. 3B, the restoration engine can comprise a cyber threat analysis module having one or more neural networks configured to analyze the graph generated by the restoration engine during a cyber attack, such as graph 300 in FIG. 3B. The neural network(s) are trained on data of graphs from previous attacks, which may be labelled, or preferably unlabeled data, or some combination of both, to learn how to group and identify different types of cyber attacks. This classification is at a high level, and whilst based on all of the interactions within the graph is typically defined by certain key interactions. For example, cyber attacks may be classified, based on their graphs, as ransomware attacks, data theft attacks, etc, etc. Due to the non-Euclidean structure of cyber incidents, message passing neural networks have been found to be particularly suited to this type of task. Additionally, due to the time-varying nature of the graphs being classified by the neural network (which vary as a cyber attack progresses, moving through a network, and as response and remediation actions are performed), message passing neural networks have been used in combination with sequential models such as recurrent neural networks or transformers to analyze incidents over time.

The cyber security restoration engine can also use one or more unsupervised machine learning algorithms, as a self-learning entity, to have an ability to learn how to restore the one or more nodes in the graph of the protected system back to the trusted operational state while still mitigating against the cyber threat so the cyber security restoration engine gets better over time of a deployment of the cyber security restoration engine by learning from previous restoration attempts (e.g. action success/completion and time taken as measures, action effectiveness as a measure, etc., as well as including or adapting changes to previous recommendations made by the human security team.

The cyber threat detection engine, the autonomous response engine, the prediction engine all perform their machine-learned task and send inputs to each other to assist in determining what nodes are impacted, what cyber threat is causing the problems, and how the cyberattack likely occurred and will progress based upon possible mitigation and restoration actions taken so that the restoration engine can rely on the determinations by the Artificial Intelligence in those AI-based engines to give the restoration engine a fantastic starting point for figuring out what is the system being protected is trying to recover from and then a best way to restore the nodes in the system.

There are four discrete AI-based engines working to achieve aims with their own machine learning approaches. Each separate AI contributes data that has been processed intelligently through machine learning approaches and then hands over the processed behavioral metrics to another AI engine which then performs its own individualized machine-learned task.

The prevent engine in conducting simulations can use AI Analyst with external data input (e.g., crowdstrike) and cooperate with the detection engine to identify an infected patient zero and additional devices actually compromised and/or directly linked to devices actually compromised in need of remediation. The linked devices or the activity may not be directly visible to the detection engine alone and the external data input fills in the big picture. The cyber security restoration engine to restore the protected system can potentially use the external data input that the system is receiving from third party integrations (e.g., from host-based agents from 3rd party vendors, antivirus and-based testing antivirus, etc.) to identify patient zero of the attack, identify, where the attack has happened and is happening, identify devices that the system reasonably believes are linked to the compromised entity, and recommend remediation or perform remediation via AI alone, and/or AI in combination with human assistance. The cyber security restoration engine can restore the protected system back to a state before a compromise (e.g. abnormalities started) by a cyber threat occurred to the protected system. The cyber security restoration engine restores nodes in the protected system to cyberattacks in progress-so heals in real time, as an attack happens, as well as can assist in healing after an attack has taken place.

The trusted operational state of a node can be an operational state for a date and time before the earliest detection of a possible compromise of a node in the graph (device and/or user account) plus a threshold buffer amount of time.

In an example, the detection engine can use historic IaaS data on virtual resource usage to identify errant virtual resources and the autonomous response engine to spin down those resources or disable overactive microservices like lambdas. In another example, the detection engine can use historic IaaS data on virtual resource usage to understand when a client is undergoing some kind of DDOS and the autonomous response engine acts to do scaling to handle the load until the overload is over. The restoration engine can recommend controlling the scaling when the system understands deliberate overloading of traffic is occurring and then bringing that scaling back down again to assist their service architectures to deal with situations when some cyber threat is trying to overload those systems to bring that customer down.

In another example, the cyber security restoration engine to restore the protected system can use historic source codebase information and modelling from the AI models in the detection engine for development to revert commits and code changes that potentially introduce bad or compromised code. The cyber security restoration engine to restore the protected system can also use historic records of a source code database information to find out when during the development of a product that the cyber-attack occurred on the source code in order to restore the source code back to the state before the compromise occurred, as well as use historic code base analysis and understanding to identify supply chain and products vulnerable to bad code/compromised code and sending an update package/at least a notice to revert those products and further prevent the source code vulnerabilities from trickling down the supply chains from the vendor to the end user. Once file data of a cyber threat is identified, then that file data and its characteristics are captured in an inoculation package and then cascade that file information to each cyber security appliance in the fleet of cyber security appliances, and quarantine the identical and very similar files in order to remove them from all of the environments before anything can spread even more than it has via immediate remediation and also using the system's own inoculation data.

In an example, the autonomous response engine can stop a device that is infected from connecting to other nodes. In addition, the autonomous response engine can restrict reading and writing traffic and/or types of data/information being communicated in that traffic to restrict traffic movement and process activity to nodes close to an entity that the system thinks is performing erroneously or infected.

Referring to FIG. 4, the autonomous response engine is configured to use one or more Application Programming Interfaces to translate desired mitigation actions for nodes (devices, user accounts, etc.) into a specific language and syntax utilized by that device, user account, etc. from potentially multiple different vendors being protected in order to send the commands and other information to cause the desired mitigation actions to change, for example, a behavior of a detected threat of a user and/or a device acting abnormal to the normal pattern of life. The selected mitigation actions on the selected nodes minimize an impact on other parts of the system being protected (e.g. devices and users) that are i) currently active in the system being protected and ii) that are not in breach of being outside the normal behavior benchmark. The autonomous response engine can have a discovery module to i) discover capabilities of each node being protected device and the other cyber security devices (e.g. firewalls) in the system being protected and ii) discover mitigation actions they can take to counter and/or contain the detected threat to the system being protected, as well as iii) discover the communications needed to initiate those mitigation actions.

For example, the autonomous response engine cooperates and coordinates with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc., and also freeze any similar, for example, network activity, etc. triggering the harmful activity on the system being protected.

Accordingly, the autonomous response engine will take an autonomous mitigation action to, for example, shutdown the device or user account, block login failures, perform file modifications, block network connections, restrict the transmission of certain types of data, restrict a data transmission rate, remove or restrict user permissions, etc. The autonomous response engine for an email system could initiate example mitigation actions to either remedy or neutralize the tracking link, when determined to be the suspicious covert tracking link, while not stopping every email entering the email domain with a tracking link, or hold the email communication entirely if the covert tracking link is highly suspicious, and also freeze any similar, for example, email activity triggering the harmful activity on the system being protected.

The autonomous response engine has a default set of autonomous mitigation actions shown on its user interface that it knows how to perform when the different types of cyber threats are equal to or above a user configurable threshold posed by this type of cyber threat. The autonomous response engine is also configurable in its user interface to allow the user to augment and change what type of automatic mitigation actions, if any, the autonomous response engine may take when different types of cyber threats that are equal to or above the configurable level of threat posed by a cyber threat.

The autonomous response engine can also reference its artificial intelligence trained to perform mitigation actions. Again, the autonomous response engine has an administrative tool in its user interface to program/set what autonomous mitigation actions the autonomous response engine can take, including types of mitigation actions and specific mitigation actions the autonomous response engine is capable of, when the cyber-threat module in the detection engine indicates the threat risk parameter is equal to or above the actionable threshold, selectable by the cyber professional. The cyber professional can also indicate what types of mitigation actions can be performed for different users and parts of the system as well as what actions need the cyber professional to approve. Again, the autonomous response engine can also reference a default library of mitigation actions, types of mitigation actions and specific mitigation actions the autonomous response engine is capable of on a particular node.

Referring to FIG. 6, the prediction engine 105 using Artificial Intelligence-based simulations is communicatively coupled to a cyber security appliance 100, an open source (OS) database server 790, an email system 791, one or more endpoint computing devices 791A-B, and an IT network system 747 with one or more entities, over one or more networks 746/747 in the system being protected.

The prediction engine 105 with Artificial Intelligence-based simulations is configured to integrate with the cyber security appliance 100 and cooperate with components within the cyber security appliance 100 installed and protecting the network from cyber threats by making use of outputs, data collected, and functionality from two or more of a data store, other modules, and one or more AI models already existing in the cyber security appliance 100.

The prediction engine 105 may include a cyber threat generator module to generate many different types of cyber threats with the past historical attack patterns to attack the simulated system to be generated by the simulated attack module 750 that will digitally/virtually replicate the system being protected, such as a phishing email generator configured to generate one or more automated phishing emails to pentest the email defenses and/or the network defenses provided by the cyber security appliance 100. For example, the system being protected can be an email system and then the phishing email generator may be configured to cooperate with the trained AI models to customize the automated phishing emails based on the identified data points of the organization and its entities.

The email module and network module may use a vulnerability tracking module to track and profile, for example, versions of software and a state of patches and/or updates compared to a latest patch and/or update of the software resident on devices in the system/network. The vulnerability tracking module can supply results of the comparison of the version of software as an actual detected vulnerability for each particular node in the system being protected, which is utilized by the node exposure score generator and the prediction engine 105 with Artificial Intelligence-based simulations in calculating 1) the spread of a cyber threat and 2) a prioritization of remediation actions on a particular node compared to the other network nodes with actual detected vulnerabilities. The node exposure score generator is configured to also factor in whether the particular node is exposed to direct contact by an entity generating the cyber threat (when the threat is controlled from a location external to the system e.g. network) or the particular node is downstream of a node exposed to direct contact by the entity generating the cyber threat external to the network.

The node exposure score generator and the simulated attack module in the prediction engine 105 cooperate to run the one or more hypothetical simulations of an actual detected cyber threat incident and/or a hypothetical cyberattack incident to calculate the node paths of least resistance in the virtualized instance/modeled instance of the system being protected. The progress through the node path(s) of least resistance through the system being protected are plotted through the various simulated instances of components of the graph of the system being protected until reaching a suspected end goal of the cyber-attack scenario, all based on historic knowledge of connectivity and behavior patterns of users and devices within the system under analysis. The simulated attack module, via a simulator and/or a virtual network clone creator, can be programmed to model and work out the key paths and devices in the system (e.g. a network, with its nets and subnets,) via initially mapping out the system being protected and querying the cyber security appliance on specific's known about the system being protected by the cyber security appliance 100. The simulated attack module is configured to search and query, two or more of i) a data store, ii) modules in the detection engine, and iii) the one or more Artificial Intelligence (AI) models making up the cyber security appliance 100 protecting the actual network under analysis from cyber threats, on what, i) the data store, ii) the modules, and iii) the one or more AI models in the cyber security appliance 100, already know about the nodes of the system, under analysis to create the graph of nodes of the system being protected. Thus, the prediction engine 105 with Artificial Intelligence-based simulations is configured to construct the graph of the virtualized version of the system from knowledge known and stored by modules, a data store, and one or more AI models of a cyber security appliance 100 protecting an actual network under analysis. The knowledge known and stored is obtained at least from ingested traffic from the actual system under analysis. Thus, the virtualized system, and its node components/accounts connecting to the network, being tested during the simulation are up to date and accurate for the time the actual system under analysis is being tested and simulated because the prediction engine 105 with Artificial Intelligence-based simulations is configured to obtain actual network data collected by two or more of 1) modules, 2) a data store, and 3) one or more AI models of a cyber security appliance protecting the actual network under analysis from cyber threats. The simulated attack module will make a model incorporating the actual data of the system through the simulated versions of the nodes making up that system for running simulations on the simulator. Again, a similar approach is taken when the simulated attack module uses a clone creator to spin up and create a virtual clone of the system being protected with virtual machines in the cloud.

The prediction engine 105 with Artificial Intelligence-based simulations is configured to simulate the compromise of a spread of the cyber threat being simulated in the simulated cyber-attack scenario, based on historical and/or similar cyber threat attack patterns, between the devices connected to the virtualized network, via a calculation on an ease of transmission of the cyber threat algorithm, from 1) an originally compromised node by the cyber threat, 2) through to other virtualized/simulated instances of components of the virtualized network, 3) until reaching a suspected end goal of the cyber-attack scenario, including key network devices. The prediction engine 105 with Artificial Intelligence-based simulations also calculates how likely it would be for the cyber-attack to spread to achieve either of 1) a programmable end goal of that cyber-attack scenario set by a user, or 2) set by default an end goal scripted into the selected cyber-attack scenario.

The email module and the network module can include a profile manager module. The profile manager module is configured to maintain a profile tag on all of the devices connecting to the actual system/network under analysis based on their behavior and security characteristics and then supply the profile tag for the devices connecting to the virtualized instance of the system/network when the construction of the graph occurs. The profile manager module is configured to maintain a profile tag for each device before the simulation is carried out; and thus, eliminates a need to search and query for known data about each device being simulated during the simulation. This also assists in running multiple simulations of the cyberattack in parallel.

The prediction engine 105 with Artificial Intelligence-based simulations module is configured to construct the graph of the virtualized system, e.g. a network with its nets and subnets, where two or more of the devices connecting to the virtualized network are assigned with different weighting resistances to malicious compromise from the cyber-attack being simulated in the simulated cyber-attack scenario based on the actual cyber-attack on the virtualized instance of the network and their node vulnerability score. In addition to a weighting resistance to the cyberattack, the calculations in the model for the simulated attack module factor in the knowledge of a layout and connection pattern of each particular network device in a network, an amount of connections and/or hops to other network devices in the network, how important a particular device (a key importance) determined by the function of that network device, the user(s) associated with that network device, and the location of the device within the network. Note, multiple simulations can be conducted in parallel by the orchestration module. The simulations can occur on a periodic regular basis to pentest the cyber security of the system and/or in response to a detected ongoing cyberattack in order to get ahead of the ongoing cyberattack and predict its likely future moves. Again, the graph of the virtualize instance of the system is created with two or more of 1) known characteristics of the network itself, 2) pathway connections between devices on that network, 3) security features and credentials of devices and/or their associated users, and 4) behavioral characteristics of the devices and/or their associated users connecting to that network, which all of this information is obtained from what was already know about the network from the cyber security appliance.

During an ongoing cyberattack, the simulated attack module is configured to run the one or more hypothetical simulations of the detected cyber threat incident and feed details of a detected incident by a cyber threat module in the detection engine into the collections module of the prediction engine 105 using Artificial Intelligence-based simulations. The simulated attack module is configured to run one or more hypothetical simulations of that detected incident in order to predict and assist in the triggering an autonomous response by the autonomous response engine and then restoration by the restoration engine to the detected incident.

The simulated attack module ingests the information for the purposes of modeling and simulating a potential cyber-attacks against the network and routes that an attacker would take through the network. The simulated attack module can construct the graph of nodes with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the system being protected under analysis. Correspondingly, the calculated likelihood of the compromise and timeframes for the spread of the cyberattack is tailored and accurate to each actual device/user account (e.g. node) being simulated in the system because the cyber-attack scenario is based upon security credentials and behavior characteristics from actual traffic data fed to the modules, data store, and AI models of the cyber security appliance.

The prediction engine 105 with its Artificial Intelligence trained on how to conduct and perform cyberattack in a simulation in either a simulator or in a clone creator spinning up virtual instances on virtual machines will take a sequence of actions and then evaluate the actual impact after each action in the sequence, in order to yield a best possible result to contain/mitigate the detected threat while minimizing the impact on other network devices and users that are i) currently active and ii) not in breach, from different possible actions to take. Again, multiple simulations can be run in parallel so that the different sequences of mitigation actions and restoration actions can be evaluated essentially simultaneously. The prediction engine 105 with Artificial Intelligence-based simulations in the prediction engine 105 is configured to use one or more mathematical functions to generate a score and/or likelihood for each of the possible actions and/or sequence of multiple possible actions that can be taken in order to determine which set of actions to choose among many possible actions to initiate. The one or more possible actions to take and their calculated scores can be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then communicate with the cyber threat detection engine, the autonomous response engine, and the cyber-security restoration engine, respectively, to initiate the chosen set of actions to cause a best targeted change of the behavior of the detected threat acting abnormal to the normal pattern of life on the network while minimizing the impact on other network devices and users that are i) currently active and ii) not in breach of being outside the normal behavior benchmark. The prediction engine cooperates with the AI models modelling a normal pattern of life for entities/nodes in the system being protected.

The simulated attack module is programmed itself and can cooperate with the artificial intelligence in the restoration engine to factor an intelligent prioritization of remediation actions and which nodes (e.g. devices and user accounts) in the simulated instance of the system being protected should have a priority compared to other nodes. This can also be reported out to assist in allocating human security team personnel resources that need human or human approval to restore the nodes based on results of the one or more hypothetical simulations of the detected incident.

Note, the prediction engine does not need to not calculate every theoretically possible path from the virtualized instance of the source device to the end goal of the cyber-attack scenario but rather a set of the most likely paths, each time a hop is made from one node in the virtualized network to another device in the virtualized network, in order to reduce an amount of computing cycles needed by the one or more processing units as well as an amount of memory storage needed in the one or more non-transitory storage mediums.

FIG. 16 illustrates a diagram of an embodiment of the cyber security restoration engine cooperating with the other Artificial Intelligence-based engines of the cyber security system to track and understand the cyber threat identified by the other Artificial Intelligence-based engines as well as track the one or more mitigation actions taken to mitigate the cyber threat during the cyberattack by the other Artificial Intelligence-based engines in order to assist in intelligently restoring the protected system, while still mitigating the cyber threat attack, back to the trusted operational state before indications of when the compromised started by the cyber threat attack. The Artificial Intelligence-based cyber security system can also use a cyber threat analyst module 104 to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100 with the multiple Artificial Intelligence-based engines is implemented on computer 1. Computer 1 on the first computer system 10 has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in computer 1 builds and maintains a dynamic, ever-changing model of the 'normal behavior' of each user and machine within the system 10. The approach is based on Bayesian mathematics, and monitors all interactions, events, and communications within the system 10—which computer is talking to which, files that have been created, networks that are being accessed.

For example, computer 2 is-based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation and/or autonomous action.

The cyber security appliance 100 is built to deal with the fact that today's attackers are getting stealthier and an attacker/malicious agent may be 'hiding' in a system to ensure that they avoid raising suspicion in an end user, such as by slowing their machine down. The Artificial Intelligence model(s) in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the network by analyzing data on the activity on the network at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised Learning can break down features of what it is analyzing (e.g. a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network-even when it does not know what it is looking for.

The cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

FIG. 17 illustrates a block diagram of an embodiment of the accumulator module in a web platform configured to communicate with the cyber security appliances across the fleet to gather data of understandings of cyber incidents analyzed by the cyber threat analyst module deployed in each cyber security appliance and feed the understandings of the historic cyber incidents in graph form to train a graph neural network (GNN) model to identify suspicious activity in any ongoing cyber incidents.

The accumulator module in the web platform communicates with the cyber security appliances across the fleet in order to gather the high-level understanding of each complex cyber incident with a graph representation created by the cyber threat analyst module (e.g., AI Analyst) deployed in its own cyber security appliance. The high-level understanding of each complex cyber incident with a graph representation can also be wholly or partially manually gathered and/or automatically gathered by the accumulator module. In an embodiment, the accumulator module in the web platform proactively polls the cyber security appliances to gather the data of high-level understandings of the complex cyber incidents from the wide fleet of multiple cyber security appliances, each cyber security appliance deployed with its own network. The high-level understanding of each complex cyber incident in a graph representation can be retrieved from anonymized cyber threat analyst module (e.g., AI analyst) incidents and then be used to train the GNN models. The accumulator module can represent a high-level understanding of a complex cyber incident as a graph. (For example, see FIG. 20). Although this embodiment refers to the use of a GNN model, other models could be used instead of a GNN model such as a custom transformer.

FIG. 20 illustrates an example graph of an embodiment of activity between entities, as nodes in a graph, such as lateral movements within a network and encryption of data in portions of the network interpreted and/or generated by the GNN model. The graph 55 shows example activity between entities. In an embodiment, the cyber threat analyst module and/or the accumulator module in a web platform can represent detected compromises/cyber incidents with an abstract graph representation of activity and the entities involved in that activity, such as FIG. 20. In an embodiment, when analyzing incidents, the cyber threat analyst module in the cyber security appliance can also create graphical representations of, for example, current network communications, email flows, SaaS usage, etc. protected by the cyber security appliance.

Referring back to FIG. 17, in an embodiment, the retrieved, anonymized, complex, cyber incidents from cyber threat analyst modules across the fleet are in the form of graphs. The graph representation can be an abstract representation of all of the entities involved in the incident and the kind of interactions with each other. In this example, the nodes of the graph are objects such as users, devices-servers, as well as external hosts communicating with the users and devices in the network, and the edges between the nodes that correspond to different activities, such as scanning, encryption, lateral movement, etc. Note, that the interactions themselves can have their own different types and metadata as embedded information in the graph and that representation is itself useful to discover complex cross-network or cross-environment activity. For example, the interaction can have its metadata, such as the lateral movement that occurred at 10 PM which is outside of the normal work hours and was unusual for this entity, which is for example, user-A a marketing employee, to access node B, which is a financial server. Eventually, the accumulator module in a web platform can feed these understandings of a complex cyber incident with a graph representation form to train a graph neural network (GNN) model in the web platform to identify suspicious activity. However, the system must initially build the GNN model that is designed to analyze these complex cyber incidents in graph representations, and then update their training as time goes on during the operation of the cyber security appliances.

The GNN model in the web platform can be built and then trained on the fleet data of high-level understandings of the complex cyber incident in the graph representation form.

A data store cooperating with the accumulator module in the web platform can save the understandings of the complex cyber incidents in graph form in graph form as historical incidents. The accumulator module in the web platform cooperating with the data store can feed those understandings of the complex cyber historic incident with a graph representation form to train the instance of the GNN model in the web platform to identify suspicious activity in the ongoing cyber incidents and/or historic cyber incidents. The data store cooperating with the one or more GNN models in the web platform can then also save embeddings produced by the output of that GNN model.

The GNN model can be trained using the graphical data that the cyber threat analyst module has produced so far with the labels, for example, corresponding to whether the sequence of communication led to an incident or breach. The graphs that the cyber threat analyst module produces can be high level summaries of incidents with labels of how the activity is associated with the incident and how that cyber incident progresses over time. Labelling can also include examining incident scores and other properties.

The web platform can use the GNN model(s) to analyze various shapes of graphs with its branches, labels of nodes within the graphs, behavioral activity occurring between nodes, and behavioral activity occurring on or to that node. The GNN model takes in those cyber security incidents and can take the data and map them onto a graph with their complex relationships and interdependencies between objects and nodes representing devices, users in the network, servers, and external hosts. In an embodiment, the GNN model may label nodes of the graph and connections between the nodes of the graph with that interdependent activity/nexus such as scanning, lateral movement, and other things. In an embodiment, the cyber threat analyst module produces the labels for the nodes of the graph and the connections between the nodes of the graph with that interdependent activity/nexus, and then supplies that labelled graph as input into the GNN model.

The graph can be an abstract representation of all the entities involved in the cyber incident and the kind of interactions with each other. In an example, they may be network devices.

In an embodiment, once the cyber threat analyst module (e.g., AI analyst) has the objects making up the nodes of the graph, and the cyber threat analyst module labels those nodes with who they represent and what type of activity is making a nexus of them, between them, the pathways and connections are naturally going to create a shape of that graph. The GNN models will analyze the created shape of that graph and save both the graph information and the GNN model's eventual analysis and understanding of that graph. The GNN models will also train on cyber incidents on an ongoing basis during the deployment of the cyber security appliance. Later, based on future incidents happening, an instance of the trained GNN model in the local cyber security appliance can use the understanding of the corpus of previously analyzed graphs and based on the graph analysis of similar events happening again compared to a historical incident, the trained GNN model will be able to predict what is happening and what is likely to happen for the purposes of taking one or more autonomous actions to heal/restore entities back to an operational state prior to a cyber-attack, or stopping and identifying unusual activity. In the cyber security appliance, the scoring module 25 and generative incident module 35 will look at the activity between entities, such as lateral movements within a network that are occurring as well as whether scanning of the network is occurring, and/or encryption of portions of the network is occurring. (See FIGS. 2 and 3 and note, that the instance of the trained GNN model(s) in the cyber security appliance will operate and function similarly in most respects as the instance of the GNN model in the web platform) Once the trained GNN model sees the beginning of a shape of a graph of a current cyber incident similar to one or more in the corpus of overall graph shapes, entities involved, and associated metadata trained on occurring again, then the GNN model can correlate that to what is a likely one or more progressions of this incident and would that progression be something bad. Thus, the generative incident module 35 can look at activity between entities, as nodes in a graph. The activity can be one or more of 1) lateral movements within a network, 2) scanning of the network, and 3) encryption of data in portions of the network. The GNN model can correlate one or more portions of a shape of a graph of the ongoing cyber incident similarity to one or more in a corpus of overall graph shapes in historic cyber incidents trained on occurring again, and then the GNN model correlates that to what is a likely one or more progressions of the ongoing cyber incident and would that progression be something bad.

The GNN model operates on graphs—for instance, it could classify graphs based on their properties. As a result, by training such a GNN model on the overall graph and each of their subgraphs associated with incidents, the model can classify subgraphs associated with types of incidents, identify an overall description, highlight the kinds of overall activity involved, and aid in the suggestion of remediation steps.

Next, the graph neural network (GNN) model in the web platform (and/or the instance in the local cyber security appliance) can be built, which is designed to analyze these graph representations, and then produce outputs for at least three different activities. The GNN model can perform a graph-based meta-analysis of the events occurring in an ongoing cyber incident, and then produce an output, at least one of, 1) to make embeddings that are subsequently clustered and analyzed, 2) to be classified into a type of cyber incident and assigned score indicative how bad the ongoing cyber incident is, and 3) to be generative, for example, to make a predictive graph of a possible end result of the events occurring in the ongoing cyber incidents and what an end graph shape is going to look like based on how events evolved in historical cyber incidents. In an embodiment, the GNN model produces an output of all three of, 1) making embeddings that are subsequently clustered and analyzed, 2) classifying into a type of cyber incident and assigned score indicative of how bad the ongoing cyber incident is, and 3) generating, for example, to make a predictive graph of a possible end result of the events occurring in the ongoing cyber incidents and what an end graph shape is going to look like based on how events evolved in historical cyber incidents. The GNN model can identify and understand the events occurring in the ongoing cyber incidents as well as generate the predictive graph of the possible end result of the events occurring in the ongoing cyber incidents and what the end graph shape is going to look like based on how the events evolved in historical cyber incidents so that the user can take action to stop unusual activity occurring in the events occurring in the ongoing cyber incidents.

1) In a web platform instance, the graph neural network model(s) are configured to make embeddings that are subsequently clustered and analyzed such as utilizing the output of embeddings from the trained model to locate similar clusters of confirmed malicious cyber incidents, etc.

The GNN model(s) is trained to analyze the corpus of historical cyber incident graph representations and then generate an output of embeddings representative of each graph of a cyber incident, which is a kind of neural network representation of a graph in a format that the machine learning understands, based on its understanding of the cyber incident.

The GNN model can perform a graph-based meta-analysis of events and then graph a neural network on that. The system trains machine learning algorithms on graphs of cyber incidents to try and classify those graphs into associated categories of graphs, so when an incident in a network with the cyber threat analyst module deployed occurs, it can analyze the series of nodes in the graph, such as boundary network devices and/or endpoint computing devices connected together by linking factors.

The neural network is trained on those structures to try and derive an understanding of the overall shape of the graph, the activities, and entities in the graph, and then what the GNN model thinks that incident is. For example, linking factors on each of the nodes and the labels on the edges are analyzed. When the GNN model thinks this is ransomware, which was confirmed through semi-supervised learning, and then derives an overall type of incident and then suggests appropriate remediation actions to mitigate the ransomware attack (e.g., cyber-attack). The system creates the shape of the incident through a graph neural network in order to correlate that to a type and/or category of that incident. In an embodiment, a first GNN model can cooperate with the accumulator module and data store to train on and then compare the historical corpus to determine a current input/representation of the cyber incident, and subsequently generate corresponding embeddings. A second GNN model can cooperate with the accumulator module and data store to train on and then compare a current input/representation of the cyber incident to predict a likely end result of the cyber incident based on the historical corpus of cyber incidents, and subsequently generate corresponding embeddings. Both GNN models can train using semi-supervised learning and by using the output of previously analyzed cyber incidents from cyber threat analyst modules across the fleet of cyber security appliances, with the training data already being somewhat labeled by machine learning applied by the cyber threat analyst modules.

The trained GNN model(s) compare i) current behaviors/activities and/or ii) the set of entities involved in matching similar starting behaviors/activities currently observed in the shape of the graph of the current cyber incident to shapes of subgraphs found in the historic cyber incidents, and then look to determine how probabilistically the current events will escalate into the overall shape and end result of a historic incident. On top of that based on clustering similar types of incidents, then a graph of a current cyber incident merely needs to predictably escalate from matching a subgraph found in the overall shapes of similar types of cyber incidents and then also be highly probable to have similar end results of the historic incidents of this type of cyber threat.

A local datastore in each cyber security appliance is configured to store the embeddings and the different clusters that are created. An embeddings module 15 in the web platform is configured to package and then send the different clusters of embeddings that are created to the data store in each cyber security appliance instance for their use in their network without any lag in communicating with the web platform.

The embeddings module 15 in the web platform clusters the embeddings representative of the GNN model's understanding of each graph of a cyber incident for the embeddings as well as has a search function to provide a way of searching those clusters and/or interacting with those clusters. For example, the embeddings module 15 uses a clustering algorithm to cluster embeddings representative of graphs of cyber incidents into clusters of different incident types the same kind of activity/behaviors occurring, and/or the same kind of cyber threat, and/or incidents of the same supposed type; and thus, later have four example use cases.

The embeddings module 15 cooperating with the GNN model can use the embeddings to classify, identify, and/or equate, new activity under analysis, with old historic activity already trained on.

The embeddings module 15 can use the embeddings to analyze a cluster of embeddings to remove false positives when they do not cluster very nicely with others, and/or if something does not cluster nicely—is it a new attack by a new cyber threat? is it a false positive cyber incident not brought on by a cyber threat?

The embeddings module 15 can use the embeddings to perform attribution—are these closely clustered as they all represent the same type of Advanced Persistent Threat cyber threat?

The embeddings module 15 can use the search function to perform searching through the embeddings to find, for example, specific behaviors more common on this customer and/or customer type.

The embeddings module 15 can send the clusters of embeddings back to the GNN model to improve its training on cyber incidents and subsequent generation of embeddings on the analysis of those cyber incidents. Note, the clusters of embeddings feedback and training could be merely optional.

FIG. 18 illustrates a block diagram of an embodiment of the scoring module that contains a scoring classifier configured to monitor events including traffic and behavioral activity between entities in the ongoing cyber incident as well as the output from the GNN model.

In the web platform, an instance of a scoring classifier cooperates and communicates with the trained GNN model on the AI cyber incidents. The scoring classifier evaluates and scores all of the known corpus of analyzed graphs of incidents analyzed by a trained GNN model on the AI cyber incidents. The instance of the scoring classifier in the web platform can undergo semi-supervised machine learning to produce the scores and the predicted likelihood of escalating into a significantly bad cyber incident, such as an APT cyber-attack.

In a local instance of a cyber security appliance, a deployed instance of the trained GNN model implemented on the local cyber security appliance is configured to analyze events occurring in ongoing cyber incidents, to cooperate with a local instance of a scoring classifier, and to turn the analyzed events occurring in the ongoing cyber incidents into actionable information at least reported by a user interface to a user. The GNN model is configured to further send the output of the analyzed events occurring in the ongoing cyber incident to be acted upon by two or more of i) an autonomous response module in the local cyber security appliance configured to mitigate a cyber threat involved in the cyber incident, ii) a restoration engine configured to suggest an appropriate action to take for restoring an entity involved in the cyber incident back to an operational state prior to the ongoing cyber incident, and iii) a cyber-attack simulator configured to run a simulation of possible actions to be taken by the cyber threat in the ongoing cyber incident and an end result.

The scoring module 25 can have a local instance of the GNN model and a local instance of the scoring classifier.

The GNN model in the Artificial Intelligence-based cyber security appliance can perform higher-level incident classification and analysis using graph neural networks. The instance of the scoring classifier in the cyber security appliance is trained and deployed.

The scoring module 25 and the generative incident module 35 in the cyber security appliance monitor traffic and behavior to pull in new cyber incidents created from incident events. In the scoring module 25, the GNN model can map the entities and activities to an incident graph and/or send the mapped incident graph to the scoring classifier. In the scoring module 25, the cyber threat analyst module produces the labeled entities and activities cyber incident graph, which is then supplied to the GNN model, whose output is then sent to the scoring classifier.

The scoring classifier can produce an output that estimates i) the badness/maliciousness of a current set of events as well as ii) how bad it may get with a probability of a more significant event happening. The local instance of the scoring classifier analyzes a current set of events happening in that network protected by the cyber security appliance. The scoring classifier can output a score that estimates the maliciousness or badness (or not bad), of a set of events represented; and thus, determine whether a given incident is suspicious or not. In addition, the output of the scoring classifier can indicate the likelihood of whether the cyber incident is going to get worse and a predicted score if it was to get worse. Thus, the scoring classifier does not just output the overall score, but also outputs the likelihood that it is going to grow and get worse. Thus, an indication score of how bad something is as well as the likelihood of how bad it could get. The GNN model cooperates with the scoring classifier to be able to analyze a graph of current events of a current cyber incident and predict a value representing the GNN model's confidence in the current network communications escalating into something nefarious. The GNN model can be provided with fine-tuning on an assessment by the GNN model of how bad the ongoing cyber incident is and a likelihood prediction of the cyber incident escalating based on a frequency of occurrence of the type of cyber incident, including events and entities involved, recorded in historical data for this network in a data store in the cyber security appliance.

Thus, the scoring module 25 that contains a scoring classifier monitors events including traffic and behavioral activity between entities in the ongoing cyber incident as well as the output from the GNN model. The scoring classifier produces an output of the assigned score that estimates i) a maliciousness of a current set of events in the ongoing cyber incident as well as ii) a probability indicator and a predictive score corresponding to how bad the ongoing cyber incident may get.

The instance of the scoring classifier in the cyber security appliance can start with a baseline score associated with events matching a graph representation of a cyber incidence. The scoring classifier can then perform optional local fine-tuning to take the instance of the generic GNN model trained on fleet data, and further train the scoring classifier to be more relevant to a frequency of the activities and relationships between entities specific to this organization's network environment where the cyber security appliance is deployed. This affects all uses of the GNN model (e.g., embeddings, classification, generation). The scoring classifier can then perform optional local fine-tuning on the generated score to create the assigned score indicative of how bad the ongoing cyber incident is and a likelihood prediction from the scoring classifier based on a frequency of occurrence of the type of cyber incident, including events and entities involved, recorded in historical data for this network in a data store in the cyber security appliance. If scanning is common on this network, then the score is lower when scanning occurs. Note, that the fine-tuning step adjusts the scoring the scoring, frequency of the activities and relationships between entities specific to this organization's network environment, and/or classifying output coming from the GNN Model (for both of those two GNN models locally) on incidents in their environment. Again, the fine-tuning step may just provide the GNN model with fine-tuning on an assessment by the GNN model of how bad the ongoing cyber incident is and a likelihood prediction of the cyber incident escalating based on a frequency of occurrence of the type of cyber incident, including events and entities involved, recorded in historical data for this network in a data store in the cyber security appliance.

The score can take into account the prediction about what future actions will occur. For example, the GNN model looks at a current graph of events (entities involved and the activities (e.g., example activity of lateral movement and beaconing) occurring between each set of entities connecting to a node in the graph. The GNN model then compares to the historical corpus to determine a current understanding of the cyber incident as well as predict more activity, with a greater than 50% chance/distribution of happening, for example, lateral movement to other entities in the network. In an embodiment, the GNN model predicts how the cyber incident will evolve with a greater than 80% chance/distribution of happening. In an example, the GNN model continues to evaluate the ongoing cyber incident and maps some more lateral movement between entities but also maps that the network has had some unauthorized admin conns, and then the GNN model can predict with a high probability that this current cyber incident will probably see an unauthorized encryption activity event down the line and then the scoring classifier evaluating that prediction output from the GNN model will generate a score higher than just the event with lateral movement and beaconing.

The scoring module 25 can combine the numeric score from the scoring classifier with other metrics (e.g., text, symbols, and/or images combined with the numeric score output of the scoring classifier and pull in the metrics text, symbols, numerical properties of the incident, components of the incident already determined by the cyber threat analyst module, and/or images repetitive of entities and/or activities from the cyber incident to form a summary of the overall instance score).

Finally, the scoring module 25 cooperates with the user interface to display, generate a report, and/or send a text and/or email notice to one or more users with an overall incident score with a summary in text of why (including points factored in) that overall incident score has been calculated/arrived at.

Note, during the early stages of a cyber incident, it is often difficult i) to give a given cyber incident an overall description, and/or ii) to determine the kind of overall compromise or malware involved because the resulting incidents involve capturing complex compromises involving multiple different entities and activities. However, the scoring module 25 and the generative incident module 35 can identify complex cross-entity incidents by using graph-based analysis.

FIG. 19 illustrates a block diagram of an embodiment of the generative incident module configured to contain an instance of the GNN model and/or other Artificial Intelligence construct to use the embeddings.

In a local instance of a cyber security appliance in the generative incident module 35 can have an instance of the GNN model installed locally and/or another kind of Artificial Intelligence construct such as a transformer-based model. The local instance of the GNN model can use embeddings, stored locally on the cyber security appliance in the data store, sent from the web platform.

The generative incident module 35 can have an instance of the GNN model optionally finetuned on the frequency of local data occurring in this network being protected by the cyber security appliance. Thus, the generative incident module 35 contains an instance of the GNN model. The instance of the GNN model uses the embeddings, which were created and sent from the data store in the web platform, which are now stored locally on the cyber security appliance in a data store. A user interface cooperates with the generative incident module 35 to allow the instance of the GNN model to be finetuned on an analysis of the ongoing cyber incident based on a frequency of local data occurring in this network being protected by the cyber security appliance.

The generative incident module 35 presents an input on the user interface to receive optional customizations from the user of that cyber security appliance. For example, the generative incident module 35 can optionally modify the output using the customer's network paths and entity nodes making up their environment.

APIs can directly connect between the scoring module 25 and the generative incident module 35 to the restoration engine (e.g., Heal) and the cyber-attack simulator (e.g., Prevent) as well as connections into the Detect engine portion including the cyber threat analyst module (e.g., AI Analyst).

A local cyber security appliance may use the graph neural network model trained on significant cyber incidents represented in a graphical form to analyze the significance of ongoing cyber incidents in a customer's environment protected by the local cyber security appliance to be able to generate synthetic incidents in a cyber-attack simulator based upon a real knowledge of existing cyber incidents and also customer specific cyber incidents. For example, the generative incident module 35 can also send to the cyber security attack simulator (e.g. PREVENT), take an incident that's currently happening and send it to the cyber security attack simulator, run a simulation of possible actions to be taken by a cyber threat and the end result, and determine meaningful and likely critical attack paths based on current conditions of the incident that can be acted upon to stop the cyber threat. The generative incident module 35 feeds the cyber incident and its likely end result to the cyber-attack threat simulator in order to suggest the appropriate actions to take to mitigate and stop the ongoing cyber incident.

Also, the GNN will analyze a current graph of a cyber incident being generated to one or more likely/probable predicted shapes of the graphs of cyber incidents, and once the GNN model sees a similarity to shape again (along with the behavior activities and/or entities involved), then the GNN model will say okay the model knows what this current graph of a cyber incident currently looks like, correlate that to one or more end result cyber incident graphs that have a high likelihood of occurring, and then correlate whether that end result cyber incident graph is something bad or not.

User interface configured to output a threat report and/or a series of MITRE tactics, the current and predicted graphs of the incident(s), etc. Note, that MITRE ATT&CK technique detections can be a way to identify and respond to cyberattacks using the MITRE ATT&CK framework. The framework includes a list of techniques that attackers might use, such as spear phishing, command and control, credential dumping, etc.

The GNN model can perform a graph-based meta-analysis of events and then graph a neural network on that. The GNN model creates the shape of the incident through a graph neural network in order to correlate that to a type and/or category of that incident. The generative incident module 35 then takes the next step to feed the cyber incident and its likely end result to the cyber-attack restoration engine in order to suggest the appropriate actions to take for restoration. The generative incident module 35 then cooperates with the user interface to present a report to explain the ongoing cyber incident, predicted end results, suggested actions to take, etc., to an end user.

A local cyber security appliance may use the instance of the graph neural network model trained on significant cyber incidences represented in a graphical form to analyze the significance of ongoing cyber incidents in a customer's environment protected by the local cyber security appliance to be able to predict where and how an ongoing cyber instance may escalate in the customer's environment. This graph neural network model can be configured to identify observed network activity that is occurring and to predict what will happen next, based on a historical graphical analysis of existing AI analyst incidents, for the purposes of healing and/or stopping unusual activity.

A local cyber security appliance may use the graph neural network model trained on significant cyber incidents represented in a graphical form to identify how widespread this particular kind of compromise is.

A local cyber security appliance may use the graph neural network model trained on significant cyber incidents represented in a graphical form to identify and understand the events occurring in the ongoing cyber incidents and to check how closely the events relate to confirmed malicious cyber incidents to be classified into the type of cyber incident assigned the score indicative of how bad the ongoing cyber incident is.

Some Base Information on the GNN Model

The Graph Neural Network model can use data generated from non-Euclidean domains, represented as graphs with complex relationships and interdependencies between objects/nodes of a graph representing for example entities such as users and devices in the network as well as external hosts and the edges between the nodes corresponding to different activity such as scanning, lateral movement, etc.

The graph is a data structure consisting of two components: nodes (vertices) and edges. The graph's shape can be defined as the set of nodes and the edges between them. Data in a graph representation is so complex that it can create a lot of challenges for existing machine-learning algorithms. A reason is that conventional Machine Learning (e.g., Deep Learning) tools are specialized in training on simpler data types. Simpler data types like images, natural language documents, etc., always have the same structure and size, which one can think of as a fixed-size grid where there is a fixed pattern to the relationships within that graph. The GNN model can train on and analyze data on cyber incidents that do not have the same structure and size, activities, and/or entities involved.

The GNN model can train on and analyze complex graphs, without a fixed form, with a variable size of unordered nodes, where nodes can have different amounts of neighbors, and there is no spatial locality.

The Graph Neural Network can use deep learning methods designed to perform inference on data described by graphs and provide an easy way to do node-level, edge-level, and graph-level prediction tasks. The GNN can do what Convolutional Neural Networks (CNNs) fail to do. The GNN model can map nodes to a dimensional embedding space (such as low dimensional space rather than the actual dimension of the graph) so that similar nodes in the graph are embedded close to each other. The GNN model can map nodes of, for example, a network and external endpoints connecting to the nodes of the network onto a graph so that similarity in the embedding space approximates similarity in the network.

The GNN model trains on attempting to predict when a cyber incident is going to escalate accurately, estimate how much can the cyber incident escalate, and how likely the cyber incident is to escalate, and thus, generate an output interpretable by a trained scoring classifier on how concerned a user should be about a current cyber incident.

Also, the GNN model trains on attempting to provide some meaning to new activity occurring between entities in a cyber incident based upon an awareness of historic activity, which is not rigid and is not static, updated as incidents are evaluated in deployed cyber security appliances. The GNN model brings some meaning to being able to say this ongoing cyber incident closely resembles historic cyber incidents malicious or not bad.

In an embodiment, for an incident ongoing, the GNN model will generate a notice and go off when the GNN model suspects/determines that the graph of the current cyber incident has a very high probability of having something bad/malicious occur, such as unauthorized encryption, at some point in the future. For example, the GNN model can analyze a graph of a current cyber incident and predict that this graph is marked as a potential Ransomware event before the encryption event actually happens, and is assigned a big score and then fed to the cyber-attack simulation engine to recommend the best autonomous response actions to take to mitigate the cyber-attack of this Ransomware attack. Note, the GNN model can also analyze a graph of a current cyber incident and predict the type of cyber attack occurring as well as output a recommended set of mitigation actions to take based on the activity observed. The trained GNN model because it uses the predictive capabilities gives a time advantage to take actions because a user need not wait for the final triggering event for a cyber-attack to happen.

Playbooks and Simulations for Cyber Security Scenarios

Some features and functionality that can be applied in, for example, the cyber-attack restoration engine 190 are now described. Features and functionality of certain embodiments may facilitate one or more of: i) ease of deployment, ii) scheduled behavior/activity, iii) simplification of resolution, iv) involve use a large language model, and v) improved readiness with cyber incident simulations as well as use of AI-generated playbooks for the cyber-attack restoration engine 190.

The cyber-attack restoration engine 190 may aid in prioritizing restoration and disaster recovery. However, the cyber-attack restoration engine 190 may have additional capabilities during set up to integrate with an organization's/customer's system including their device management systems and their third-party backup systems, etc. in order for the system to autonomously invoke and perform the disaster recovery and intelligently know what the options are. The system may also evaluate a state of preparedness a given customer's network is in for disaster recovery scenarios, and then report an assessment of disaster preparedness to the user/organization.

The following features and functionality highlight the ease of deployment of the system (e.g., the restoration engine 190).

In some implementations, the system may make use of the Artificial Intelligence based cyber security appliance supplies network, SaaS, Cloud, and Email info to list forwarding rules to work out which third party integrations they might be using (and thus need to be protected and accounted for in defending this particular network) and/or make use of the Artificial Intelligence based cyber security appliance/Email data to detect emails that are being forwarded into the platform e.g. Zendesk tickets with emails on or SF cases with emails attached.

In some implementations, a chatbot wizard may be used for helping to guide people through setting up their integrations and to ask or answer questions like, what license do I need? where do I put my API key, etc.

The following features and functionality highlight how scheduled activity is monitored and/or acted upon by the system (e.g., the restoration engine 190).

In some implementations, monitoring of device management systems may be implemented to track execution of policies and software updates etc. For example, monitoring of device management systems may be implemented to track whether software updates have happened, scanning across an entire environment taking backups, etc. Repeated failures could cause a type of model breach which could feed into other aspects of the product.

Scheduled actions that can be scheduled to make healing with the cyber-attack restoration engine 190 after an incident a lot easier can be implemented by an organization/customer in accordance with one or more of the following examples:

In some examples, the system may take a look at their whole setup through both integration monitoring and through custom input to determine the best way we can ensure continuity after an attack. Such continuity may be ensured by using tailored recovery plans, preventing data loss, etc.

In some examples, the system may take backups, scan all files for malware to check before going to that restore point, etc.

In some examples, the system may collect information from all integrations to determine device state to work out the best path.

In some examples, the system may report preparedness for the customer side rather than the Artificial Intelligence based cyber security appliance side or adding to current reports with a different angle.

In some examples, the system could implement scheduled backups, software updates, etc. across the whole organization/company to ensure it is easy to heal with the cyber-attack restoration engine 190 if something does go wrong.

The following features and functionality highlight how new resolution actions may be made by the system (e.g., the restoration engine 190).

In some examples, the system may check backups for sensitive data and checking that no data has accidentally been made publicly accessible.

In some examples, the system may provide custom heal actions, which may allow users to enter custom endpoints to improve platform and action options.

In some examples, the system may facilitate either SaaS, IT network, or Email and adding respond for email in third party integrations to remove malicious emails/attachments when they have been forwarded to third parties before IT network, or Email can intercept them.

The following features and functionality highlight how system (e.g., the restoration engine 190) approach may facilitate simplification of resolution.

In some examples, the cyber-attack restoration engine may check to ensure that the action can be completed after it has been suggested. If not, reasoning as to why and suggestions as to how to make it possible to utilize the action may be provided.

In some examples, the system may use security center alerts to create multi-stage fixes for misconfigurations e.g., using a security center such as GCP.

In some examples, the system may provide a wizard that guides people through fixing issues/misconfigurations on the platform that cannot be achieved programmatically. It may be possible to send this information guide over a chatbot and offer assistance when guiding through fixing.

In some implementations, the cyber-attack restoration engine 190 can provide incident preparedness training, which is where a user is able to essentially see how a cyber attack and restoration incident would unfold, and how the cyber-attack restoration engine would respond to it in a simulation environment. The user can then evaluate whether the choices that the artificial intelligence and the machine learning is taking really is the best way to prepare and restore the network in response to the attack given hindsight of these simulations.

In some implementations, the cyber-attack restoration engine 190 can use a graph neural network or transformer-based architecture (as described previously) in order to produce graph structures suitable for simulating or representing cyber incidents.

The cyber-attack restoration engine 190 may bring AI-enabled capabilities to transform incident response, readiness, and recovery.

Security teams may now be able to address more emerging, potentially critical incidents earlier, with more confidence by implementing the various techniques described herein.

The cyber-attack restoration engine 190 may be considered to complete the Cyber AI Loop, delivering resilience throughout the cyber life cycle from prevention, to detection, to response, and now to recovery.

The cyber-attack restoration engine 190 may use AI to help businesses and organizations more effectively prepare for, rapidly remediate, and recover from cyber-attacks. The cyber-attack restoration engine 190 may provide security teams with unique abilities to simulate real attacks within their own environment, create bespoke incident response plans as cyber incidents unfold, and automate actions to rapidly respond to and recover from those incidents.

Managing emerging cyber-attacks presents an enormous challenge for security teams who must make decisions quickly in the heat of the attack based on potentially hundreds of changing and uncertain data points and factors. In a recent ransomware incident, analysts needed around 60 total hours of investigative work to build a complete understanding of the full scope and varied details, yet the activity unfolded across just 10 hours. The pressure and complexity facing these teams is poised to grow as generative AI enables attackers to increase the speed, scale, and sophistication of novel attacks. With the global average cost of a data breach reaching $4.35 million in 2022, the financial, operational and reputation stakes for businesses to remediate and recover quickly are high.

The cyber-attack restoration engine 190 leverages Self-Learning AI to give security teams new abilities designed to build cyber resilience and help them more easily and confidently address live incidents. With the cyber-attack restoration engine, security teams can one or more of:

1) Simulate real-world cyber incidents, allowing teams to prepare for, and practice, their response to complex attacks on their own environment.
2) Create bespoke, AI-generated playbooks as an attack unfolds based on the details of their environment, the attack, and lessons learned from their previous simulations. This may reduce information overload, prioritize actions and enable faster decision-making at critical moments.
3) Automate actions from the response plan to rapidly stop and recover from the attack within the cyber-attack restoration engine interface.
4) Create a full incident report, including an audit trail of the incident response with details of the attack, actions the cyber-attack restoration engine 190 suggested, and actions taken by the security team for future learning and to support compliance.

Transforming Readiness with Incident Simulations

The cyber-attack restoration engine's simulated incidents are a first-of-its-kind capability for security teams to safely run live simulations of real-world cyber-attacks ranging from data theft and ransomware encryption, to rapid worm propagation, all in their own environments and involving their own assets. Security teams are expected to flawlessly manage incident response in the face of a live, rapidly unfolding, often novel attack, usually without any realistic practice. The cyber-attack restoration engine enables teams to get real world experience managing attacks as they would happen to the business and regularly practice these procedures to help fine tune their responses. That means teams are not running their incident responses for the first time in the face of a real, live attack.

Note, tabletop simulations tend to create a lot of talking through the motions of an incident, forgetting the human experience of the attack. The immersive experience created by the cyber-attack restoration engine's simulated incidents may bring the emphasis back to the experience of the team and ensuring they are as prepared as possible.

Transforming Incident Response with Bespoke, AI-Generated Playbooks

When a live incident does occur, the cyber-attack restoration engine 190 may use insights from, for example the cyber threat "detection" engine in the cyber security appliance to create a picture of the attack and a bespoke, AI generated, response playbook, built from the cyber security appliance's knowledge of the incident, the environment and lessons learned from the security team's previous simulations. The cyber-attack restoration engine 190 may recommend the priority order for remediation actions based on factors like further damage the asset can cause, how much the attack is relying on the asset as a pivot or entry point, and its importance to the business. Consequently, security teams can adapt their defenses as an incident evolves, ending it more rapidly and with less overall disruption.

The reality is that sets of manual incident response playbooks do not last very long. These days they may be outdated 24 hours after they are created, because the cyber landscape is just changing so rapidly. It is necessary to constantly revise them because there are so many things that may not be thought of. Moreover, these playbooks assume a user has a controlled environment, which is not the case when an attack occurs. Utilizing the cyber-attack restoration engine AI solutions may reduce or end the need for these coarse static playbooks.

Transforming Recovery with Automated Remediation & Reporting

The cyber-attack restoration engine 190 may further enable security teams to quickly and efficiently manage and recover from live incidents by integrating with a variety of tools in a business's wider security stack to automate actions. Within the cyber-attack restoration engine's live playbooks, teams can activate and manage authorized tools from across their environment, from a single interface with a click of a button. The cyber-attack restoration engine 190 can integrate with any appropriate application such as Microsoft Defender for Endpoint, Veeam, Acronis, Intune, JAMF, M365, Google Workspace and ServiceNow.

The cyber-attack restoration engine 190 may provide security teams with automated incident reports during and after an attack, giving teams valuable time back that is normally spent writing detailed updates. The reports provide analysis of the attacker and security team actions, decisions, containment, and recovery information to keep stakeholders updated as an event unfolds. After an attack, it provides essential compliance information to third parties such as forensics teams, insurance providers and legal teams and assists with reviews and learning lessons from the attack and the response.

Closing the Cyber AI Loop

The cyber-attack restoration engine 190 may work with the detection engine, the prediction engine with Artificial Intelligence-based simulations to build a live picture of the environment and attack, and may integrate with the autonomous response engine/module to prioritize, isolate, and heal key assets to cut off and shorten attacks. The cyber-attack restoration engine 190 may close the Cyber AI Loop, bringing together detection of cyber threats, prevention of cyber-attacks, response to cyber-attacks to mitigate them, and restoration of the network even while the cyber-attack is still occurring into a single platform in which each element draws insights from and continuously reinforces the others to create a best-in-class cyber defense.

This disclosure considers where AI can be the most valuable in augmenting the people in a security team and how it can have the most positive impact on their work. The cyber-attack restoration engine 190 may provide cyber resilience to upskill teams and reduce the overload analysts face during an attack, to help them recover and get back to business faster and more effectively.

With the completion of the full Cyber AI Loop, security teams can maximize the time and talent of their human teams, enabling them to focus on critical and complex tasks with the knowledge that the system is autonomously working in the background to prevent, detect, respond, and heal from cyber-attacks in a continuous, reinforcing loop.

The cyber-attack restoration engine 190 uses AI as part of its approach. Incident response and recovery has been an underserved piece of the cyber security puzzle, with most businesses and organizations still reliant on manual methods to prepare for attacks and rules-based approaches to respond and recover from them. By introducing AI support to incident response and recovery, businesses may be able to take a new, faster, more effective approach to attacks and significantly reduce the burden on security teams.

The closing of the Cyber AI Loop with the cyber-attack restoration engine 190 may give businesses and organizations access to a cyber security platform that reinforces and protects their ecosystem by knowing and acting on what is normal and abnormal for them. As new technologies like generative AI enable novel attacks to be created and deployed at increasing speeds, this kind of AI-based learning and machine-speed protection will be invaluable in keeping businesses safe.

Further Cyber Security Restoration Engine Concepts.

Balancing Bespoke and Pre-Planned Remediation and Recovery Actions

It is not plausible for cyber security teams to plan for every possible detail that might occur within any possible cyber attack and how to remediate and recover from it, likely at scale and with great variety. On the other hand, security and IT teams under time pressure during a cyber incident may benefit enormously from having pre-approved plans to follow that they know will be effective and efficient.

A set of actions to take a system from an untrusted and possibly non-functional system back to a trusted operational state is most commonly known as a "playbook." Playbooks have typically taken the form as either a set of documents covering a few different types of cyber attack at a low level of detail, or as an automated set of actions taken in response to a specific set of circumstances divorced from any wider context.

The cyber security restoration engine 190 takes a new approach, enabled by the complex machine understanding of the cyber incident provided to it. Sets of actions are broken down into "playbooklets," which may be considered to be reusable building blocks of playbooks that solve a specific independent sub-problem and may likely appear in more than one complete playbook.

A playbook may comprise a combination of "playbooklets," which are similar to playbooks (i.e. defined series of steps and actions) but address a specific independent problem. Referring to the example of depicted by FIG. 3B, each edge on graph 300, corresponding to a type of interaction, may have one or more playbooklets associated with that type of interaction that would typically be required to recover from the effects of the interaction. To generate a playbook for repairing a node, the restoration engine may further combine the playbooklets corresponding to each edge connected to that node, based on the metadata associated with the edge (e.g., taking into account the incident type, whether the node in question is the source or target, etc.).

In an example, if malware is known to have executed on a domain-joined endpoint, this can be broken down into at least three independent sub-problems, for example:

(i) The endpoint's operating system can no longer be trusted, and must be wiped and replaced or repaired in detail.

(ii) The network domain accounts on the endpoint that executed the malware can no longer be trusted, this must be addressed at the domain controller level (iii) The malware binary itself can be searched for elsewhere, investigated further or stored for future forensics.

The cyber security restoration engine 190 may draw upon a pre-prepared set of playbooklets, then combine the most useful and relevant playbooklets together for each asset involved in the incident. This combination may be determined based on factors such as:

(i) The identity of the asset, its operating system and its role in the network.

(ii) Its specific involvement in the cyber incident.

(iii) Whether or not it is believed to have come under the control of external threat actors.

An initial, default set of playbooklets may be provided that cover common sub-problems and asset types with generally applicable actions. In any given deployment, these playbooklets can be edited to customize them with more specific solutions, or to add entirely new ones. Playbooklets may be organized with actions in different stages of the resolution, such as: Gathering evidence, containment, communication, eradication, and recovery.

Each action may have a priority within its stage, and may only appear in a single stage. Combining playbooklets into a playbook may be achieved by merging the actions within each stage and then concatenating the resulting lists. The resulting playbook may remain well-ordered, because the playbooklets were initially independent. In rare cases where actions are duplicated between playbooklets, only one unique instance of the action may be retained in the final playbook.

The cyber security restoration engine 190 may therefore be considered to balance the benefits of pre-approved and customized actions to resolve independent sub-problems with the benefits of creating a bespoke playbook for every asset involved in an incident based on the specific details. Each asset may therefore have its own bespoke playbook formed from a particular recommended combination of playbooklets for the cyber incident as it applies to the particular asset. This approach is far more flexible than a human team trying to juggle many partially applicable static playbooks. Further, customizing and maintaining the independent playbooklets may be considered to be far easier than doing the same with multiple playbook documents that incorporate combinations of them. The choice of combination can be determined and recommended by AI. Finally, the cyber security restoration engine may allow the playbook recommended to be overridden by the security team, should information not available to the AI change the preferred response.

Training Simulations

Cyber incident management by security teams can be extremely difficult for many reasons, including: (i) lack of experience with how real incidents appear in their environment and security toolset; (ii) incident response plans that are not tested enough and prove ineffective, inefficient or even impossible; (iii) lack of experience implementing response plans and working within the security team and with other teams under high pressure in these circumstances.

Tabletop exercises are effective at building decision-making experience or developing new plans, but have no interactions with real tools and are highly pre-planned and organized and therefore expected. Cyber ranges are effective at training with some toolsets, especially forensics, but do not occur in the security team's own environment or use their own toolset.

The cyber security restoration engine 190 may allow security teams to train for real incidents using simulations. During a simulation, a threat visualizer interface may be used to show the initiation and progression of a cyber incident that is not really occurring. The simulation may or may not be clearly marked as such, although a lack of such markings could cause serious misunderstandings and stress for the team or even knock-on effects. The cyber security restoration engine 190 may similarly blend both real capabilities and simulated capabilities, in order to allow the team to act realistically to remediate and recover from the incident. Broadly speaking, passive capabilities may be used in truth e.g. to retrieve information about an asset while active capabilities may be simulated i.e. the triggering controls can be activated and this will be recorded, the but action is not really taken.

Two methods may be used to create simulated incidents for training. The first is templating, where an incident exists as a blank template that can be mapped into a specific environment by assigning local assets to the template's assets and mapping the time progression of the template onto a real-time schedule. Templates can be created from scratch, or they can be derived by anonymizing real incidents seen before by the cyber security restoration engine 190 in another environment, or some combination of both. Templates may be static, but have significant reusability as the assets chosen can hold great variety of operating systems, roles in the network, and criticality of users and data.

The second is to utilize generative algorithms or forms of AI. A graph of all the recent and/or all the possible interactions between the assets in the environment may be used, the same data that underpins the prediction engine with Artificial Intelligence-based simulations. The algorithms or AI draw from this and knowledge of threat actor techniques and tactics to invent a realistic cyber attack from initial access through to clear goals. This may be wholly generated prior to the simulated attack beginning and then used like the static templates, or it can be reactive to changes in the environment made deliberately by the security team or inadvertently by others.

In both cases, the timing and time progression of the simulations are important to the lessons learned. For example, beginning the simulation within or outside the main working hours of the security team might have very different expectations of the delay before discovery and the pace that resources that can be mustered to respond. Security teams can follow their incident management plans and processes to the maximum extent without causing disruption (or beyond if they so choose). This overall may provide a very realistic simulation of a real cyber incident within the specific environment, with the security team's real toolset and response plans available and usable. Lessons learned by reviewing the entire simulation can be used to improve the plans and processes in advance of a real incident. Similarly a wide variety of simulation contents can train the security team against a wide variety of scenarios.

Thus, the above-described implementations involve the use of simulations to help train certain users for a wide variety of cyber incidents that could happen in the future. Improved training can improve the organization's cyber security and reduce or avoid the negative impacts associated with a cyber incident. Further, as is indicated above, metrics derived from the training can be used to learn how different cyber security tool configurations affect the outcome of a simulated cyber security incident and thereby allow an optimum configuration to be used in real life.

Further, the above-described implementations involve the creation and use of improved instructions that form, in effect, playbooks that are bespoke to the circumstances of a cyber security incident, as well as take into account the infrastructure of the organization's computing network. Thus, the organization can be better placed to react to the cyber security incident in an optimum way.

Certain techniques may build on AI-based approaches to learn from real life cyber security incidents and apply those lessons in different circumstances and in different environments.

Further techniques that implement principles of one or more implementations described above are now described in more detail.

FIG. 21 is a flowchart of a method 2100 for a cyber security restoration engine 190 configured to restore an asset in a computing network that is involved in a cyberattack to a trusted operational state and prioritize remediation actions for the asset in the computing network.

The method 2100 comprises, at block 2102, receiving an indication that the asset in the computing network is involved in a cyber security scenario.

The method 2100 further comprises, at block 2104, identifying, based on a property of the asset, an ordered set of instructions forming a playbook that applies the asset to at least partially address the cyber security scenario.

The cyber security restoration engine 190 provides functionality to facilitate actions to respond to a cyber security scenario. In some cases, such functionality can be provided based on a user interaction with an interface for allowing the user to use the features and functionality of the cyber security restoration engine 190. In some cases, such functionality can be autonomous. For example, the cyber security restoration engine 190 may include autonomous response functionality that does not require any or substantial user interaction in order to deploy the functionality.

If the cyber security appliance 100 determines that an asset (e.g., a device such as a client device, server, etc.) of the computing network is involved a cyber security scenario in some way, the cyber security restoration engine 190 implementing the method 2100 may assist with providing a solution to the problem that is appropriate for the particular asset involved. The indication that the asset in a computing network is involved in the cyber security scenario may be based on a detection performed by the cyber security appliance 100. Such an indication may comprise an alert or other form of notification about the cyber security scenario that has developed in the computing network. It is then the role of the cyber security restoration engine 190 to take action or guide the user in taking action.

Based on the property (which can include a plurality of properties) of the asset, the cyber security restoration engine 190 can identify an ordered set of instructions that are bespoke to the asset that need to be actioned as part of a bespoke playbook to at least partially address the cyber security scenario. The particular order of the set of instructions may be based on knowledge about what is the most appropriate approach to address the cyber security scenario for the particular asset. In other words, different assets may need a different approach. Thus, the identified set of instructions is bespoke to the particular asset involved in the cyber security scenario.

The ordered set of instructions forming the complete playbook may refer to a combination of playbooklets. Each playbooklet may comprise an ordered set of instructions/actions designed to resolve a specific independent part of the cyber security issues of a specific asset. Such instructions/actions can include: (i) obtain evidence (e.g., about what happened before that evidence is destroyed as a result of making changes), (ii) contain the problem (e.g., quarantine a source device, force system shutdown, disable account, logout user(s), revoke privileges, etc.), (iii) communicate with certain individuals (e.g., in the organization) about the problem, (iv) remediate the problem, and/or (v) restore the asset to a clean/safe state.

The ordered set of instructions may be considered to be bespoke or tailored according to various factors relating to the asset itself and the cyber security scenario itself that may affect what is considered to be the most optimal response to the cyber security scenario.

For example, knowledge of historical cyber security incidents and/or observations of simulations of cyber security scenarios may be used to derive or refine the instructions that can be used to form a bespoke playbook to appropriately respond to the cyber security scenario. The cyber security restoration engine 190 may have access to such knowledge and multiple instructions (i.e., playbooklets) that can be selected and combined in an appropriate order to provide a bespoke playbook for responding to a particular cyber security scenario. In some cases, the knowledge may indicate what assets were involved in such historical cyber security incidents. In some cases, the knowledge may indicate any properties of such assets. In some cases, the knowledge may indicate information about the computing network itself and/or any other environmental information.

In some cases, an AI-based approach (e.g., using AI analyst) may be used to detect an incident and provide information that can be used as an input to determine which playbooklets (e.g., from a database of potential playbooklets to use) are to be recommended for responding to the cyber security scenario. The database of potential playbooklets may be derived from prior knowledge about cyber security scenarios that have played out in the past. An ordered set of playbooklets selected and recommended for the asset may represent an optimal approach to at least partially address the cyber security scenario.

As such, techniques described herein such as represented by the method 2100 and any related methods may help to facilitate the identification of an appropriate ordered set of instructions that form, in effect, a bespoke playbook so that an organization can utilize the up-to-date knowledge about potential cyber security scenarios and deploy a response that is suitable for the asset concerned. Thus, the organization may be better placed to react to the cyber security incident in an optimum way.

Some embodiments relating to the method 2100 are now described.

In some embodiments, the ordered set of instructions is indicative of a sequence of actions that are recommended to be taken by a user to at least partially address the cyber security scenario.

Examples of events include: cloud account leveraged, cloud account trust lost, command and control, data encrypted, device attacked, device misused, device trust lost (needing rebuild or repair), exfiltration, insider threat, malware observed, multiple passwords exposed, network account trust lost, etc.

In some embodiments, the property comprises an identity of the asset (e.g., a device name, device type, etc.).

In some embodiments, the property comprises a hardware configuration of the asset (e.g., the hardware components that a part of the asset).

In some embodiments, the property comprises a firmware configuration of the asset (e.g., what firmware and firmware version the asset uses).

In some embodiments, the property comprises a software configuration of the asset (e.g., what software the asset is running and what version of that software is being used).

In some embodiments, the property comprises an operating system of the asset (e.g., which type and version of operating system).

In some embodiments, the property comprises a role of the asset in the computing network (e.g., what does the asset do in the network such as it is a client device, server, etc., and/or which member of the organization is using the asset such as what their role is within the organization).

In some embodiments, the property comprises an involvement of the asset in the cyber security scenario. For example, the property could indicate whether the asset is directly or indirectly involved in the scenario (e.g., the device itself could be compromised or be affected by another device internally or externally of the computing network).

In some embodiments, the property comprises whether or not the asset is controlled by an actor external to the computing network. For example, different instructions/playbooklets may be needed depending on whether the cyber security scenario involves an actor that is external or internal to the computing network.

In some cases, there may be multiple assets (each with same or different properties) involved in the cyber security scenario. The method 2100 could be used to identify the bespoke sets of ordered instructions needed to address the cyber security scenario for each of those assets. The ordered sets of instructions may be tailored to each asset based on its individual property or properties.

In some embodiments, the ordered set of instructions forming the playbook are derived from knowledge about a real life cyber security scenario. The ordered set of instructions forming the playbook may be mapped to the asset based on the property of the asset. For example, if an asset (in another computing network of another organization) with a similar property to a current asset involved in a current cyber security scenario was involved in a real life cyber security scenario, the ordered set of instructions forming the playbook needed to address the real life cyber security scenario may be mapped to the current asset.

In some embodiments, the ordered set of instructions forming the playbook is a combination of playbooklets. Each playbooklet comprises an ordered set of instructions designed to resolve a specific independent part of a cyber security issue that applies to the asset.

Playbooklets may each have a name and an associated description of what the playbooklet is intended to achieve. A user may choose to follow the playbooklet, or not. In some cases, a user can edit a playbooklet and if necessary, restore to a default version of the playbooklet.

In some embodiments, the method 2100 further comprises identifying a set of playbooklets to combine by determining which playbooklets, from a database of playbooklets, are relevant to address the cyber security scenario. In some embodiments, the method 2100 further comprises combining the playbooklets determined to be relevant into a single playbook each asset, resulting in a single ordered set of instructions that address as many known cyber security issues of the asset as possible. Thus, a bespoke playbook may be created for each specific asset based on a combination of the relevant playbooklets for the asset and for the cyber security scenario. A single playbook for an asset may include a single ordered set of instructions that address as many known cyber security issues of the asset as possible. Thus, a set of playbooklets that were suitable for at least partially addressing real life cyber security scenarios may be appropriately combined and ordered based on the experience of addressing such real life cyber security scenarios. Thus, the playbooklets may be in an appropriate combination and order based on such experience.

In some embodiments, the method 2100 further comprises implementing an artificial intelligence (AI) model configured to recommend which playbooklets to use to form an optimal playbook for the asset. The optimal playbook recommended for each asset may be independent of playbooks recommended for other assets and can be the same or different. Thus, the optimal playbook recommended for each asset may be based on the recommended playbooklets for the specific asset. A playbook recommended for an asset can be the same or different to the playbook recommended for another asset, depending on the asset and/or cyber security scenario itself. Such an AI model may be trained based on the knowledge mentioned above.

In some embodiments, prior to identifying the ordered set of instructions forming the playbook for an asset, the method 2100 further comprises prioritizing the asset with respect to a plurality of assets of the computing network based an understanding of which asset to target in a cyber security scenario in order to reduce or minimize damage to the computing network.

Even if a particular order of instructions is recommended, a user may not be forced to follow the order. Similarly, a user may not be forced to direct their attention to a prioritized asset. It may be ultimately up to the user to decide how to proceed, unless the process is fully automated. However, an AI-based approach may be used to provide a recommended set of instructions in a recommended order. The user can, if they wish, pre-examine the instructions and the order to be sure they trust that following these instructions will solve the specific problem. A user interface may be provided to allow the user to modify the instructions on-the-fly, for example, by adding new instructions, skipping one or more instructions, or choosing a different set of instructions. Such modifications may be based on new knowledge or knowledge that the user has outside the system e.g., by speaking to asset users.

In some embodiments, the method 2100 further comprises indicating, via a user interface, that an instruction of the ordered set of instructions forming the playbook is to be actioned to at least partially address the cyber security scenario. The method 2100 may further comprise receiving an indication that the instruction has been actioned. For example, the cyber security restoration engine 190 may be interacted with by a user using a user interface, which can be used to indicate the instructions and thereby allow the user to interact with such instructions in order to action the instructions (e.g., if the user interface can be used to cause a cyber security tool to perform some functionality in the computing network).

In some embodiments, the method 2100 further comprises, in response to receiving the indication, indicate that a second instruction of the ordered set of instructions forming the playbook is to be actioned to at least partially address the cyber security scenario. The method 2100 may further comprise receiving an indication that the second instruction has been actioned. For example, where there is a sequence of instructions to be actioned, a user's response to a first instruction can be input, and in response, a second instruction (according to the specified order) can be indicated to the user.

In some cases, the indication may be provided by the user via the user interface, or it may be provided as a result of an autonomous action being triggered by the user via the user interface.

In some cases, the user interface may indicate a graph (e.g., similar to what is depicted by FIG. 3B) showing assets (e.g., devices) with actions needed on the graph. By clicking on an asset via the user interface, a user interface with the recommended ordered set of instructions forming the playbook may be shown to provide the user with information on how to proceed. A priority score to indicate the priority associated with each asset may also be shown to help guide the user's strategy. By way of example, a priority score may be calculated based on importance of events. For example, AI analyst can determine from a complex mix of events which ones are more important based on factors such as severity of activity, how it might evolve, type of device, etc. The priority score may be able to identify a certain asset that might be more beneficial to focus on as part of the user's action. For example, taking out (stopping, disrupting, shutting down, etc.) an encrypting device may be more effective and considered to be higher priority than the device being encrypted. In another example, a pivot device routing damaging data internally may need to be taken out more quickly than another device.

In some embodiments, the instruction (of the ordered set of instructions forming the playbook) is displayed on the user interface. In some cases, any of the other instructions of the ordered set of instructions may be displayed. The indication that the instruction has been actioned may be provided by a user interaction that is input via the user interface.

In some embodiments, the ordered set of instructions forming the playbook are further identified based on information about the cyber security scenario. For example, what kind of cyber incident is involved and therefore which instructions are considered to be suitable for addressing that kind of cyber incident.

In some embodiments, the ordered set of instructions forming the playbook are identified based on information about the computing network. For example, there may be a characteristic of the computing network itself that is similar to another computing network that experienced a similar cyber security scenario, and therefore the instructions for resolving such a scenario in the other computing network may be suitable for addressing the current cyber security scenario.

In some embodiments, the method 2100 further comprises causing a user interface to display the ordered set of instructions forming the playbook. The user interface may be configured to allow a user to interact with the ordered set of instructions forming the playbook to perform one or more of the following: (i) add an instruction to the ordered set of instructions forming the playbook; (ii) skip an instruction in the ordered set of instructions forming the playbook; or choose a different set of instructions forming the playbook. Thus, the user may actively decide to make any combination of changes to a recommended ordered set of instructions forming the playbook based on their experience and knowledge.

Thus, a recommendation may be made (and displayed via the user interface) on which playbooklets are to be used for a particular combination of asset and cyber security scenario. In an example, a user could click 'yes' on the user interface for the system to provide a list of steps and suggest ways to track and/or automate any actions that are needed. A user could click on a button to trigger any automated response, if possible, though in some cases a user would need to implement a certain action manually. Thus, either a user could select a specific playbooklet of their choice from a list, or the system may recommend a set of playbooklets and the order of these playbooklets e.g., depending on factors such as whether the asset is under external or internal control (which could be specified by user input via the user interface).

In some embodiments where the cyber security scenario evolves in some way (e.g., a new event is observed) that means that a different response is needed, a different recommendation may be made as to what ordered set of instructions forming the playbook to use to at least partially address the cyber security scenario In some embodiments, the cyber security scenario is a real life cyber security incident. Thus, the identified instruction may be helpful for guiding a user on what to do in a real life scenario.

In some embodiments, the cyber security scenario is simulated. Thus, the identified instruction may be helpful for users in practicing on how to respond to potential future cyber incidents.

FIG. 22 is a flowchart of a method 2200 for a cyber security restoration engine configured to restore an asset in a computing network that is involved in a cyberattack to a trusted operational state and prioritize remediation actions for the asset in the computing network.

The method 2200 comprises, at block 2202, causing a user interface to display a recommended set of instructions in a recommended order forming a playbook that applies to the asset in the computing network involved in a cyber security scenario. The recommended set of instructions in the recommended order are identified based on knowledge about the asset and the cyber security scenario.

The method 2200 may provide similar, corresponding, or related functionality to the method 2100.

Some embodiments relating to the method 2200 are now described.

In some embodiments, the method 2200 further comprises identifying, based on a property of the asset, the recommended set of instructions in the recommended order to at least partially address the cyber security scenario.

In some embodiments, the method 2200 further comprises using an artificial intelligence-based approach to identify which instructions, from a database of instructions, are recommended to form the recommended set of instructions in the recommended order, and in what order, to at least partially address the cyber security scenario.

FIG. 23 is a schematic diagram of an apparatus 2300 for a cyber security restoration engine configured to restore an asset in a computing network that is involved in a cyberattack to a trusted operational state and prioritize remediation actions for the asset in the computing network.

The apparatus 2300 comprises a cyber security restoration engine 2302 such as described herein, one or more non-transitory storage mediums 2304 and one or more processing units 2306 coupled to the one or more non-transitory storage mediums 2304 and the cyber security restoration engine 2302. Instructions implemented in software for the cyber security restoration engine 2302 are configured to be stored in the one or more non-transitory storage mediums 2304 to be executed by the one or more processing units 2306.

Thus, the cyber security restoration engine 2302 can be configured to implement the functionality of the aspects, embodiments, and implementations described herein.

For example, the cyber security restoration engine 2302 may be configured to implement the methods 2100, 2200, and any related embodiments.

Any of the features or functionality of any of the embodiments described in relation to the methods 2100 and 2200 may be combined with each other or replace features or functionality of any of the other embodiments or implementations described herein.

The methods and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD. The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments.

Components of the computing system can include, but are not limited to, a processing unit having one or more processing cores, a system memory, and a system bus that couples various system components including the system memory to the processing unit.

Computing Devices

FIG. 24 illustrates a block diagram of an embodiment of one or more computing devices that can be a part of the Artificial Intelligence-based cyber security system including the multiple Artificial Intelligence-based engines discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and nonvolatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software. In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A software engine is a core component of a complex system consisting of hardware and software that is capable of performing its function discretely from other portions of the entire complex system but designed to interact with the other portions of the entire complex system.

The terms "or" and "and/or" as used herein are to be interpreted as inclusive or meaning any one or any combination. As an example, "A, B, or C" or "A, B, and/or C" mean "any of the following: A; B; C; A and B; A and C; B and C; A, B and C." An exception to this definition will occur only when a combination of elements, functions, steps or acts are in some way inherently mutually exclusive.

Unless explicitly stated otherwise, articles such as "a" or "an" should generally be interpreted to include one or more of the described items. Accordingly, phrases including but not limited to "a module," "a memory," "a processor," "an AI model," "an asset," "a configuration," "an effect," and "an action" are intended to include one or more of the recited items (i.e., one or more modules, one or more memories, one or more processors, or one or more AI models, one or more assets, one or more configurations, one or more effects, one or more actions, respectively). Such one or more recited items can also be collectively configured to carry out (e.g., implement) the stated recitations. For example, "a processor (which may be configured) to carry out recitations A, B, and C" can include a first processor configured to carry out recitation A, in conjunction with a second processor configured to carry out recitations B and/or C, and in some cases, in further conjunction with a third processor to carry out recitation C, and so on.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:

a cyber security restoration engine configured to restore an asset in a computing network that is involved in a cyberattack to a trusted operational state and prioritize remediation actions for the asset in the computing network, which is further configured to:

receive an indication that the asset in the computing network is involved in a cyber security scenario, and identify, based on a property of the asset, an ordered set of instructions forming a playbook that applies to the asset to at least partially address the cyber security scenario during the cyberattack, wherein the ordered set of instructions forming the playbook is dynamically generated by combining a plurality of playbooklets in which at least one playbooklet of the plurality of playbooklets (i) corresponds to an edge of a node in a nodal graph in which the node is associated with the asset and (ii) includes an ordered set of instructions designed to resolve specific independent part of the cyber security scenario for the asset; and where instructions implemented in software for the cyber security restoration engine are configured to be stored in one or more non-transitory storage mediums to be executed by one or more processing units.

2. The apparatus of claim 1, wherein the ordered set of instructions is indicative of a sequence of actions that are recommended to be taken by a user to at least partially address the cyber security scenario.

3. The apparatus of claim 1, wherein the property comprises one or more of:

an identity of the asset;

a hardware configuration of the asset;

a firmware configuration of the asset;

a software configuration of the asset an operating system of the asset;

a role of the asset in the computing network;

an involvement of the asset in the cyber security scenario; and whether or not the asset is controlled by an actor external to the computing network.

4. The apparatus of claim 1, wherein the ordered set of instructions forming the playbook are derived from knowledge about a real life cyber security scenario, and wherein the ordered set of instructions are mapped to the asset based on the property of the asset.

5. The apparatus of claim 1, wherein the cyber security restoration engine is configured to compute a severity score for each of a plurality of nodes forming the nodal graph in which at least one node of the plurality of nodes corresponds to the asset, the severity score is computed based on metadata associated with one or more edges establishing ingress or egress paths with the at least one node associated with the asset.

6. The apparatus of claim 1, wherein the cyber security restoration engine is configured to identify the plurality of playbooklets to combine by determining which playbooklets, from a database of playbooklets, are relevant to address the cyber security scenario.

7. The apparatus of claim 1, wherein the cyber security restoration engine is configured to combine a set of playbooklets of the playbook determined to be relevant into a single playbook for each asset, resulting in a single ordered set of instructions that address many known cyber security issues of the asset.

8. The apparatus of claim 7, wherein the cyber security restoration engine is configured to implement an artificial intelligence model configured to recommend which of the plurality of playbooklets to use to form an optimal playbook for the asset, and wherein the optimal playbook recommended for the asset is independent of playbooks recommended for other assets.

9. The apparatus of claim 1, wherein the cyber security restoration engine is configured to both indicate, via a user interface, that an instruction of the ordered set of instructions forming the playbook is to be actioned to at least partially address the cyber security scenario; and receive an indication that the instruction has been actioned.

10. The apparatus of claim 9, wherein the cyber security restoration engine is configured to both in response to receiving the indication, indicate that a second instruction of the ordered set of instructions forming the playbook is to be actioned to at least partially address the cyber security scenario, and receive an indication that the second instruction has been actioned.

11. The apparatus of claim 9, wherein the instruction is displayed on the user interface, and wherein the indication that the instruction has been actioned is provided by a user interaction that is input via the user interface.

12. The apparatus of claim 1, wherein the ordered set of instructions are further identified based on one or more of information about the cyber security scenario; and information about the computing network.

13. The apparatus of claim 1, wherein the cyber security restoration engine is configured to cause a user interface to display the ordered set of instructions, and wherein the user interface is configured to allow a user to interact with the ordered set of instructions to one or more of add an instruction to the ordered set of instructions forming the playbook;

skip an instruction in the ordered set of instructions forming the playbook; and choose a different set of instructions forming the playbook.

14. The apparatus of claim 1, wherein the cyber security scenario is a real life cyber security incident.

15. The apparatus of claim 1, wherein the cyber security scenario is simulated.

16. A method for a cyber security restoration engine configured to restore an asset in a computing network that is involved in a cyberattack to a trusted operational state and prioritize remediation actions for the asset in the computing network, comprising:

receiving an indication that the asset in the computing network is involved in a cyber security scenario, and identifying, based on a property of the asset, an ordered set of instructions forming a playbook that applies to the asset to at least partially address the cyber security scenario during the cyberattack, wherein the ordered set of instructions forming the playbook is dynamically generated by combining a plurality of playbooklets in which at least one playbooklet of the plurality of playbooklets corresponds to each node in a nodal graph communicatively coupled to the asset and includes an ordered set of instructions designed to resolve specific independent part of the cyber security scenario for the asset.

17. A non-transitory computer-readable medium storing instructions which when executed by a cyber security restoration engine configured to restore an asset in a computing network that is involved in a cyberattack to a trusted operational state and prioritize remediation actions for the asset in the computing network causes the cyber security restoration engine to:

receive an indication that the asset in the computing network is involved in a cyber security scenario, and identify, based on a property of the asset, an ordered set of instructions forming a playbook that applies to the asset to at least partially address the cyber security scenario during the cyberattack, wherein the ordered set of instructions forming the playbook is dynamically generated by combining a plurality of playbooklets in which at least one playbooklet of the plurality of playbooklets corresponds to a node in a nodal graph associated with the asset and includes an ordered set of instructions designed to resolve specific independent part of the cyber security scenario for the asset.

18. An apparatus, comprising:

a cyber security restoration engine configured to restore an asset in a computing network that is involved in a cyberattack to a trusted operational state and prioritize remediation actions for the asset in the computing network, which is further configured to:

cause a user interface to display a recommended set of instructions in a recommended order forming a playbook that applies to the asset in the computing network involved in a cyber security scenario, wherein the recommended set of instructions in the recommended order are identified based on knowledge about the asset and the cyber security scenario; and wherein the playbook is dynamically generated from a plurality of playbooklets based on asset context, incident graph constructions, and AI-driven prioritization, where instructions implemented in software for the cyber security restoration engine are configured to be stored in one or more non-transitory storage mediums to be executed by one or more processing units.

19. The apparatus of claim 18, wherein the cyber security restoration engine is configured to identify, based on a property of the asset, the recommended set of instructions in the recommended order to at least partially address the cyber security scenario.

20. The apparatus of claim 18, wherein the cyber security restoration engine is configured to use an artificial intelligence-based approach to identify which instructions, from a database of instructions, are recommended to form the recommended set of instructions in the recommended order, and in what order, to at least partially address the cyber security scenario.

21. The apparatus of claim 18, wherein the asset context includes one or more properties of the asset, the incident graph constructions includes metadata associated with one or more node or edges of a nodal graph associated with the asset, and the AI-driven prioritization includes severity scoring of the one or more nodes in determining, by one or more artificial intelligence models, an order of returning the one or more nodes to a trusted operational state so as to return the asset into the trusted operational state.

* * * * *